United States Patent
Sutherland

(10) Patent No.: US 10,895,687 B2
(45) Date of Patent: Jan. 19, 2021

(54) ALIGNMENT FERRULE ASSEMBLIES AND CONNECTORS FOR EVANESCENT OPTICAL COUPLERS AND EVANESCENT OPTICAL COUPLERS USING SAME

(71) Applicant: CORNING RESEARCH & DEVELOPMENT CORPORATION, Corning, NY (US)

(72) Inventor: James Scott Sutherland, Corning, NY (US)

(73) Assignee: Corning Research & Development Corporation, Corning, NY (US)

(*) Notice: Subject to any disclaimer, the term of this patent is extended or adjusted under 35 U.S.C. 154(b) by 160 days.

(21) Appl. No.: 16/176,413

(22) Filed: Oct. 31, 2018

(65) Prior Publication Data
US 2020/0132934 A1    Apr. 30, 2020

(51) Int. Cl.
*G02B 6/30* (2006.01)
*G02B 6/36* (2006.01)
*G02B 6/38* (2006.01)

(52) U.S. Cl.
CPC .............. *G02B 6/30* (2013.01); *G02B 6/3616* (2013.01); *G02B 6/3628* (2013.01);
(Continued)

(58) Field of Classification Search
CPC .... G02B 6/02033; G02B 6/30; G02B 6/2852; G02B 6/2821; G02B 6/29331;
(Continued)

(56) References Cited

U.S. PATENT DOCUMENTS 5,504,607 A    4/1996  Smith et al.
5,793,919 A    8/1998  Payne et al.
(Continued)

FOREIGN PATENT DOCUMENTS

EP        176623 A1     4/1986
WO    2017189694 A1    11/2017

OTHER PUBLICATIONS

Brusberg et al; "Optical Couplers for Evanescent Coupling of Polymer Clad Fibers to Optical Waveguides Using Alignment Features" Filed as U.S. Appl. No. 15/884,622, filed Jan. 31, 2018; 89 Pages.
(Continued)

*Primary Examiner* — Michael P Mooney
(74) *Attorney, Agent, or Firm* — Michael E. Carroll, Jr.

(57) ABSTRACT

Disclosed is an optical interconnection device that includes an alignment ferrule assembly formed from an alignment substrate and optical fibers. The optical interconnection device also has an alignment assembly formed by a planar support member with guide features. A receiving region resides between the guide features in which the alignment substrate is secured. An evanescent optical coupler can be formed using the optical interconnection device as a first device and another optical interconnection device as a second device. The second device is constituted by a planar lightwave circuit that operably supports waveguides and an adapter. The adapter of the second device is configured to engage the alignment assembly of the first device to place the optical fibers and the optical waveguides of the respective devices in evanescent optical communication.

14 Claims, 54 Drawing Sheets

(52) U.S. Cl.
CPC ......... *G02B 6/3652* (2013.01); *G02B 6/3684* (2013.01); *G02B 6/3826* (2013.01); *G02B 6/3839* (2013.01); *G02B 6/3861* (2013.01); *G02B 6/3885* (2013.01)

(58) Field of Classification Search
CPC .... G02B 6/245; G02B 6/3616; G02B 6/3628; G02B 6/3636; G02B 6/3652; G02B 6/3684; G02B 6/3861; G02B 6/3885; G02B 6/3826; G02B 6/4291
USPC ...................................................... 385/14, 49
See application file for complete search history.

(56) References Cited

U.S. PATENT DOCUMENTS

| | | |
|---|---|---|
| 6,266,472 B1 | 7/2001 | Norwood et al. |
| 6,321,019 B1 | 11/2001 | Shibuya et al. |
| 6,810,195 B2 | 10/2004 | Bhagavatula et al. |
| 7,428,358 B2 | 6/2008 | Lu et al. |
| 7,480,432 B2 | 1/2009 | Grzybowski et al. |
| 7,724,992 B2 | 5/2010 | Sutherland |
| 8,787,712 B2 | 7/2014 | Grondin et al. |
| 9,377,587 B2 | 6/2016 | Taylor et al. |
| 9,700,821 B2 | 7/2017 | Grider et al. |
| 10,107,967 B1 | 10/2018 | Butler et al. |
| 2003/0095758 A1 | 5/2003 | Morse et al. |
| 2013/0230274 A1 | 9/2013 | Fish |
| 2017/0205583 A1 | 7/2017 | Bennett et al. |
| 2018/0067265 A1 | 3/2018 | Akiyama |
| 2018/0267255 A1* | 9/2018 | Butler .................. G02B 6/3885 |

OTHER PUBLICATIONS

International Search Report and Written Opinion of the European International Searching Authority; PCT/US2019/056087; dated Jan. 30, 2020; 13 Pgs.

* cited by examiner

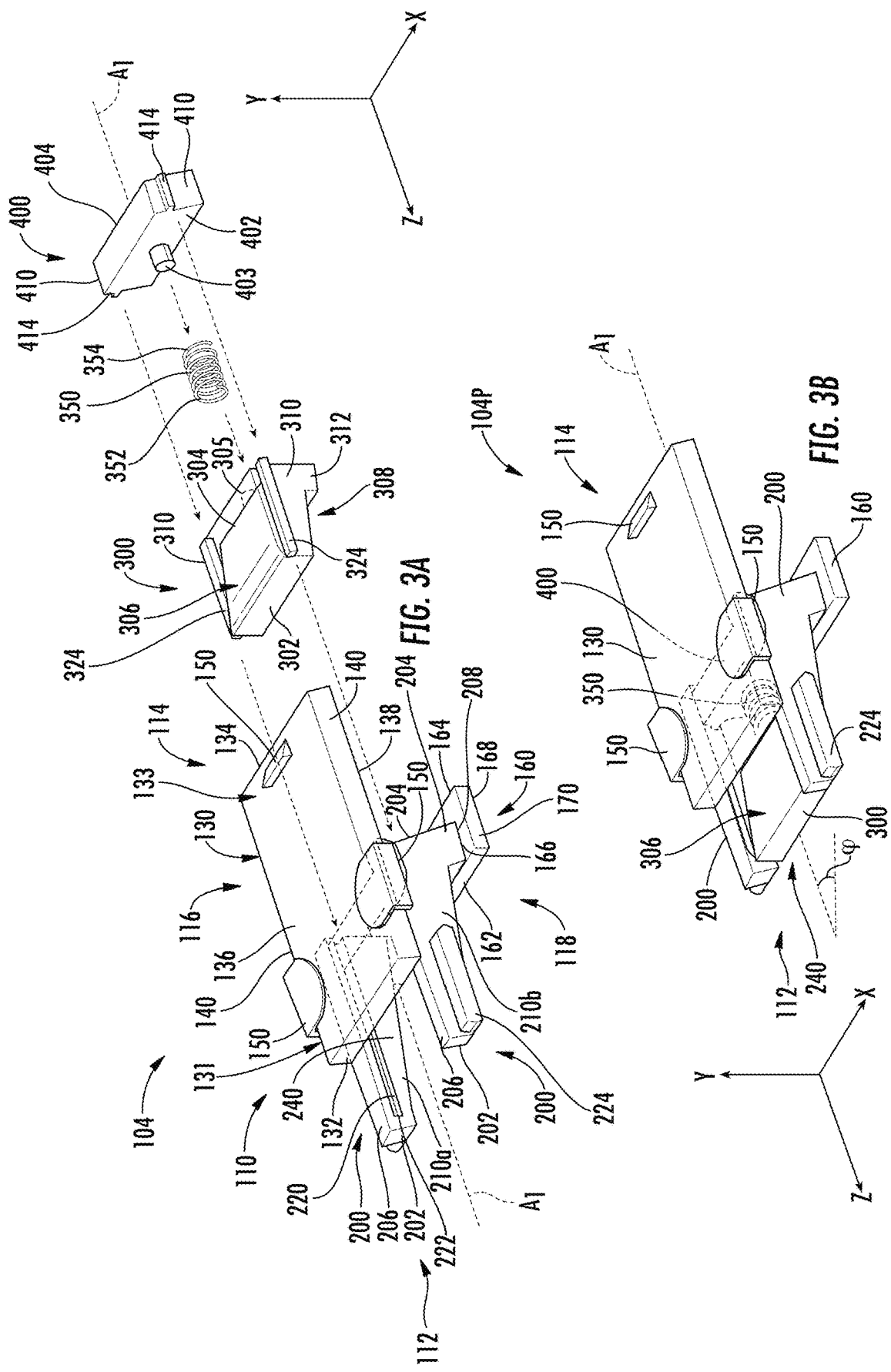

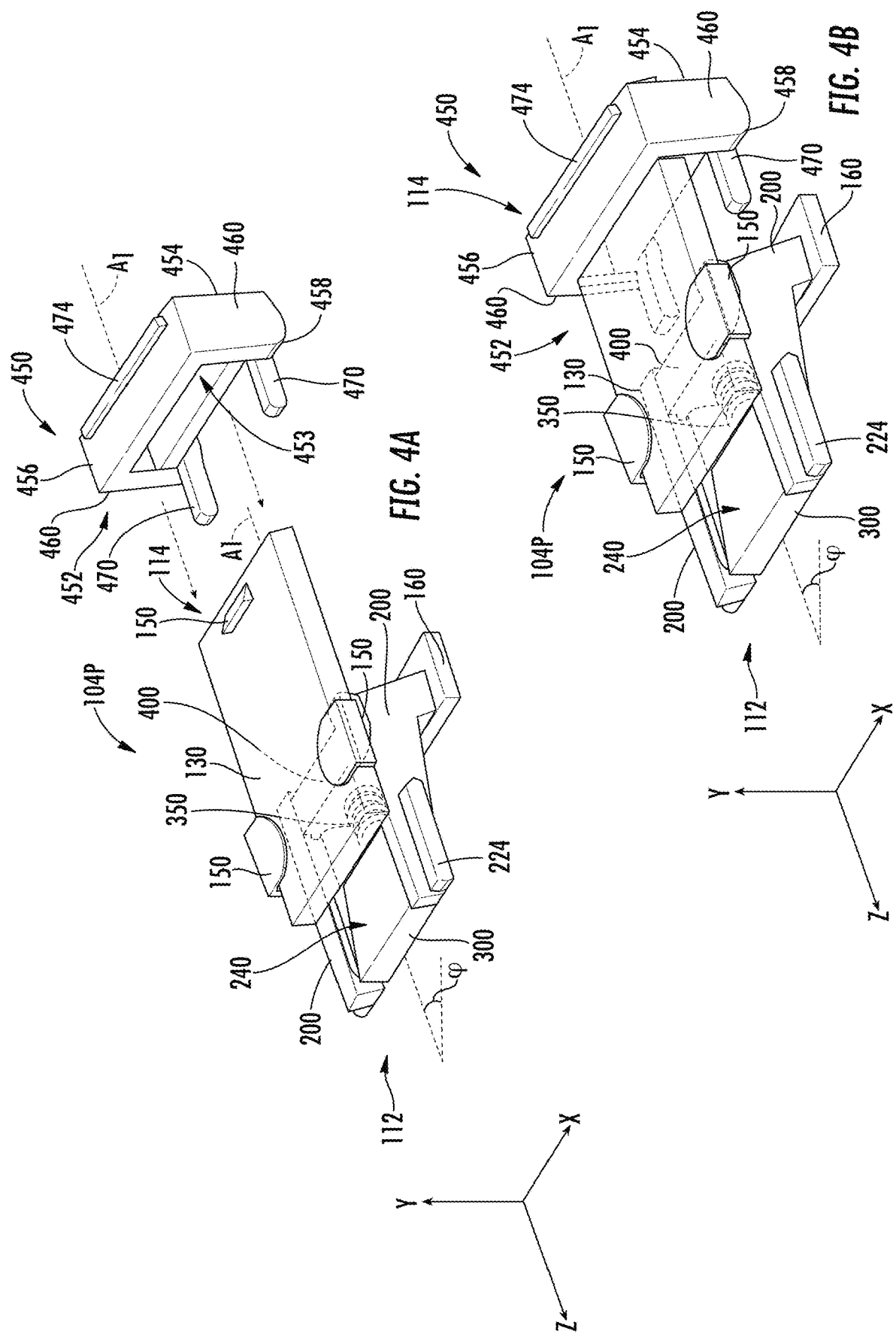

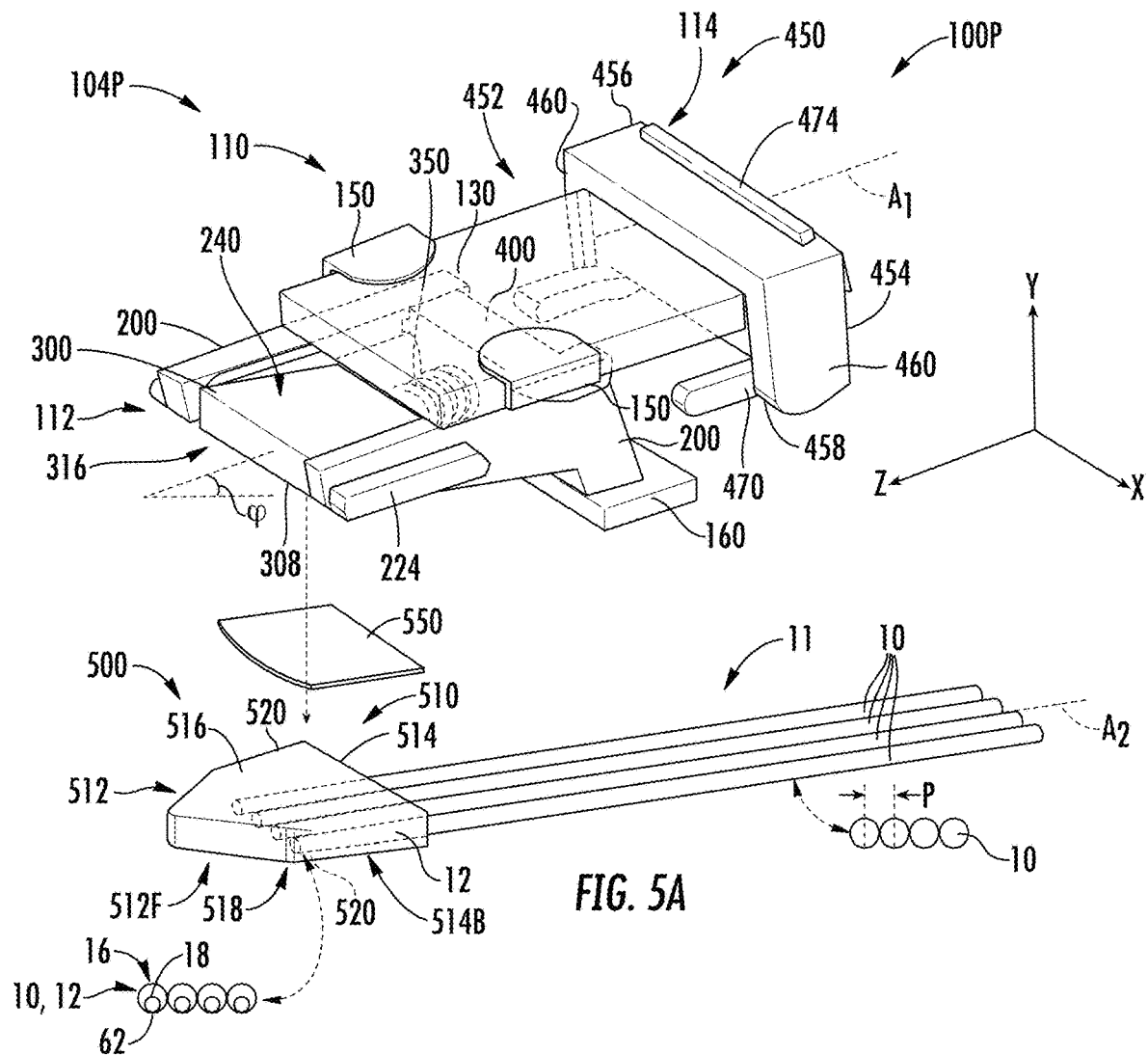
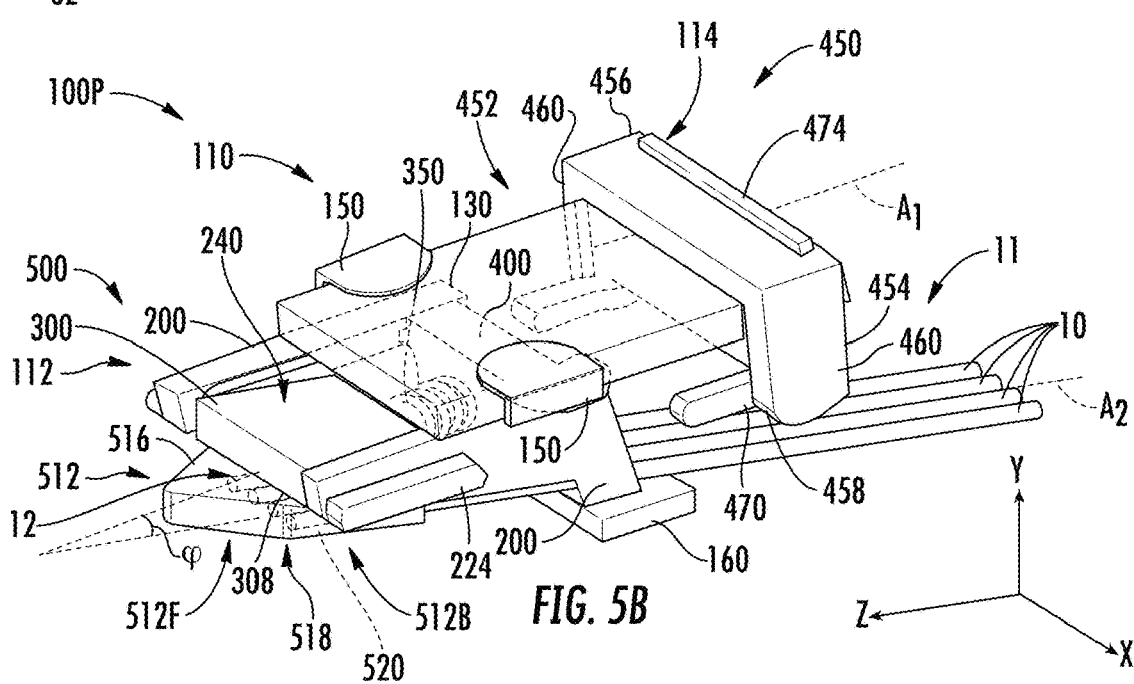

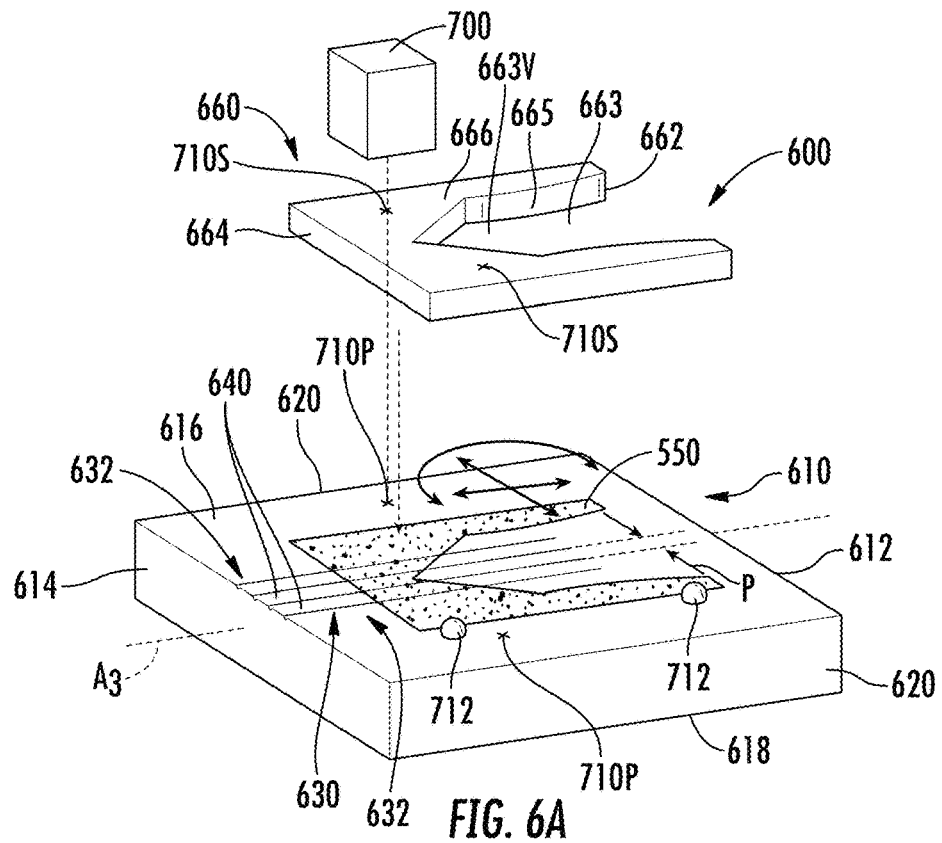
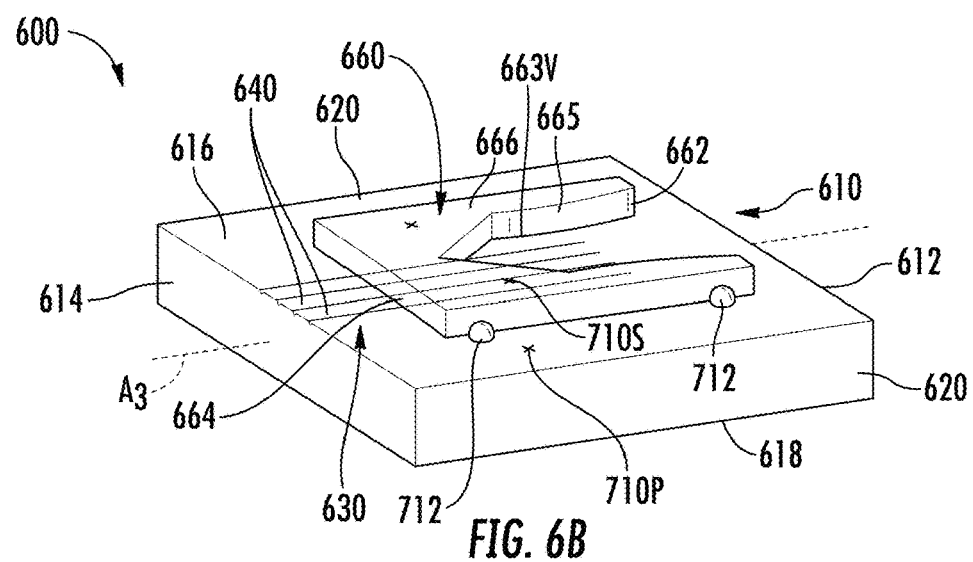
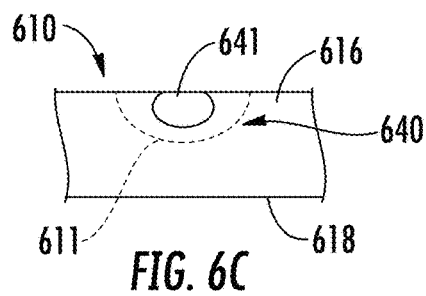
FIG. 6A
FIG. 6B
FIG. 6C

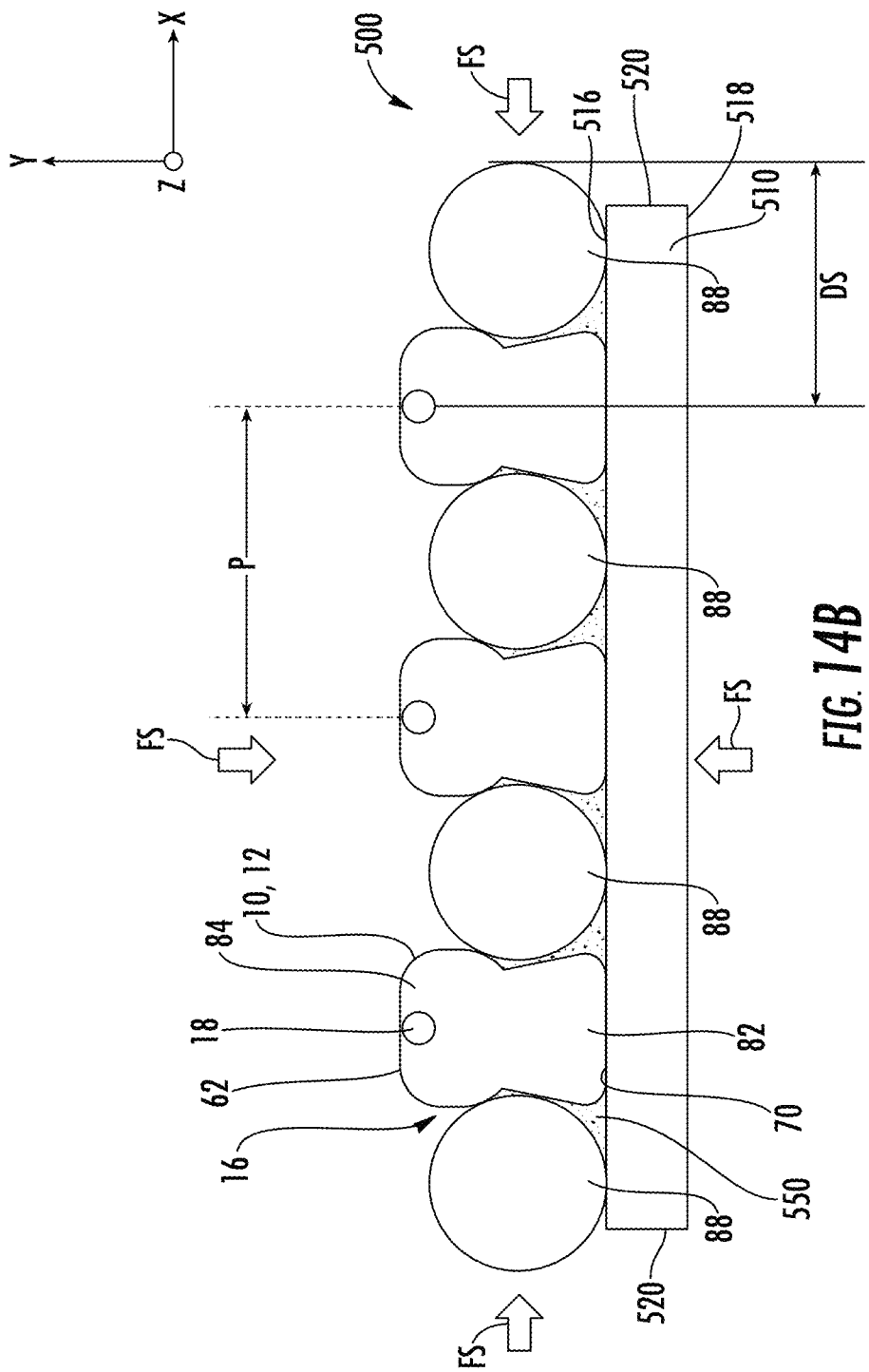

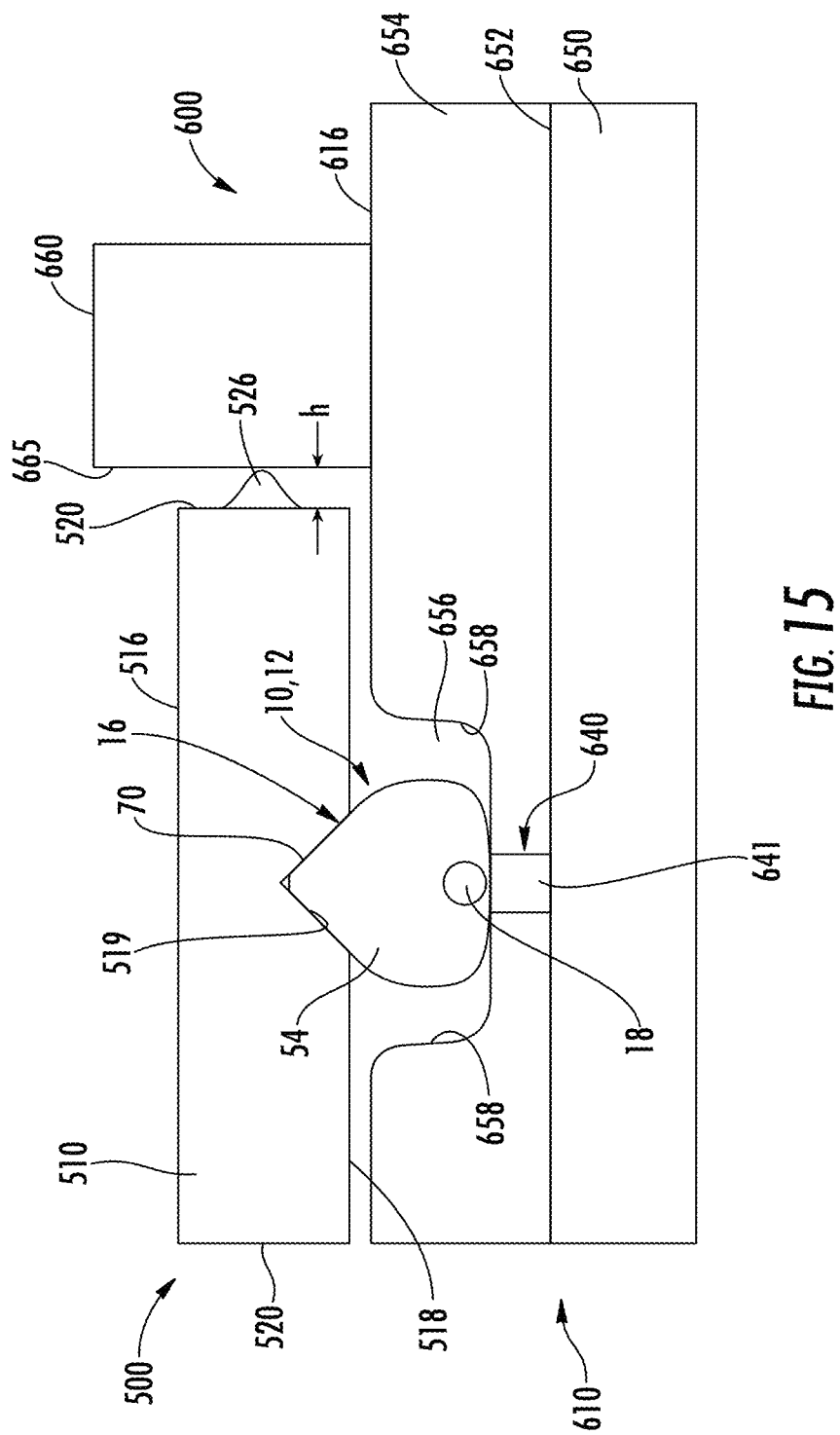

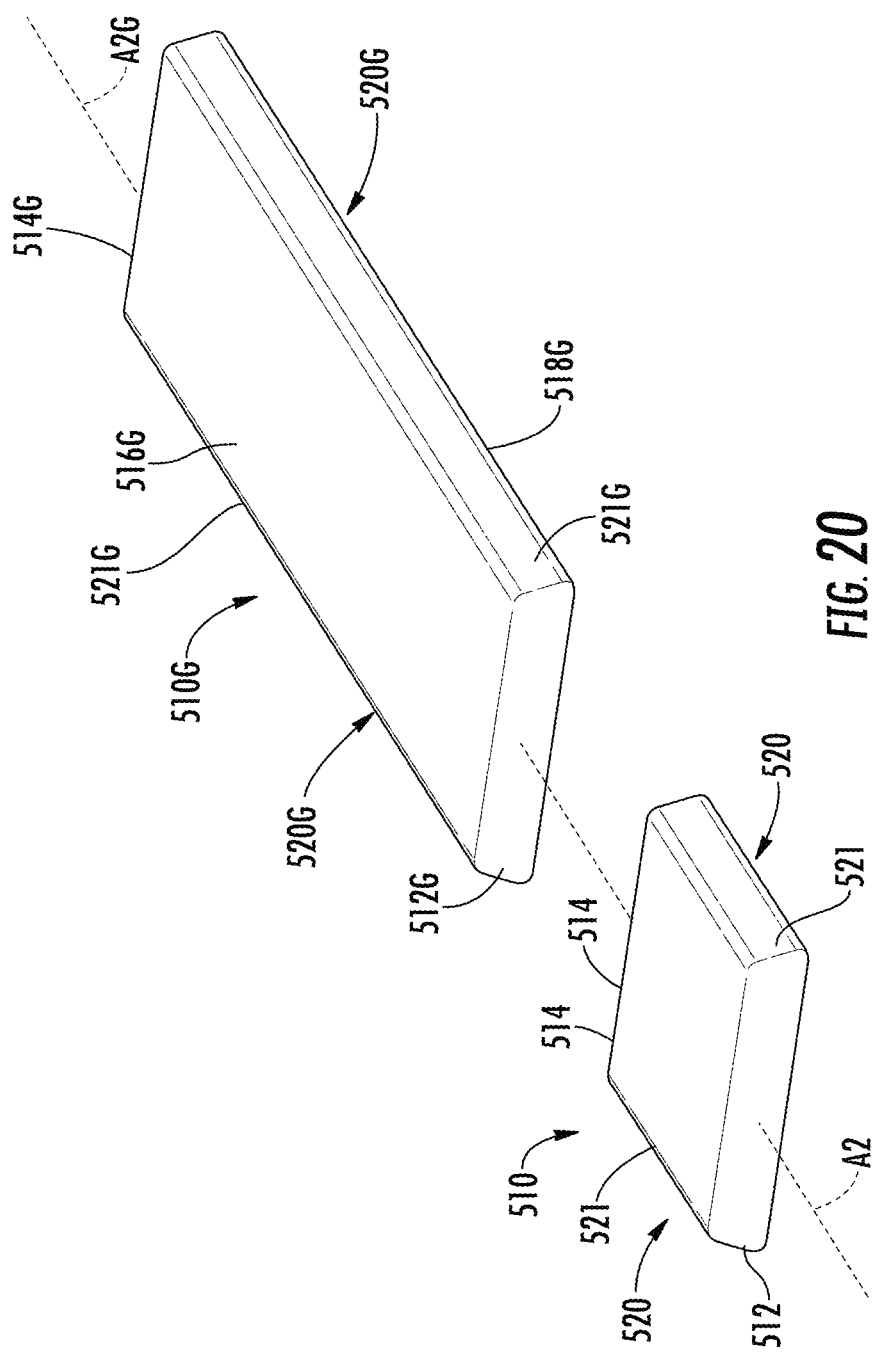

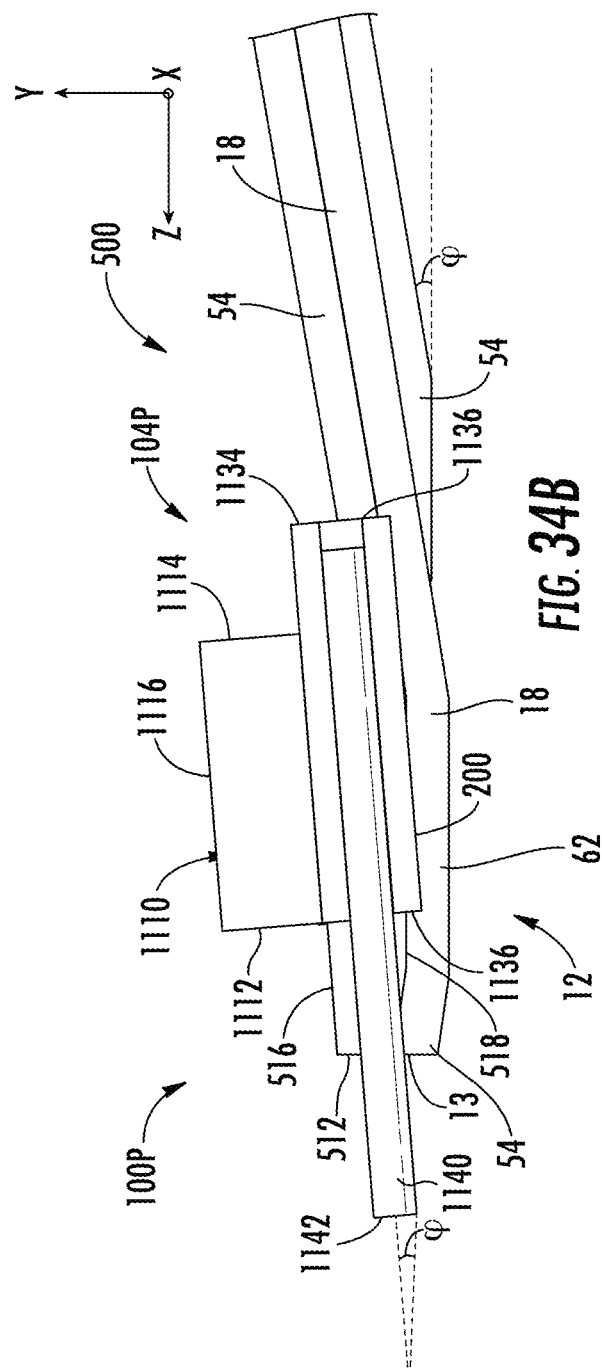

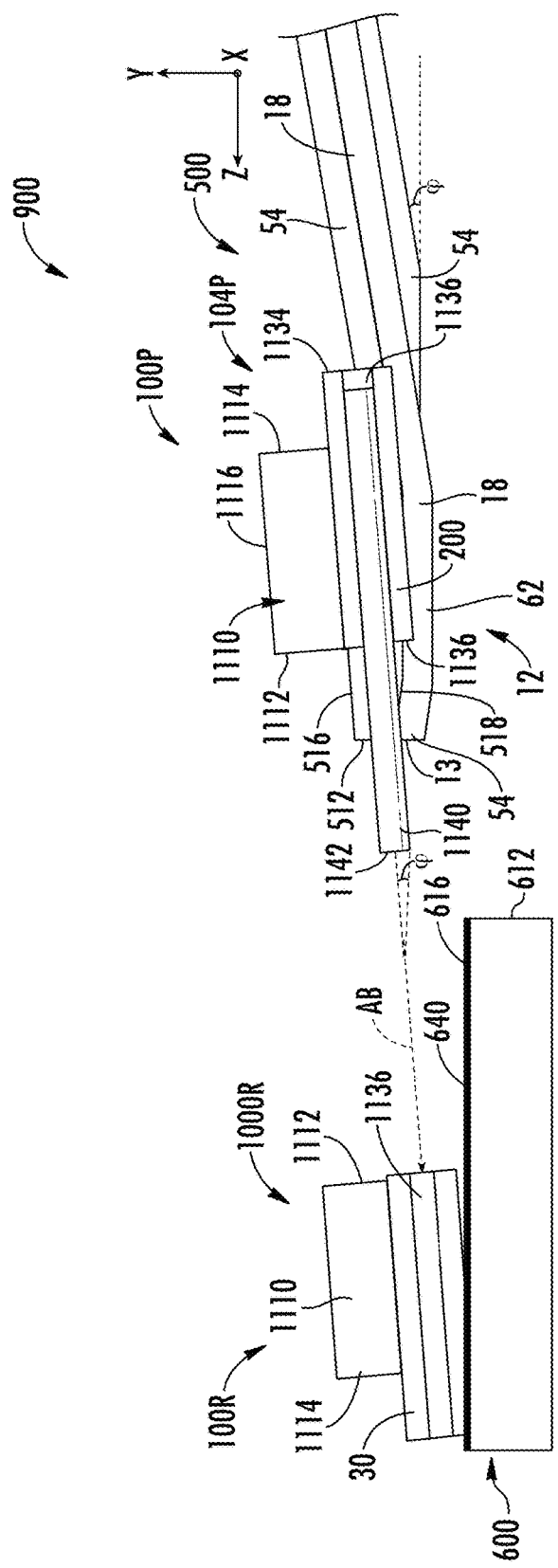
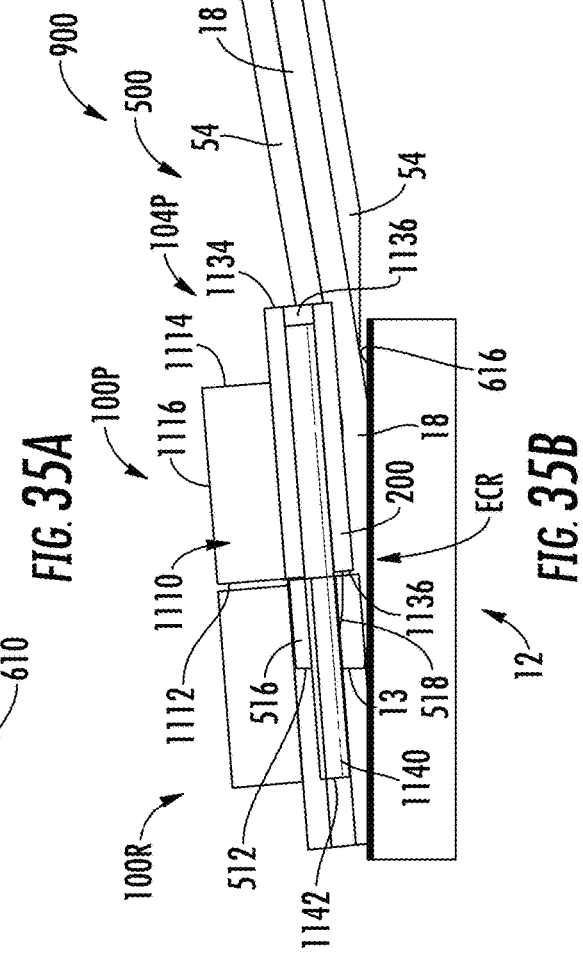
FIG. 35A
FIG. 35B

ALIGNMENT FERRULE ASSEMBLIES AND CONNECTORS FOR EVANESCENT OPTICAL COUPLERS AND EVANESCENT OPTICAL COUPLERS USING SAME

FIELD

The present disclosure generally relates to optical couplers used to perform optical coupling between fibers and planar lightwave circuit (PLC) waveguides, and more particularly relates to ferrules assemblies and connectors for evanescent optical couplers for optically coupling optical fibers to waveguides of PLCs, and to evanescent optical couplers using the ferrule assemblies and connectors.

BACKGROUND

Optical interconnects based on ion-exchanged (IOX) PLC waveguides realized in thin glass substrates are a promising alternative to electrical (e.g. copper), or optical-fiber-based high-density, high bit-rate, short distance (less than 1 m) links for high-performance computing and data center applications. Such IOX PLC waveguides have the advantage of dense routing, flexibility, integration, and co-packaging with electronic integrated circuits. Other PLC technologies based on, for example Si, InP, and GaN materials, provide light sources, detectors, and/or modulators essential for implementation of optoelectronic transceivers.

A high bit-rate optical signal is typically delivered to PLC waveguides through an optical fiber. Thus, a low-cost, low-loss connectivity solution from a single mode fiber to an PLC waveguide is desirable. A standard approach is to use an end-to-end coupling (also called edge coupling or butt coupling) between the single mode fiber and the PLC waveguide. Such coupling requires that the PLC substrate edge and the fiber end be processed to achieve an optical quality (i.e., smoothly polished) surface for low-loss coupling. This coupling also requires that mode sizes (i.e., mode-field diameters) of the guided mode of the fiber and the guided mode of the PLC waveguide be closely matched.

An alternative approach to end-to-end coupling is to use evanescent coupling between the fiber and the PLC waveguide. Unfortunately, efficient evanescent optical coupling between a fiber and an PLC waveguide requires that the separation as well as the alignment between the fiber and the PLC waveguide be controlled to challenging tolerances, e.g., to micron or even sub-micron levels. While evanescent coupling does not require precise matching of the fiber and PLC waveguide modes shapes for low loss coupling, it does require matching propagation constants of the fiber and PLC waveguide guided waves. In evanescent coupling, the optical power transfer mechanism occurs all along an interface that is typically parallel to the direction of the travel of the guided mode, as opposed to end-to-end coupling where the power transfer occurs abruptly at an interface perpendicular to the direction of travel of the guided mode.

Evanescent optical couplers used to optically couple optical fibers to PLC waveguides of a PLC require both coarse and fine alignment to obtain high coupling efficiency (i.e., a low-loss connection) between the fibers and the PLC waveguides. In addition, it is advantageous that the connectors used to form the evanescent optical coupler can be readily connected and disconnected.

SUMMARY

An embodiment of the disclosure is directed to an optical interconnection device for establishing evanescent optical coupling between optical fibers and optical waveguides of a photonic lightwave circuit (PLC). The device comprises: a) an alignment ferrule assembly comprising: i) an alignment substrate having a front-end section with a front end, a top surface, a bottom surface and a substrate central axis; ii) an array of optical fibers, with each optical fiber having a fiber central axis and an end section with a glass portion defined by glass core, a glass inner cladding and a glass-portion surface that resides immediately adjacent the glass core, and wherein the end sections of the optical fibers are secured to the bottom surface of the alignment substrate with the glass-portion surfaces facing away from the bottom surface of the alignment substrate and with the fiber central axes aligned with the substrate central axis; and b) an alignment assembly comprising: a planar support member having a back-end section with a back end, a top surface and a bottom surface, first and second spaced-apart guide-feature support members that downwardly depend from the bottom surface of the planar support member and that respectively support first guide features; and a receiving region between the first and second guide features in which the alignment substrate of the alignment ferrule assembly is secured.

Another embodiment of the disclosure an evanescent optical coupler comprising: the optical interconnection device as described immediately above as a first optical interconnection device; a second optical interconnection device comprising: a planar lightwave circuit (PLC) that operably supports PLC optical waveguides; and an adapter operably supported by the PLC; and wherein the adapter is configured to matingly engage the alignment assembly of the first optical interconnection device to place the optical fibers and the optical waveguides in evanescent optical communication.

Another embodiment of the disclosure is an optical interconnection device for establishing evanescent optical coupling between an array of optical waveguides and an array of optical fibers. The device comprises: a PLC having a surface and that supports the array of optical waveguides, wherein the array has first and second sides; an adapter having an interior, spaced apart first and second tabs and spaced apart first and second arms each having a first guide feature, wherein the first and second tabs of the adapter are attached to the surface of the PLC adjacent and outboard of the first and second sides of the array of waveguides; a stop fixture comprising a recess with an inside edge, the stop fixture attached to the surface of the PLC and within the interior of the adapter and relative to the optical waveguide array, with the recess defining an alignment surface.

Another embodiment of the disclosure is an evanescent optical coupler, comprising: the optical interconnection device as described immediately above as a first optical interconnection device; a second optical interconnection device comprising: an alignment ferrule assembly comprising an alignment substrate having a substrate central axis and that supports an array of optical fibers; an alignment assembly that operably supports the alignment ferrule assembly; and wherein the adapter is configured to matingly engage with the alignment assembly of the second optical interconnection device to place the optical fibers and the optical waveguides in evanescent optical communication.

Another embodiment of the disclosure is a method of forming an alignment ferrule assembly. The method comprises: drawing a glass preform to form a long glass member having a longitudinal axis, wherein the glass preform has at least one perform precision feature that defines at least one long glass member precision feature; cutting the long glass member in a direction substantially perpendicular to the longitudinal axis to form an alignment substrate having at least one substrate precision feature defined by the at least one long glass sheet precision feature and further comprising a planar surface; and securing a plurality of optical fibers to the planar surface.

Another embodiment of the disclosure is a method of forming alignment ferrule assembly. The method comprises: securing a plurality of optical fibers to a bottom surface of a planar alignment substrate so that the optical fibers run substantially parallel to the substrate axis and have a pitch P, wherein the planar alignment substrate has one or more edges; and forming at least one alignment bump on at least one of the edges.

Another embodiment of the disclosure is a method of forming a first optical interconnection device configured to receive a second optical interconnection device having an alignment ferrule assembly that supports an array of optical fibers having a pitch P, comprising: providing a planar lightwave circuit (PLC) comprising a PLC substrate having a planar surface and that supports an array of PLC waveguides having the pitch P; and securing a stop fixture to the planar surface and relative to the array of PLC waveguides so that the array of optical fibers and the array of PLC optical waveguides are operably aligned when the alignment ferrule assembly contacts the stop fixture.

Additional features and advantages will be set forth in the detailed description which follows, and, in part, will be apparent to those skilled in the art from that description or recognized by practicing the embodiments as described herein, including the detailed description which follows the claims, as well as the appended drawings.

It is to be understood that both the foregoing general description and the following detailed description are merely exemplary and are intended to provide an overview or framework to understanding the nature and character of the claims. The accompanying drawings are included to provide a further understanding, and are incorporated in and constitute a part of this specification. The drawings illustrate one or more embodiments, and together with the description explain the principles and operation of the various embodiments.

BRIEF DESCRIPTION OF THE DRAWINGS

FIG. 3A is a top elevated and partially exploded view and FIG. 3B is a top elevated assembled view of an example alignment assembly as disclosed herein.

FIGS. 4A and 4B are similar to FIG. 3B and shows the alignment assembly with a latch member.

FIG. 5A is a top elevated view that shows the alignment assembly of FIG. 4B operably disposed above an alignment ferrule assembly in preparation to form the plug connector, while FIG. 5B shows the assembled plug connector.

FIG. 6A is a top elevated partially exploded view and FIG. 6B is assembled view of an example PLC.

FIG. 6C is a close-up cross-sectional view of the PLC substrate of the PLC showing the core of the PLC waveguide and the cladding of the PLC waveguide as defined by the portion of the PLC substrate immediately surrounding the PLC waveguide core.

FIGS. 14A and 14B are cross-sectional views of an example ferrule assembly wherein the glass portion of each fiber has a keyhole cross-sectional shape.

FIG. 15 is a cross-sectional view of an example alignment ferrule assembly engaged with an example PLC, with a bump on the edge of the alignment substrate contacting a stop fixture of the PLC to define a select alignment offset.

FIG. 20 is similar to FIG. 18B and an example of a glass sheet having an angled edge.

FIG. 34B shows the resulting plug connector formed by interfacing the alignment assembly and alignment ferrule assembly of FIG. 34A.

FIG. 35A is a side view of the plug connector of FIG. 34B in position relative to an example PLC to form an evanescent optical coupler, wherein the PLC includes an example receptacle assembly that utilizes alignment tubes.

FIG. 35B shows the evanescent optical coupler formed by operably engaging the plug connector and the PLC of FIG. 35A.

DETAILED DESCRIPTION

Figure 1A:
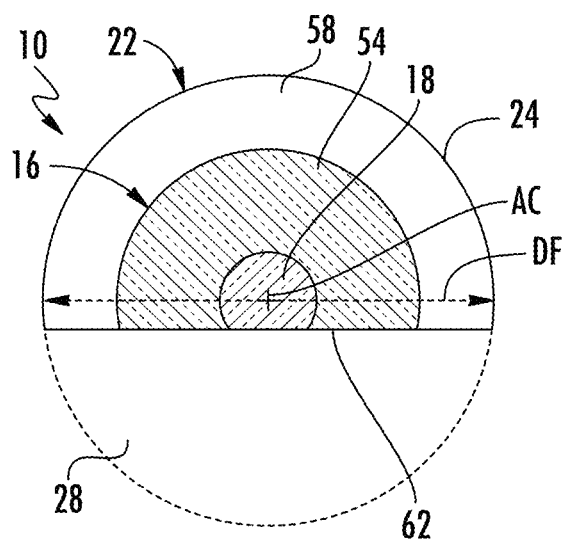
FIGS. 1A and 1B are cross-sectional views of two example polymer-clad D-shaped optical fibers ("fibers") used to form the evanescent optical couplers disclosed herein.

Reference will now be made in detail to the present embodiments, examples of which are illustrated in the accompanying drawings. Whenever possible, the same reference numerals will be used throughout the drawings to refer to the same or like parts.

Cartesian coordinates are used in some of the Figures for reference and are not intended to be limiting as to direction or orientation.

For purposes of description herein, the terms "upper," "lower," "right," "left," "rear," "front," "vertical," "horizontal," "top," "bottom," "side," and derivatives thereof, shall relate to the disclosure as oriented with respect to the Cartesian coordinates in the corresponding Figure, unless stated otherwise. However, it is to be understood that the disclosure may assume various alternative orientations, except where expressly specified to the contrary.

The term "mode" is short for "guided mode," which describes an allowed spatial distribution of light that propagates in a waveguide, whether it be an optical fiber or substrate-based PLC waveguide. A mode can have a transverse electric (TE) polarization or a transverse magnetic (TM) polarization. A single mode PLC waveguide supports only one TE and one TM mode. Modes are identified by a mode number m, where m=0 is the fundamental mode and m=1, 2, 3, . . . are higher-order modes.

The abbreviation "nm" stands for "nanometer," which is $1 \times 10^{-9}$ meter.

The abbreviation "μm" stands for "micron" or "micrometer," which is $1 \times 10^{-9}$ meter.

It is also to be understood that the specific devices and processes illustrated in the attached drawings, and described in the following specification, are simply exemplary embodiments of the inventive concepts defined in the appended claims. Hence, specific dimensions and other physical characteristics relating to the embodiments disclosed herein are not to be considered as limiting unless the claims expressly state otherwise. Additionally, embodiments depicted in the figures may not be to scale or may incorporate features of more than one embodiment.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

The term "comprises" as used herein, such as in the phrase "A comprises B," is intended to include as a special case "A consists of B."

The terms "plug connector" and "receptacle connector" are used below for convenience to discern between male and female optical interconnection devices used to establish evanescent optical coupling (i.e., evanescent optical communication) between fibers and PLC waveguides. The term "connector" is used herein as shorthand for "optical interconnection device." Thus, a plug connector can be referred to as a first optical interconnection device or a plug optical interconnection device while a receptacle connector can be referred to as a second optical interconnection device or a receptacle optical interconnection device.

Example Polymer-Clad Fibers

Figure 1B:
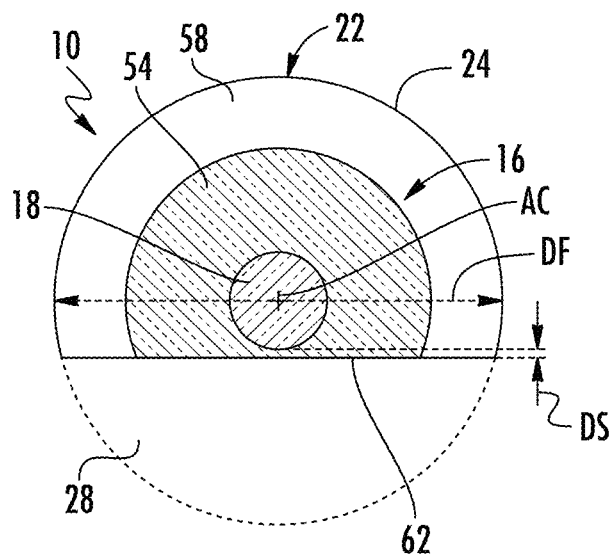

FIGS. 1A and 1B are cross-sectional views of two example polymer-clad optical fibers ("fiber") 10. The fiber 10 includes a central axis AC and has an overall diameter DF. The fiber 10 includes a glass portion 16 defined by a glass core 18 of refractive index $n_{co}$ and a glass inner cladding 54 of refractive index $n_{cl}$, where $n_{co} > n_{cl}$.

The fiber 10 is a preferably a single mode fiber. In an example, the fiber 10 can be a small diameter few-moded fiber, such as a fiber that is designed to support only a few guided modes. In the examples below, the fiber 10 is assumed to be single mode unless otherwise stated. A typical single mode fiber can have a core refractive index $n_{co}$ of 1.4491 and a cladding refractive index $n_{cl}$ of 1.444 at a wavelength of 1550 nm. Thus, a typical range on the effective index $N_F$ of a conventional single mode fiber is $1.444 < N_F < 1.4491$. However, as discussed below, the fiber 10 disclosed herein has substantially higher core and cladding refractive indices $n_{co}$ and $n_{cl}$ obtained for example via updoping of the core and cladding glass material.

The fiber 10 includes an outer cladding 58 positioned around the glass portion 16 and in particular around the glass inner cladding 54. The outer cladding 58 is made of a polymer and so is referred to hereinafter as the polymeric outer cladding 58 to distinguish from the glass inner cladding 54. The combination of the glass core 18, the glass inner cladding 54 and the polymeric outer cladding 58 is what makes the fiber 10 a polymer-clad optical fiber.

The polymeric outer cladding 58 can be composed of two parts: an inner, softer layer and an outer harder layer. The polymeric material that makes up the polymeric outer cladding 58 may include high density acrylate, low density acrylate, polyethylene, polystyrene, polymethylmethacrylate, nylon, silicone, silicone based materials, fluorinated acrylates, polyimide, ethylene tetrafluoroethylene, fluoroacrylate, fluoromethacrylate and combinations thereof. The polymeric material may be optically transparent. The polymeric outer cladding 58 may have a diameter ranging from between about 10 μm and about 900 μm, between about 80 μm and about 250 μm or between about 100 μm and 150 μm.

The glass inner cladding 54 and the polymeric outer cladding 58 cooperate to form a cladding 22 disposed around the core 18. The fiber 10 has an outer surface 24, which can be defined either by: i) the polymeric outer cladding 58; ii) a portion of the polymeric outer cladding 58 and a portion of the glass inner cladding 54; or iii) a portion of the polymeric outer cladding 58 and a portion of the glass inner cladding 54 and a portion of the core 18.

The core 18 may be composed of pure silica, doped silica (e.g., doped with germanium, aluminum, titanium, and/or chlorine) and/or other optically transparent materials. The glass inner cladding 54 may be composed of pure silica, doped silica (e.g., fluorine, boron, and/or titanium) or other optically transparent materials. The selective doping of the core 18 and the glass inner cladding 54 used to form an evanescent optical coupler with suitably high coupling efficiency CE is described in greater detail below.

Figure 2A:
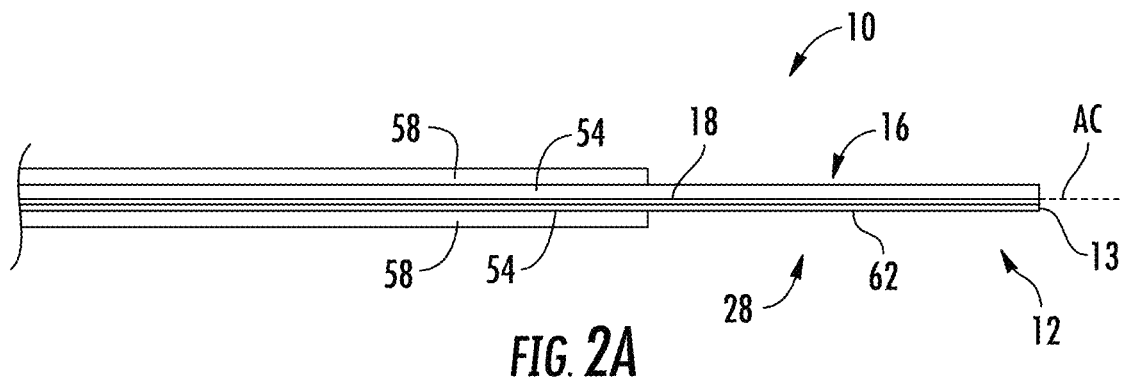
FIGS. 2A and 2B are side views of an end section of the example fiber of FIG. 1B that shows a stripped end portion of an example fiber used to form the evanescent optical coupler disclosed herein.
Figure 2B:
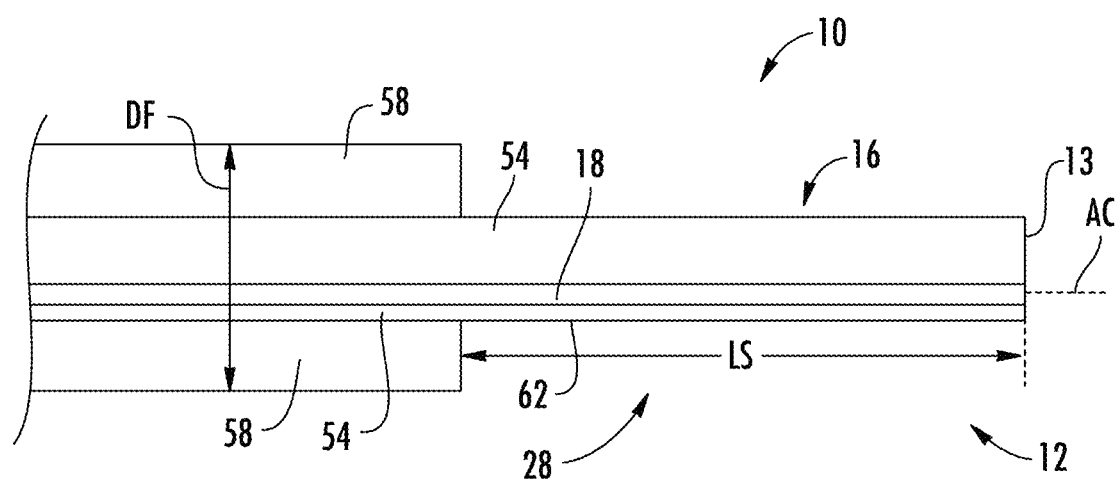

The glass portion 16 has a glass-portion surface 62 that can be exposed when the end section 12 of the fiber 10 (shown in FIGS. 2A and 2B) is processed to remove some of the polymeric outer cladding 58 to form a stripped end portion 28 (also shown in FIGS. 2A and 2B). In an example, this removal process is carried out prior to drawing the fiber 10. In another example, this removal process is carried out after fiber fabrication by locally ablating, etching and/or polishing down the fiber. Note that in some examples, the glass-portion surface 62 is formed by only the glass inner cladding 54 (FIG. 1B), while in other examples the glass-portion surface is formed by both the glass inner cladding and the core 18 (FIG. 1A). The glass-portion surface 62 may be flat and run parallel to the central axis AC of the fiber 10 and/or may extend coaxially with the fiber for either a portion of the fiber 10 or the entire length of the fiber. In examples, the glass inner cladding 54 along with the flat glass-portion surface 62 gives the fiber 10 a "D" shape, especially at the stripped end portion 28. In FIG. 1A, the core 18 resides at the flat glass-portion surface 62. In FIG. 1B, the core 18 resides a distance DS from the flat glass-portion surface. In general, the distance DS is in the range 0 μm≤DS≤4 μm, where the case of DS=0 is shown in FIG. 1A. Note that in the example of FIG. 1A, the flat glass-portion surface 62 can cut into an otherwise round core 18 so that the core can have a D shape and be part of the flat glass-portion surface 62. In an example, the glass core 18 is centered on the central axis.

As noted above, the fiber 10 is single mode, i.e., is configured to support only the fundamental mode at an operating wavelength λ, which in an example can be one of the known fiber telecommunication wavelengths as noted above. Since the fiber 10 is single mode, it has only a single fiber effective index $N_F$ and thus a single fiber propagation constant $\beta_F$. As discussed in greater detail below, the fiber effective index $N_F$ can fall within a range $N_F$ from a target fiber effective index value due to fiber manufacturing variations, including variations in the updoping of the fiber 10.

Note that a variation in the fiber effective index $N_F$ translates into a variation in the fiber propagation constant $\beta_F$ over a corresponding range $\Delta\beta_F$.

Figure 2C:
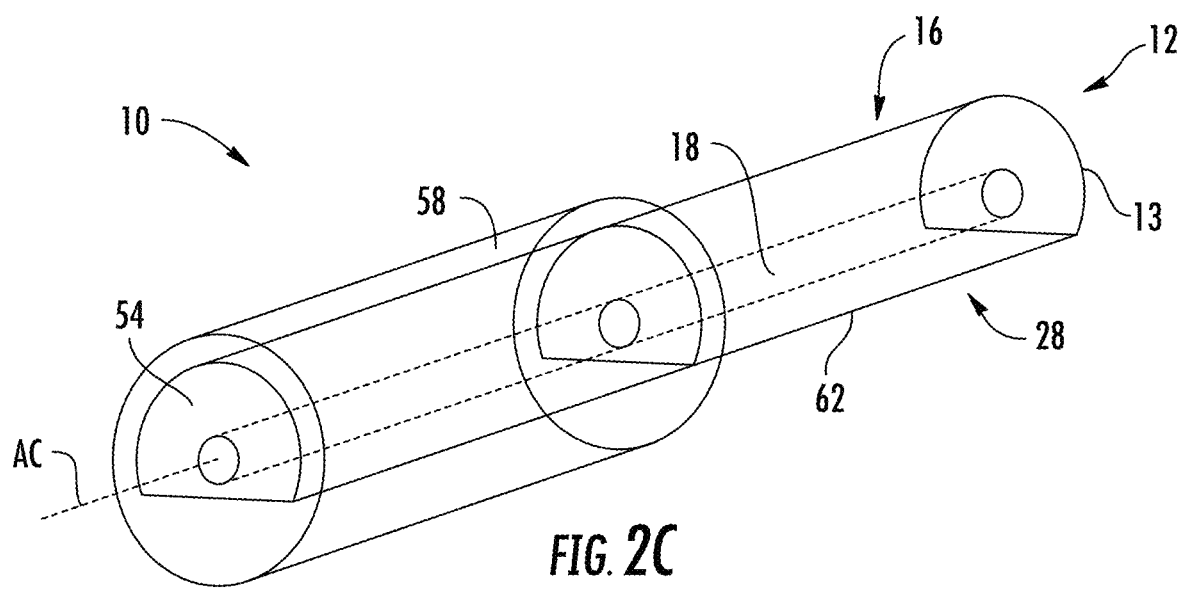
FIG. 2C is a back elevated view of the end section of the example fiber of FIGS. 2A and 2B.

FIGS. 2A and 2B are side views and FIG. 2C is a front elevated view of an end section 12 of the example fiber 10 of FIG. 1B and these Figures show the stripped end portion 28. The stripped end portion 28 has an axial length LS (FIG. 2B). The end section 12 includes a tip 13.

Figure 2D:
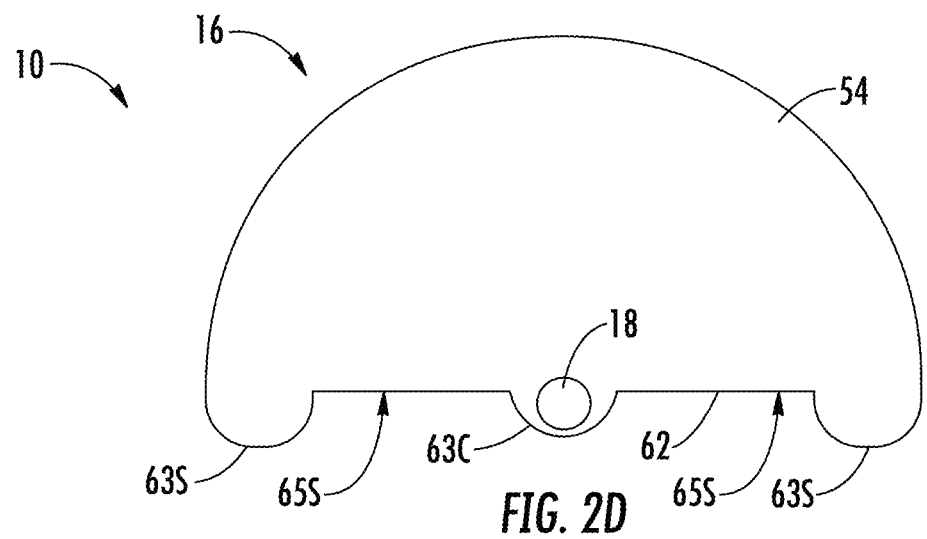
FIG. 2D is a cross-sectional view of an example glass portion of an example optical fiber, wherein the glass portion includes protrusions that define longitudinal recess that are useful for channeling contaminants away from where evanescent coupling with the core takes place when the fiber is interfaces with a PLC waveguide.

FIG. 2D is a cross-sectional view of an example glass portion 16 wherein the otherwise flat glass-portion surface 62 includes a central protrusion 63C that includes at least a portion of the core 18 and also includes two side protrusions 63S spaced apart from the central protrusion. The central protrusion 63C and the two side protrusions 63S define two longitudinal recesses 65S in which contaminants (particles) can move when the fiber 10 is operably engaged with waveguides of a PLC, as described below. Particle movement into the recesses 65S and away from the contact points established by the central protrusion 63C and side protrusions 63S may be enhanced by providing a liquid medium (not shown) at the fiber-PLC interface during mating. For example, the liquid medium may be an index-matching liquid that is permanent (e.g., an index matching gel) or temporary (e.g., isopropyl alcohol, which will evaporate rapidly after mating).

Plug Connector

FIG. 3A is a top elevated and partially exploded view and FIG. 3B is a top elevated assembled view of an example alignment assembly 104P used to form a plug-type optical interconnection device or "plug connector" 100P as shown in FIG. 5A, introduced and disclosed herein. The term "plug connector" is used to distinguish from a receptacle connector introduced and discussed below.

The alignment assembly 104P includes a housing 110 having a front end 112, a back end 114, a top side 116, a bottom side 118, and an assembly axis A1 that runs in the z-direction. The top side 116 is defined by a planar top member 130 with a front-end section 131 having a front end 132, a back-end section 133 having a back end 134, a top surface 136, a bottom surface 138, and opposite edges 140. The planar member 130 supports two catch features ("catches") 150 that extend outwardly from the edges 140 and that reside close to the front end 132, while another catch 150 resides on the top surface 136 adjacent the back end 134. The housing 110 also includes a planar bottom member 160 having a front end 162, a back end 164, a top surface 166, a bottom surface 168 and opposite edges 170.

The planar bottom member 160 is attached to the planar top member 130 by two spaced apart guide-feature support members 200. Each guide-feature support member 200 includes a front end 202, a back end 204, a top side 206, bottom side 208, and opposite inner and outer sides 210a and 210b. The bottom sides 208 of the guide-feature support members are attached to the top surface 166 of the planar bottom member 160 close to the respective edges 170, while the top sides 206 are attached to the bottom surface 138 of the planar top member 130 close to the respective edges 140.

Each guide-feature support member 200 includes on the inner side 210a a housing channel 220, which in an example runs generally from the front end 202 to the back end 204. Each guide-feature support member 200 also includes on the outer side 210b a guide feature 224, which in an example also runs generally from the front end 202 to the back end 204. The front ends 202 of the two spaced-apart guide-feature support members 200 can extend beyond the front end 132 of the planar top member 130, with the inner sides 210a defining a receiving area 240. The example guide feature 224 is raised, which makes the connector a plug connector. In another embodiment, the guide feature 224 can be recessed, so that the connector can also be configured as a receptacle connector. Each housing channel 220 has front end 222 that resides short of front end 202 of the guide-feature support member 200 and that these front ends acts as a stop.

With continuing reference to FIGS. 3A and 3B, the alignment assembly 104P further includes a carrier member 300 having a front end 302, a back end 304, a top side 306, a bottom side 308 and opposite edges 310. The back end 304 includes a resilient-member retaining feature 305, as explained in greater detail below. In an example, the top side 306 can be angled relative to the horizontal (x-z) plane. The bottom side 308 can also be angled and can include a step 312 adjacent the back end 304. Thus, in an example, the carrier member 300 can be generally wedge shaped. The carrier member 300 can also include raised guide features 324 respectively disposed on the opposite edges 310 and sized to operably engage the housing channels 220 of the guide-feature support members 200. This operable engagement can be sufficiently loose so that there can be movement of the carrier member 300 in the y-direction when the carrier member is subjected to a downward (−y-direction) force, as discussed below.

The alignment assembly 104P also includes a resilient member 350 with a front end 352 and a backend 354, and further includes a resilient-member retainer 400. The resilient-member retainer 400 includes a front end 402, a back end 404, and opposite edges 410. The front end 402 includes a retaining feature 403 while each of the opposite edges 410 includes a raised guide feature 414. In an example, the resilient member 350 comprises a spring and the retaining feature 403 is a post sized to engage the back end 354 of the spring.

The alignment assembly 104P is assembled by inserting the carrier member 300 into the back end 114 of the housing 110 and into the receiving area 240, with the raised guide features 324 engaging the housing channels 220 and moving forward until contacting the front ends of the housing channels. The resilient member 350 is then operably positioned with its front end 352 engaging the resilient-member retaining feature 305 of the carrier member 300 and the back end 354 engaging the resilient-member retaining feature 403 of the resilient-member retainer 400. The resilient-member retainer 400 is then urged toward the carrier member 300 so that it resides on or immediately adjacent the top surface 166 of the planar bottom member 160, with its raised guide features 424 residing within the housing channels 220 of the guide-feature support members 200.

Once the resilient-member retainer 400 is inserted into the housing 110, it is held in place using an adhesive and/or a retaining clip that allows it to snap into place. The resilient member 350 provides a force on the carrier member 300 during connector mating, as discussed below. Note that the carrier member 300 is slidingly engaged with the housing 110, with the front ends 222 of the housing channels limiting the forward movement of the carrier member. The resilient member 350 and the resilient-member retainer 400 thus make the carrier member spring loaded, so that the carrier member can also be referred to has the spring-loaded carrier member for convenience.

FIGS. 4A and 4B are similar to FIG. 3B and shows the alignment assembly 104P with a latch member 450 disposed toward the back end 114 of the alignment assembly. The latch member 450 has front end 452, a back end 454, a top side 456, a bottom side 458, and opposite edges 460. The latch member has an aperture 453 that extends from the front end 452 to the back end 454 and is sized to receive the planar top member 130. The latch member 450 also includes a pair of latch pins 470 that reside on the front end 452 adjacent the opposite edges 460 and the bottom side 458. The latch pins 470 that extend in substantially the same direction as the connector axis A1. The latch member 450 also includes a latch feature 474 on the top side 456 and adjacent the back end 454.

The latch member 450 is added to the alignment assembly 104P by inserting the back end 134 of the planar top member 130 through the aperture 453, whereupon the catch 150 engages the back end 454 of the latch member. This allows latch member 450 to slide along the planar top member 130 in the axial direction while the catch 150 prevents the latch member from sliding off the back end 134 of the planar member.

FIG. 5A is a top elevated view that shows alignment assembly 104P of FIG. 4B operably disposed above an alignment ferrule assembly 500, while FIG. 5B shows the assembled plug connector 100P formed by operably engaging the alignment assembly and the alignment ferrule assembly. The alignment ferrule assembly 500 includes an alignment substrate 510 having a front end 512, a back end 514, a top surface 516, a bottom surface 518, opposite edges 520, and a central axis A2. The alignment substrate 510 supports an array ("fiber array") 11 of the fibers 10 as discussed above. The end section 12 of each fiber 10 is supported on the bottom surface 518 of the alignment substrate 510 and runs in the direction of the central axis A2. The fibers 10 in the fiber array 11 have a fixed pitch P. In an example, a sheet of elastomeric material (not shown) can be disposed between the fibers 10 the bottom surface 518 of the alignment substrate 510 to help seat the fibers and to avoid the formation of gaps when interfacing with a PLC, as described below. In other examples discussed below, the bottom surface 518 can include V-grooves 519 (see, e.g., FIG. 15) in which the fibers 10 reside and which are configured to define the fiber spacing (pitch P) and to otherwise assist in securing and aligning the fibers to a reference, such as one of the edges 520 of the alignment substrate 510.

The front end 512 of the alignment substrate 510 can be angled, i.e., can have a V-shape defined by a front-end portion 512F of the alignment substrate having converging edges while a back-end portion 514B of the alignment substrate has generally parallel edges 520. The converging opposite edges in the front-end portion 512F can serve as exterior reference surfaces, which are precisely aligned relative to the array 11 of fibers 10.

An adhesive material 550 is provided to the top surface 516 of the alignment substrate 510. The housing 110 is then interfaced with the alignment ferrule assembly 500 by bringing the adhesive material 550 on the alignment ferrule assembly 500 into contact with the bottom side 308 of the carrier member 300. In an example, the angled step 312 of the carrier member 300 serves as a stop that contacts the back end 514 of the alignment substrate 510. The bottom side 308 and the angled step 312 of the carrier member 300 thus define a receiving region 316 where the alignment substrate 510 can be received by and secured to the alignment assembly 104.

The adhesive material 550 serves to secure the alignment ferrule assembly 500 to the carrier member 300. The wedge shape of the carrier member 300 allows for the bottom side 308 of the carrier member to flatly engage the alignment substrate 510 and the adhesive material 550 thereon while the housing 110 remains at an angle to the fiber array 11. In this configuration, the assembly axis A1 and the z-axis define a connection angle $\varphi$ in the y-z plane at which the plug connector 100P engages a corresponding receptacle connector, as explained below. In the plug connector 100P, the alignment ferrule assembly 500 is used to provide aligned fibers 10 while the alignment assembly 104P is used to provide an aligned alignment ferrule assembly 500. This is made possible by the above-described components of the alignment assembly 104P being precision-made components while the alignment substrate 510 is also a precision-made component.

As mentioned above, the converging opposite edges in the front-end portion 512F can serve as exterior reference surfaces, which are precisely aligned relative to the array 11 of the fibers 10. These edges align to mating features on the PLC receptacle so that the fibers 10 are precisely aligned to PLC waveguides 650. The alignment assembly 104P provides downward force on the aligned ferrule 500 to keep its fibers 10 in contact with the PLC waveguides 640 for efficient evanescent coupling. The alignment assembly 104P also provides coarse lateral alignment of the aligned ferrule, which is sufficient to guide the aligned fiber ferrule 500 front-end portion edges 512F into mating receptacle elements that are in turn precisely aligned to PLC waveguides.

Example methods of forming precision-made alignment substrates 510 and alignment ferrule assemblies are discussed below.

FIG. 6A is a top elevated partially exploded view and FIG. 6B is assembled view of a PLC 600. The PLC 600 comprises a PLC substrate 610 having a front end 612, a back end 614, a top surface 616, a bottom surface 618, opposite edges 620, and a PLC axis A3. The PLC substrate supports an array 630 of optical channel waveguides ("PLC waveguides") 640, which in the example shown start at the back end 614 and run substantially parallel to the PLC axis A3 and terminate just before reaching the front end 612 of the PLC substrate. In an example, the PLC waveguides 640 reside at or near the top surface 616, and further in the example, can constitute channel or rib PLC waveguides. The PLC waveguides 640 have the same pitch P as the optical fibers 10 of the alignment ferrule assembly 500. As best seen in the close-up view of FIG. 6C, each PLC waveguide 640 includes a waveguide core 641. The "cladding" of each PLC waveguide 640 is constituted by a portion 611 of the PLC substrate 610 that immediately surrounding the core 641. The array 630 of PLC waveguides 640 has first and second sides 632 defined by the two outermost PLC waveguides in the array.

The PLC 600 further includes stop fixture 660 attached to the top surface 616 of the PLC substrate 610. The stop fixture 660 can also be a raised feature on the PLC substrate, such as features created in etched layers of PLC substrate material, or patterned features created by photolithographic masking and etching, or molding. The stop fixture 660 has a front end 662, a back end 664, and top surface 666. The stop fixture 660 can also have a recess 663 open at the front end 662, with the recess having an inside edge 665. In the example shown, the recess 663 includes a V-shaped section 663V.

The stop fixture 660 is first coarse aligned and then fine aligned to the PLC waveguide 640 before securing the stop fixture to the top surface 616 using adhesive material 550, which in an example can be cured using ultraviolet light (i.e., is UV-curable). The coarse and fine alignment of the stop fixture 660 to the PLC waveguides 640 can be carried using various techniques. In one example, the alignment is active and utilizes a vision system 700 and alignment marks 710S on the stop fixture 660 and alignment marks 710P on the PLC substrate 610. In another example, the alignment is active and is performed using optical coupling of light into the PLC waveguides 640 by temporarily mating the stop fixture 660 with the fiber alignment ferrule assembly 500. The stop fixture 660 and the fiber alignment ferrule assembly 500 are then moved in unison during an optical power peaking operation involving translation and rotation relative to the PLC waveguides 640 while detecting the light outputted from the PLC waveguides.

In another example, the stop fixture 660 is passively aligned using raised stop fixtures 712 formed on the top surface 616 of the PLC substrate 610 during the fabrication of the PLC waveguides 640. The raised stop fixtures 712 can be formed using photoresist and can comprise for example photoresist islands or etched mesas. The raised stop fixtures 712 can also be formed using precision-formed recesses such as etched pits, or V-grooves into which precision elements (e.g., spheres, fibers, posts, etc.) can be disposed that can define a precision stop at the location of the precision-formed recesses. In an example, precision photolithographic techniques can be employed to form the raised stop fixtures 712 so that they can provide precise alignment of the stop fixture 660 on the PLC substrate 610.

After the stop fixture 600 is precisely aligned to the PLC waveguides 640, it is secured to the PLC substrate 610 using, for example, the adhesive material 550. The adhesive material 550 forms a thin bond line between the stop fixture 660 and the PLC substrate 610 that limits motion and misalignment of the stop fixture during curing.

Receptacle Connector

Figure 7A:
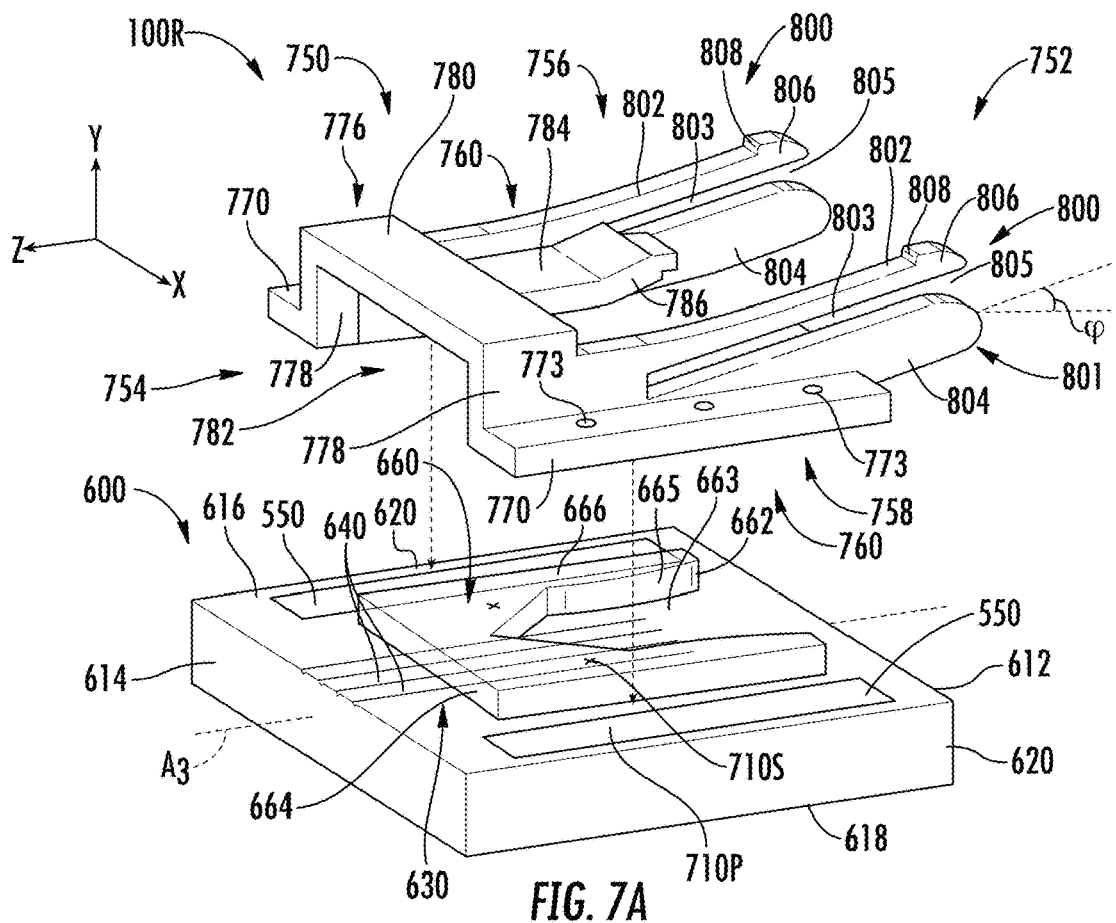
FIG. 7A is top-elevated partially exploded view and FIG. 7B is an assembled view of the PLC of FIG. 6B along with a receptacle adapter that together define a receptacle connector configured to matingly engage with the plug connector of FIG. 5B to define an evanescent optical coupler.
Figure 7B:
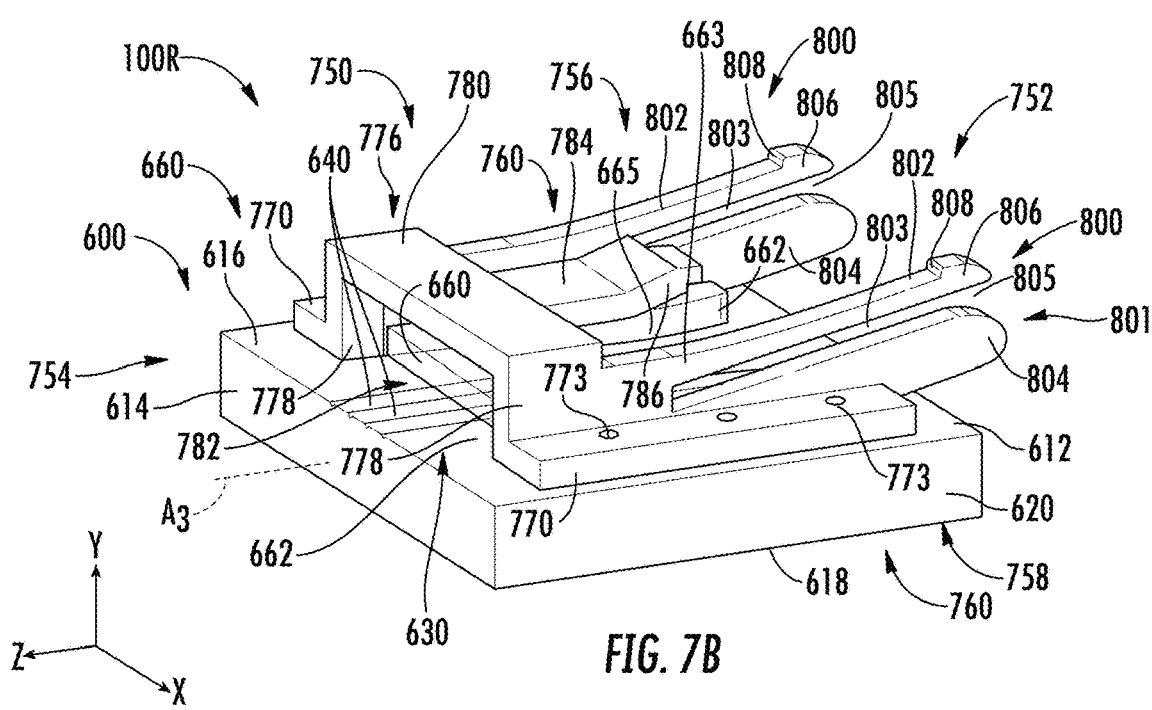

FIG. 7A is top-elevated partially exploded view and FIG. 7B is an assembled view of the PLC 600 of FIG. 6B along with a receptacle adapter 750 that together define a receptacle connector 100R configured to matingly engage with the alignment assembly 104P of the plug connector 100P to define an evanescent optical coupler, as explained further below.

The receptacle adapter 750 has a front end 752, a back end 754, a top side 756, a bottom side 758 and opposite edges 760. The receptacle connector has a two spaced apart support tabs 770 that run in the z-direction. The support tabs 770 are connected by a bridge section 776 that includes two vertical guide-feature support members 778 that reside on the respective inside edges of the support tabs 770. A horizontal cross member 780 connects the two vertical guide-feature support members 778 so that the bridge section 776 defines an open interior ("adapter interior") 782 of the adapter 750.

The receptacle adapter 750 includes two spaced apart arms 800 that respectively extend from the vertical guide-feature support members 778 and that further define the receptacle adapter interior 782. In an example, each arm 800 resides in a y-z plane and extends at the connection angle φ as measured in the y-z plane. In the present example, the connection angle φ>0, but the arms 800 need not be angled and in an example can extend directly the z-direction to provide a connection angle φ=0. In one example, each arm 800 has the form of a fork with an upper tine 802 and a lower tine 804 that define a guide feature 801 in the form of a guide slot 803. In an example, the guide slot 803 has a flared end 805. Also in an example, the upper tine 802 has a bulbous end 806 that includes a lip 808.

The receptacle adapter 750 also includes a bendable (flexible) tongue 784 that extends from the center of the raised cross member 780 in the general direction of the arms 800. In an example, the tongue 784 has an upwardly curved end section 786. In an example, the receptacle adapter 750 can be made of metal, and further in the example can be a unitary structure, i.e., is a single piece, as opposed to being an assembly made of multiple separate pieces. Note also that the arms 800 of the receptacle adapter 750 can be configured with a guide feature 801 in the form of a guide protrusion rather than a guide slot to make the receptacle adapter a plug adapter.

The receptacle adapter 750 is attached to the top surface 616 of the PLC substrate 610 with the stop fixture 660 residing at least partially within the adapter open interior 782. In one example, this is accomplished by placing adhesive material 550 on either side of the PLC waveguide array 630 and then bringing the support tabs 770 into contact with the adhesive material. In an example, the adhesive material 550 is UV-curable and is exposed to UV light to cure the adhesive material when proper alignment of the receptacle connector to the PLC 600 is achieved. The receptacle connector 100R can be actively and/or passively aligned with the PLC waveguides array 630 of the PLC 600 using the same active and passive alignment techniques described above.

In an example, UV curing of the adhesive material 550 can be facilitated by providing holes 773 in the support tabs 770. An adhesive material 550 that can be both UV and thermally cured can also be used, in which case the receptacle adapter 750 is initially tacked into position by UV curing the adhesive material in selected locations. After UV curing, the PLC substrate 610 and the receptacle adapter 750 are exposed to heat (e.g., placed in a thermal curing oven) to completely cure the adhesive material. The thin layer of adhesive material 550 joining the receptacle adapter 750 to the PLC substrate 610 is desirable to minimize shifts during UV and thermal curing. The resulting assembled structure of the PLC 600, stop fixture 660 and receptacle adapter 750 forms the resulting receptacle connector 100R, as shown in FIG. 7B.

Figure 8A:
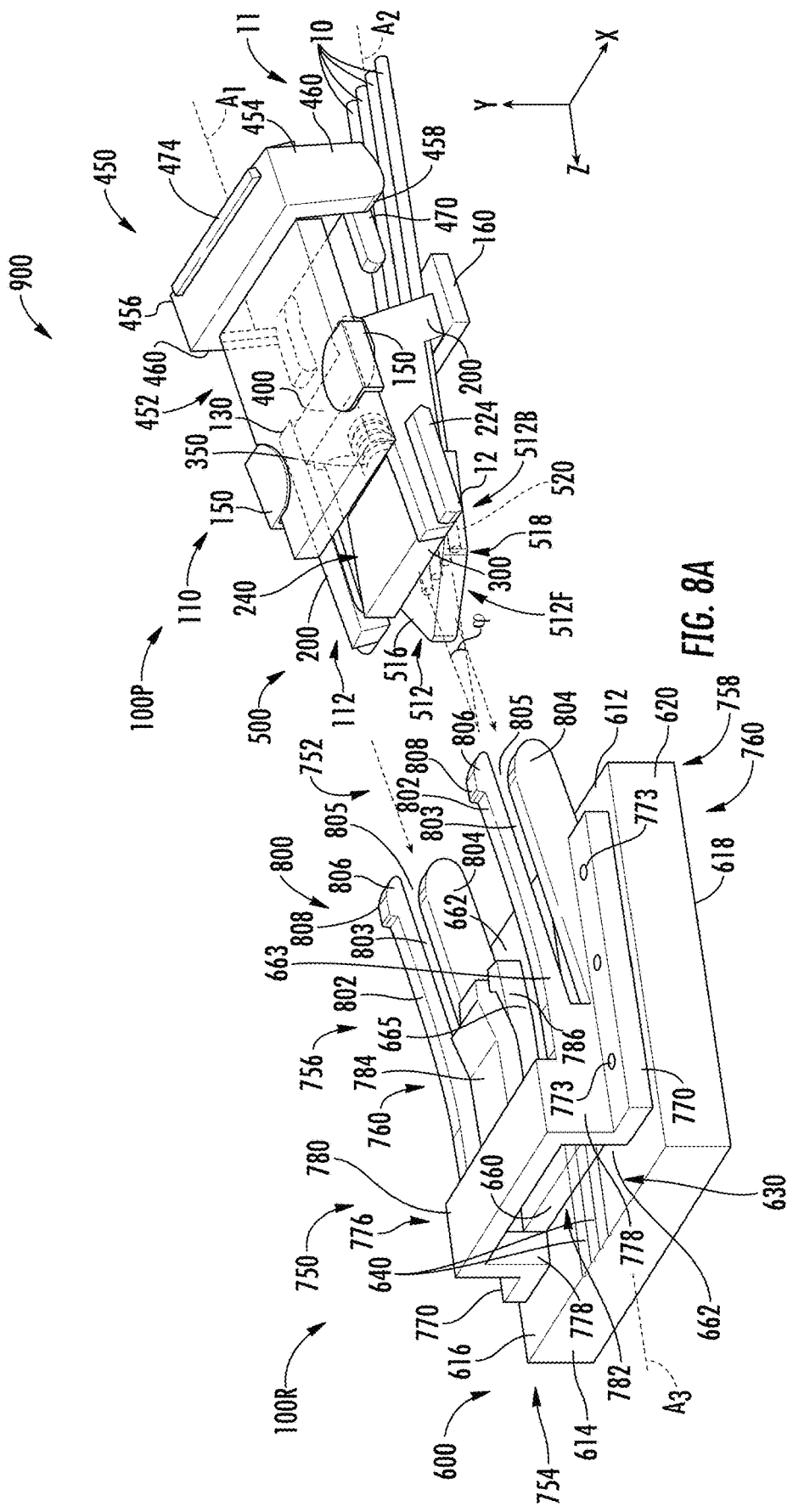
FIG. 8A shows the receptacle connector of FIG. 7B along with the plug connector arranged in position to operably engage the receptacle connector to form an evanescent optical coupler.
Figure 8B:
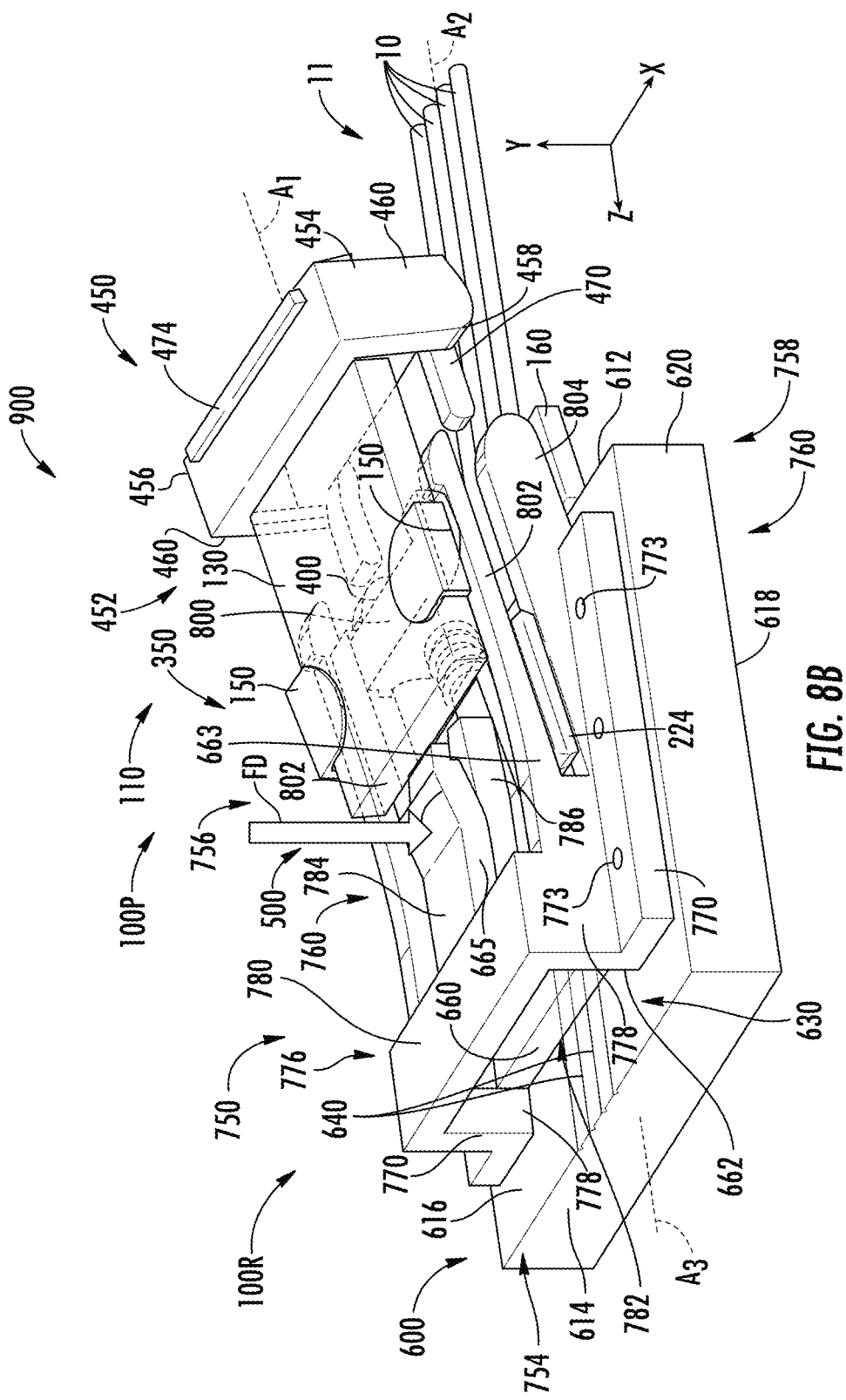
FIG. 8B is the same as FIG. 8A but shows the assembled evanescent optical coupler.
Figure 8C:
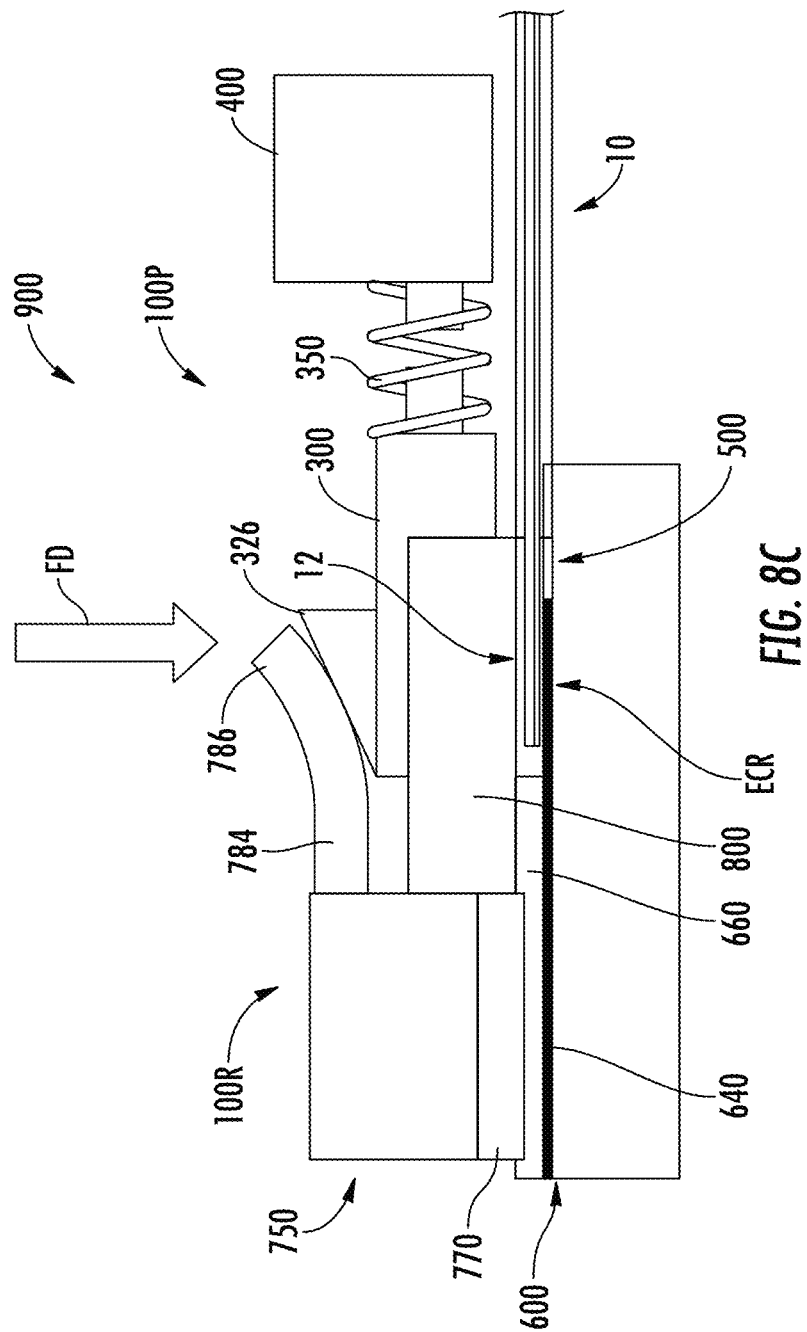
FIG. 8C is a cross-sectional view in the y-z plane of a simplified version of the evanescent optical coupler of FIG. 8B.

FIG. 8A shows the receptacle connector 100R of FIG. 7B along with the plug connector 100P arranged in position to operably engage the receptacle connector 100R to form an evanescent optical coupler 900. FIG. 8B is the same as FIG. 8A but shows the assembled evanescent optical coupler. FIG. 8C is a cross-sectional view in the y-z plane of a simplified version of the evanescent optical coupler 900 of FIG. 8B where coupling angle φ=0 and that shows an evanescent coupling region ECR where the end sections 12 of the fibers 10 and the PLC waveguides 640 overlap and are aligned and are in sufficiently close proximity to one another so that evanescent coupling can occur (i.e., the fibers and waveguides are in evanescent optical communication).

With reference again to FIGS. 8A and 8B, the plug connector 100P engages the receptacle connector 100R at the connection angle φ so that the raised guide features 224 on the guide-feature support members 200 of the housing 110 enter the corresponding guide slots 803 of the arms 800. The flared end 805 of the guide slot 803 helps align the raised guide features 224 into the guide slot. As the plug connector 100P and receptacle connector 100R are urged together, the bulbous ends 806 of the upper tines 802 pass through the respective catches 150 at the sides 150 of the planar top member 130 and cause the upper tines to deflected downward until the respective lips 808 pass through and engage the catches 150. Meanwhile, the wedge-shaped top side 306 of the carrier member 300 engages the tongue 784, which is resilient and applies a pressing force FD on the carrier member 300. This pressing force FD on the carrier member 300 is downward and presses the alignment substrate 510 of the alignment ferrule assembly 500 onto the PLC waveguides 630 supported by the PLC substrate 610. This in turn forces the end sections 12 of the optical fibers 10 to be close proximity to the PLC waveguides 640 of the PLC 100. The pressing force FD increases as the plug connector 100P is urged farther into the receptacle connector 100R and is maximum when the bulbous ends 806 and lips 808 of the upper tines 802 engage the catches 150 on the housing 110 of the plug connector 100P, as shown in FIG. 8B. As noted above, the precision fabrication of the various components of the plug connector 100P and the receptacle connector 100R result in precision alignment of the fibers 10 to the PLC waveguides 640 when the plug connector and receptacle connector matingly engage to form the evanescent optical connector 900.

Example configurations of the evanescent optical coupler 900 allow for the pressing force FD on the alignment ferrule assembly 500 to be applied late in the connector mating process, i.e., just as the connection is being completed. In one example, the angled front end section 512F of the alignment ferrule assembly 500 is operably positioned in the V-shaped section 663V of the recess 663 of the stop fixture 660, forced into position by compression of the resilient member 350. This ensures that the fibers 10 are already aligned to the PLC waveguides 640 of the PLC 600 prior to application of the pressing force FD. This approach ensures that after application of the pressing force FD on the alignment ferrule assembly 500, no additional lateral alignment of the fibers 10 is needed since at this point any relative movement risks damaging the PLC waveguides 640.

After full insertion of the plug connector 100P into the receptacle connector 100R, the fibers 10 are aligned to the PLC waveguides 640 and are firm contact therewith due to the pressing force FD of tongue 784. This pressing force FD also reduces any gaps that might otherwise occur between the fibers 10 and the PLC waveguides 640.

Figure 9:
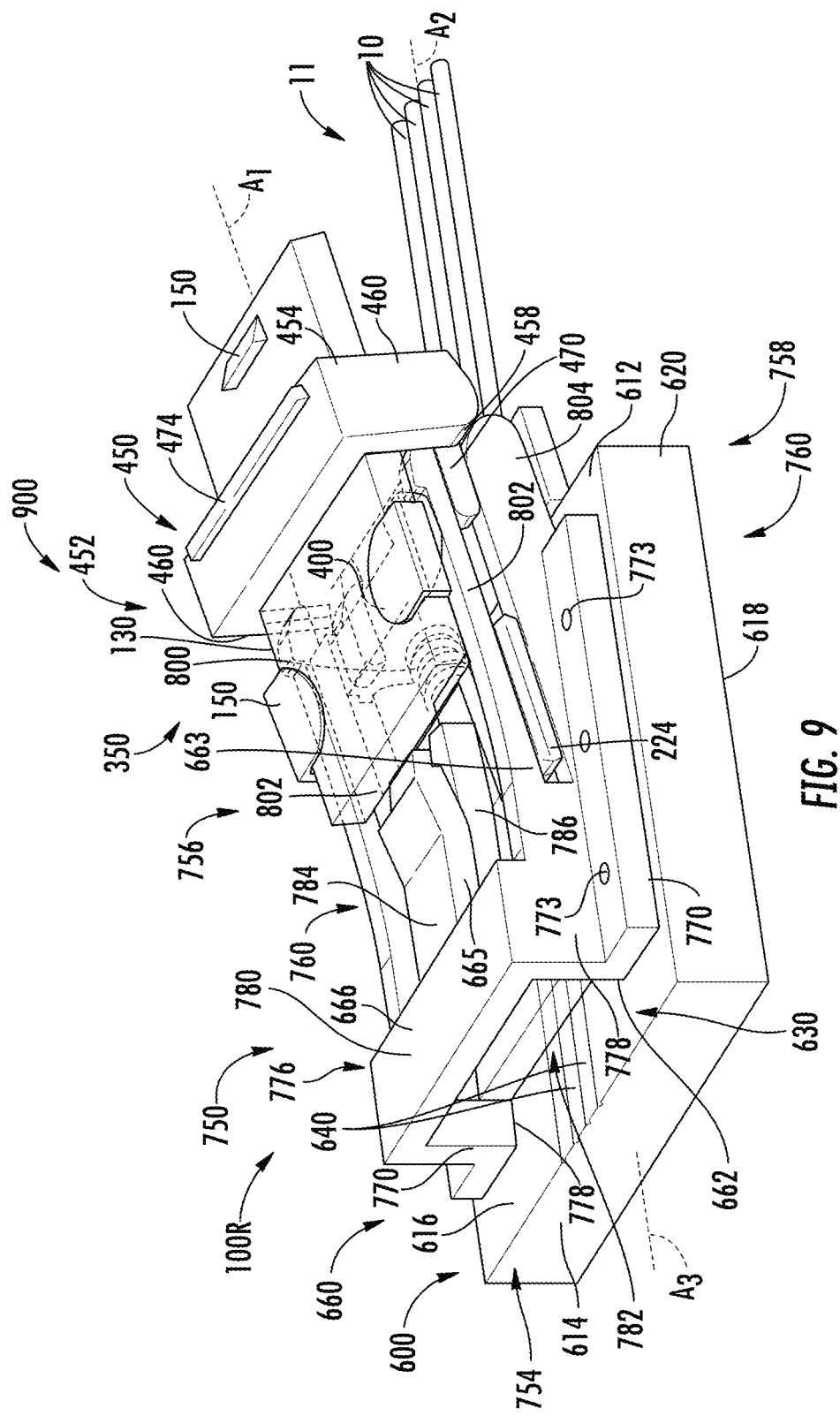
FIG. 9 is similar to FIG. 8B and shows the latch member in its latching position.

FIG. 9 is similar to FIG. 8B and shows the latch member 450 in its latching position, i.e., moved towards the front end 132 of the planar top member 130 so that the latch pins 470 reside in the guide slot 803 of the arms 800 of the receptacle adapter 750. This prevents the upper tines 802 of the arms 800 from being deflected downward, thereby locking the plug connector 100P to the receptacle connector 100R. To disengage the plug connector 100P from the receptacle connector 100R, the latch member 450 is moved toward the back end 134 of the planar top member 130 so that the latch pins 470 are removed from the guide slot 803. This allows the upper tines 802 of the arms 800 to be deflected downward, thereby releasing the lips 808 on the bulbous ends of the upper tines to be released from their respective catches 150 at the edges 140 of the planar top member 130.

Alternate Embodiments for Applying the Pressing Force

There are several other example embodiments for providing the pressing force FD on the alignment ferrule assembly 500, as depicted in the cross-sectional views of FIGS. 10A through 10G, below. In the alternate embodiments, the pressing force FD is applied either directly or indirectly to the carrier member 300, which transfers the pressing force to the alignment ferrule assembly 500 bonded to its bottom side 308. The pressing force FD closes any gaps gap between the optical fibers 10 and the PLC waveguides 540 of the PLC 100, ensuring consistent low loss optical coupling between the optical fibers and the PLC waveguides. Note that FIGS. 10A through 10C are similar to the simplified configuration of FIG. 8C where the connection angle $\varphi=0$, i.e., the mating engagement of the plug connector 100P and receptacle connector 100R is along the horizontal direction.

Figure 10A:
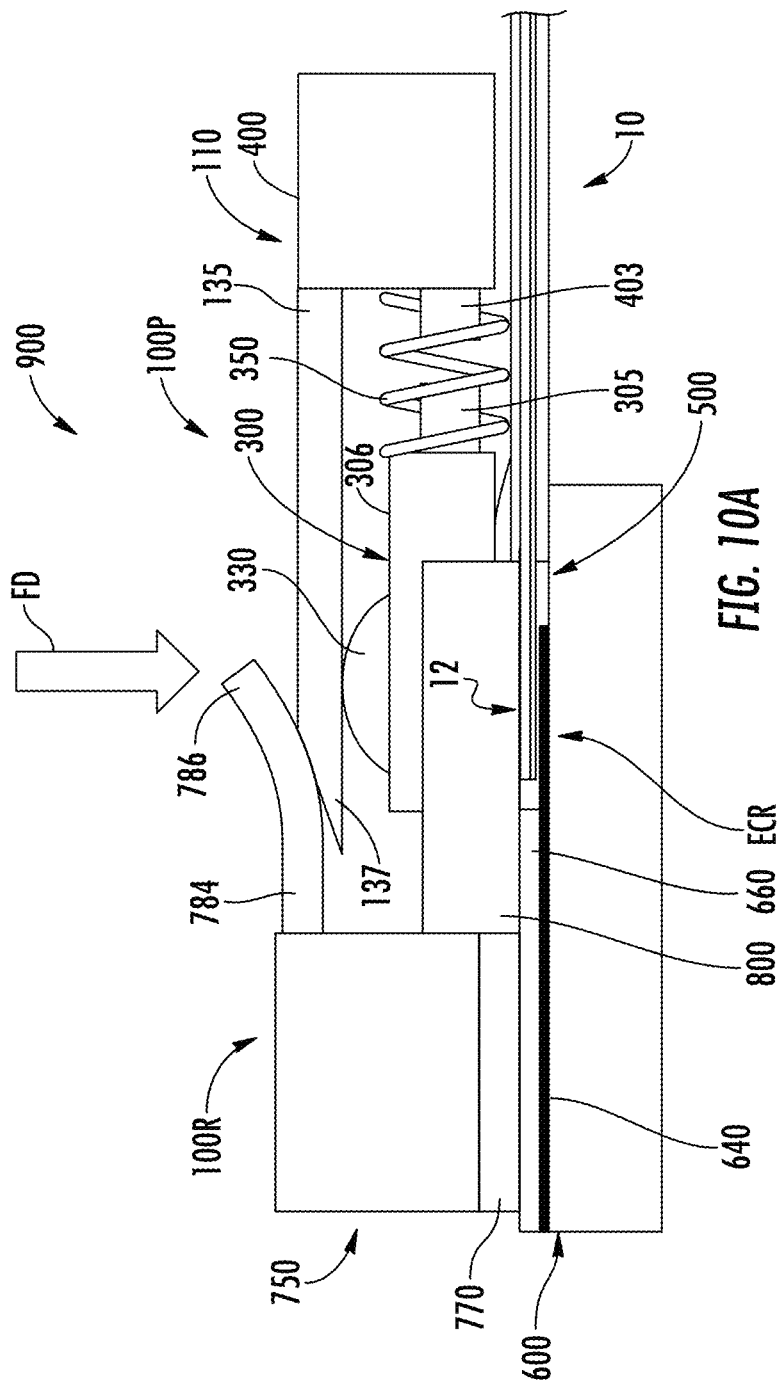
FIGS. 10A through 10G are cross-sectional views of example evanescent optical couplers illustrating different configurations for generating a pressing force for pressing the fibers and PLC waveguides together in the evanescent coupling region.

FIG. 10A illustrates an example embodiment of the evanescent optical coupler 900 wherein the housing 110 of the plug connector 100P includes a connector tongue 135, which in an example can extend from the front end 132 of the planar top member 130. The tongue 135 is configured to slip underneath the receptacle connector tongue 784 as the plug connector 100P and receptacle connector 100R are matingly engaged. In an example, the tongue 135 includes a wedge-shaped front end 137 to facilitate this process. In addition, the top side 306 of the carrier member 300 includes a contact feature 330, shown by way of example as being dome-shaped. The contact feature 330 is configured so that the pressing force FD from overlapping receptacle connector tongue 784 and connector tongue 135 is directed through the carrier member 300 to the alignment substrate 510 of the alignment ferrule assembly 500. The dome shape of the contact feature 330 provides strength while also allowing the alignment ferrule assembly 500 to be free to tip and tilt while the pressing force FD is applied so that any gaps between the optical fibers 10 and the PLC waveguides 640 are reduced or eliminated. The dome-shaped contact feature 330 of the carrier member 300 be applied to any of the alternate embodiments disclosed herein. Low friction surfaces, materials, and/or lubricants can be used to minimize in-plane frictional forces.

Figure 10B:
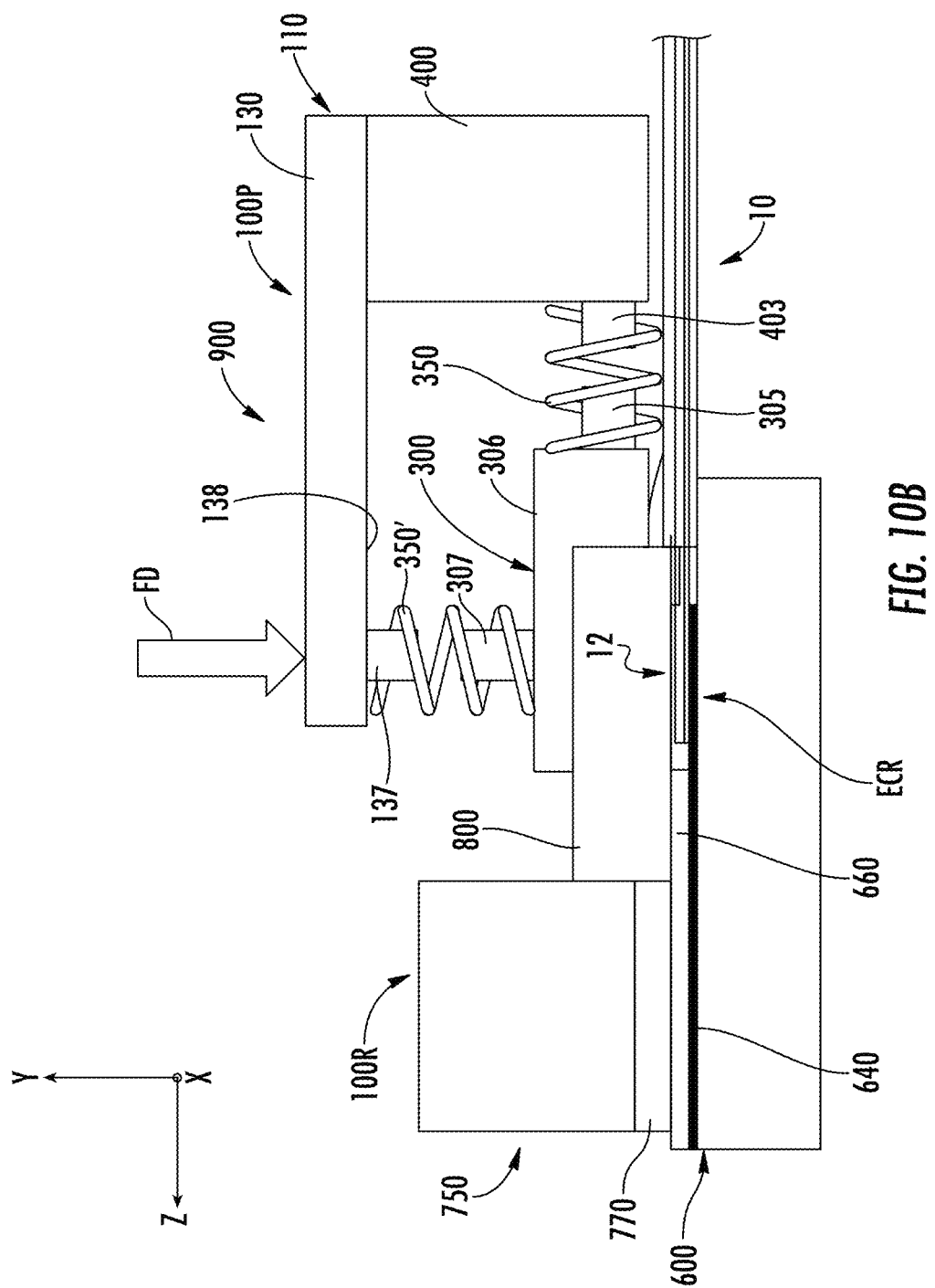
Figure 10C:
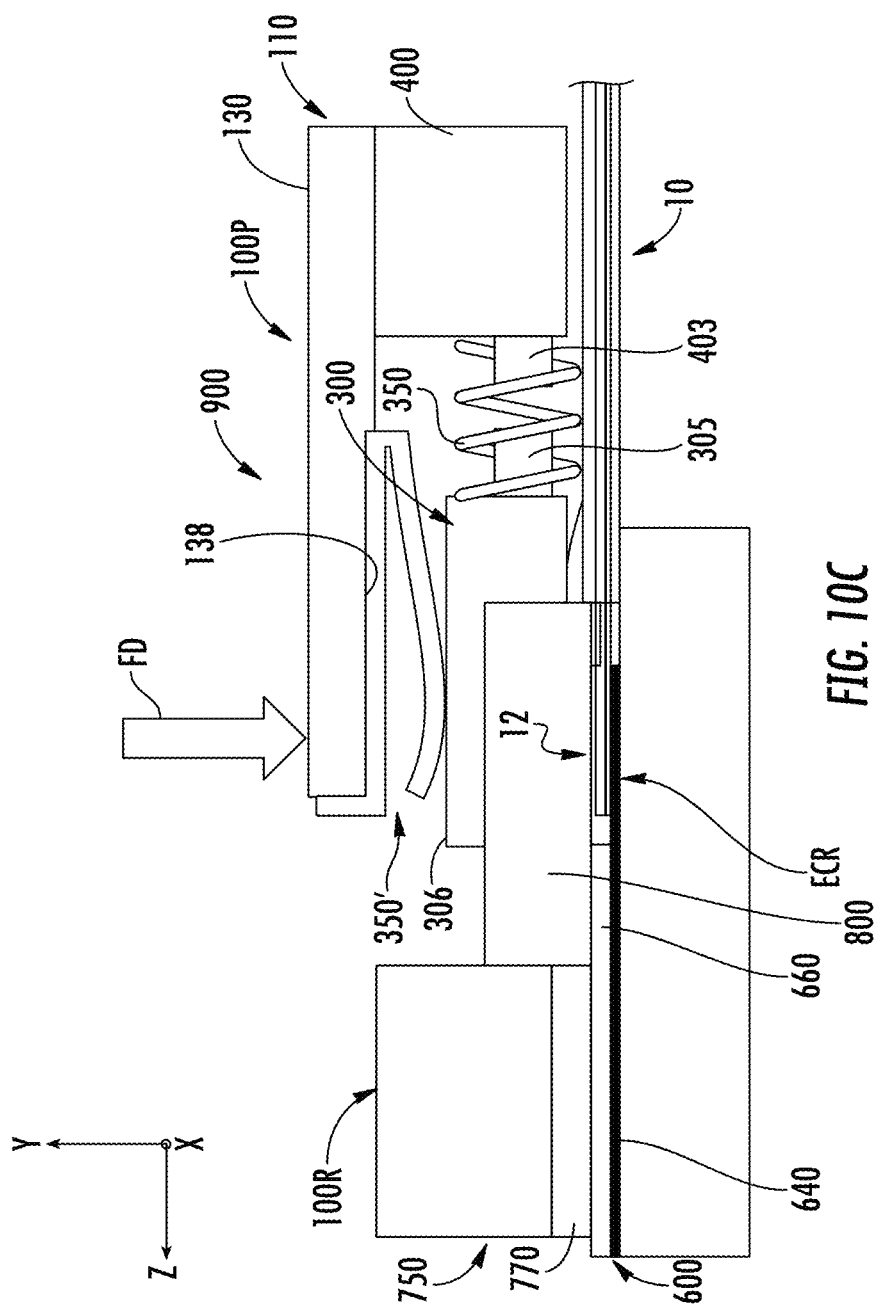

FIG. 10B is similar to FIG. 10A and shows another alternate embodiment of the evanescent optical coupler 900 wherein a second resilient member 350' is used to provide the pressing force FD. In this embodiment, there is no need for the receptacle connector tongue 784. Instead, the top side 306 of the carrier member 300 includes a resilient-member retaining feature 307 and the bottom surface 138 of the top planar member 130 also includes an opposing resilient-member retaining feature 137. A second resilient member 350 is operably supported in the y-direction by the two resilient-member retaining features 307 and 137. The spring constant of the first or horizontal resilient member 350 can be selected to be higher than the spring constant of the second or vertical spring member 350'. In this configuration, during the initial stage of the connector-receptacle mating process, the alignment ferrule assembly 500 is forced into contact with the stop fixture 660 by the first or horizontal resilient member 350. Later in the connector-receptacle mating process, the second or vertical resilient member 350' provides sufficient pressing force FD to drive the fibers 10 of alignment ferrule assembly 500 into aligned contact with the PLC waveguides 540 of the PLC 600 when the latch 450 is moved into the latching position (see FIG. 9).

In an example, the housing 110 can be designed to matingly engage the receptacle adapter 750 at a connection angle $\varphi>0$ as described above, so that the first or horizontal resilient member 350 is compressed first when the alignment ferrule assembly 500 first contacts the stop fixture 660, while the second or vertical resilient member 350' is compressed last, i.e., in late connector-receptacle connector mating process after the front end 512 alignment ferrule assembly 500 has contacted the stop fixture 600.

In the example of FIG. 10B, the first and second resilient members 350 and 350' are coiled springs by way of example. Other types of resilient members 350 and 350' can be used, such as resilient material. FIG. 10C is similar to FIG. 10B and shows a second resilient member 350' in the form of a spring sheet, which can be stamped and bent to fit into the space between the bottom surface 138 of the planer top member and the top side 306 of the carrier member 300.

Figure 10D:
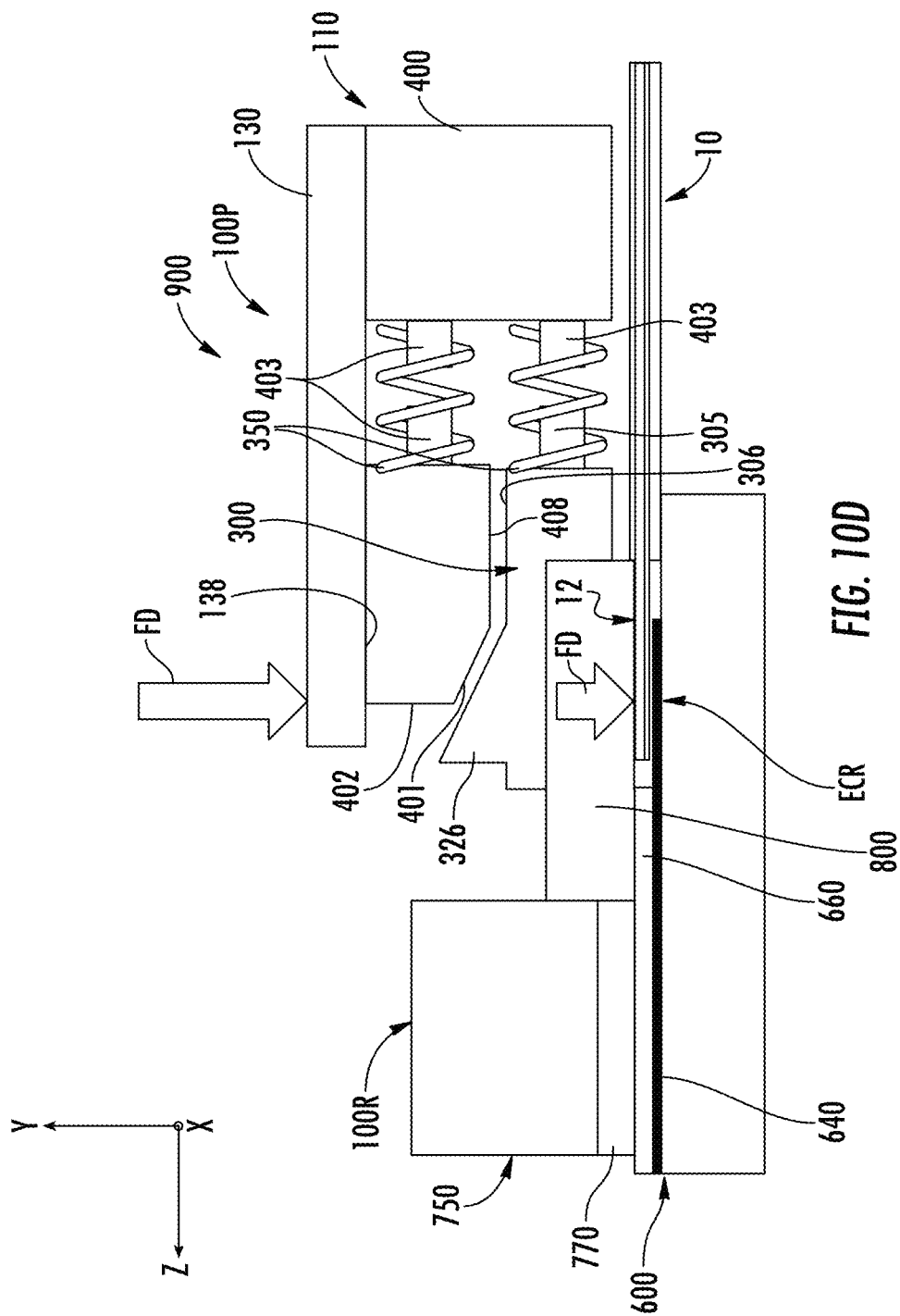

FIG. 10D is another cross-sectional view of an alternate embodiment of the evanescent optical coupler 900 that utilizes two horizontal resilient members 350 rather than one horizontal resilient member and one vertical resilient member. The alternate embodiment of FIG. 10D is useful when trying to reduce the vertical size of the evanescent optical coupler 900. In this alternate embodiment, the resilient-member retainer 400 includes two retaining features 403 that are spaced apart in the vertical direction. The lower retaining feature 403 is aligned with the retaining feature 305 at the back end 304 of the carrier member 300. The housing 110 also includes a second resilient-member retainer 400 attached to the bottom surface 138 of the planar top member 130 and that includes a retaining feature 403 that opposes the top retaining feature 403 of the first resilient-member retainer 400 at the back end 114 of the housing 110. The second resilient-member retainer 400 includes a bevel 401 where the front end 402 and the bottom side 408 meet. The top side 306 of the carrier member 300 includes a wedge feature 326 that resides towards the front end 302 of the carrier member and that is angled to match the bevel 401 of the second resilient-member retainer 400.

During the connector-receptacle mating process, the lower resilient member 350 applies a horizontal force that pushes the alignment ferrule assembly 500 into the stop fixture 660 while the upper resilient member 350 pushes the second resilient-member retainer horizontally so that the bevel 401 engages the wedge feature 326. This results in the creation of a pressing force FD on the carrier member 300, which pushes down on the alignment substrate 510 and the optical fibers 10 that reside underneath. The length and spring constant of the second or upper resilient member 350 can be selected so that pressing force FD is applied to the alignment ferrule assembly 500 late in the connector-receptacle connector mating process. This approach ensures that the alignment ferrule assembly 500 has already been forced into contact with the stop fixture prior to generating the pressing force FD. The latch 450 is used to secure the planar top member 130 in place to maintain the downward force FD.

Figure 10E:
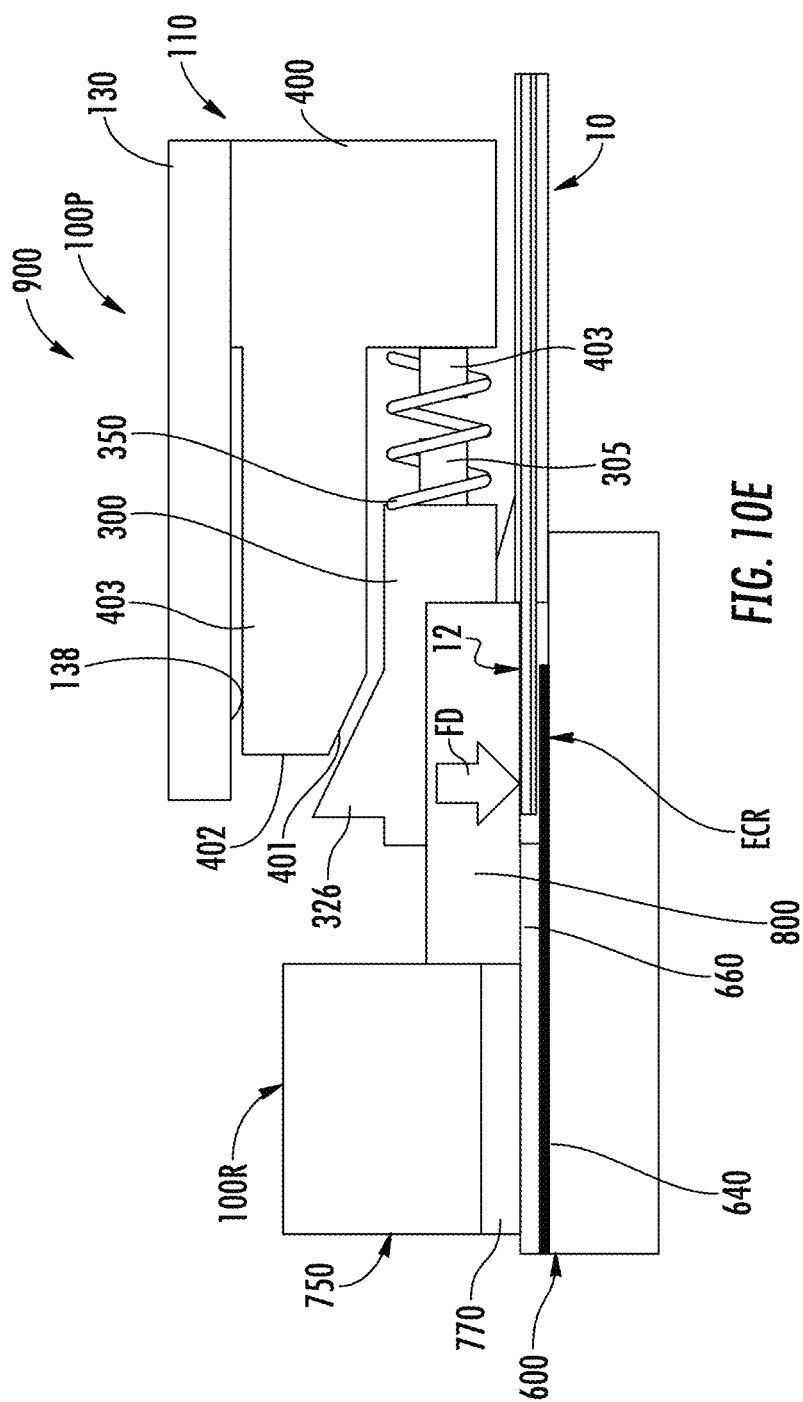

FIG. 10E is similar to FIG. 10D and illustrates another alternate embodiment of the evanescent optical coupler 900 wherein the upper resilient member 350 is removed and the upper resilient-member retainer 403 is extended in the y-direction and is now referred to as extension or beam 403. The extension 403 includes the bevel 401, which as in FIG. 10B resides adjacent the wedge feature 326 of the carrier member 300. This is equivalent to the embodiment of FIG. 10D where the upper resilient member 350 has an extremely high spring constant. The extension (beam) 403 is deflectable to provides an additional downward spring force when the bevel 401 presses against the wedge feature 326 of the carrier member 300. In this embodiment, the extension 403 becomes another example of a resilient member used to apply the pressing force FD on the alignment ferrule assembly through the intervening carrier member 300. As in the embodiment of FIG. 10D, the latch 450 is used to secure the planar top member 130 in place to maintain the downward force FD.

Figure 10F:
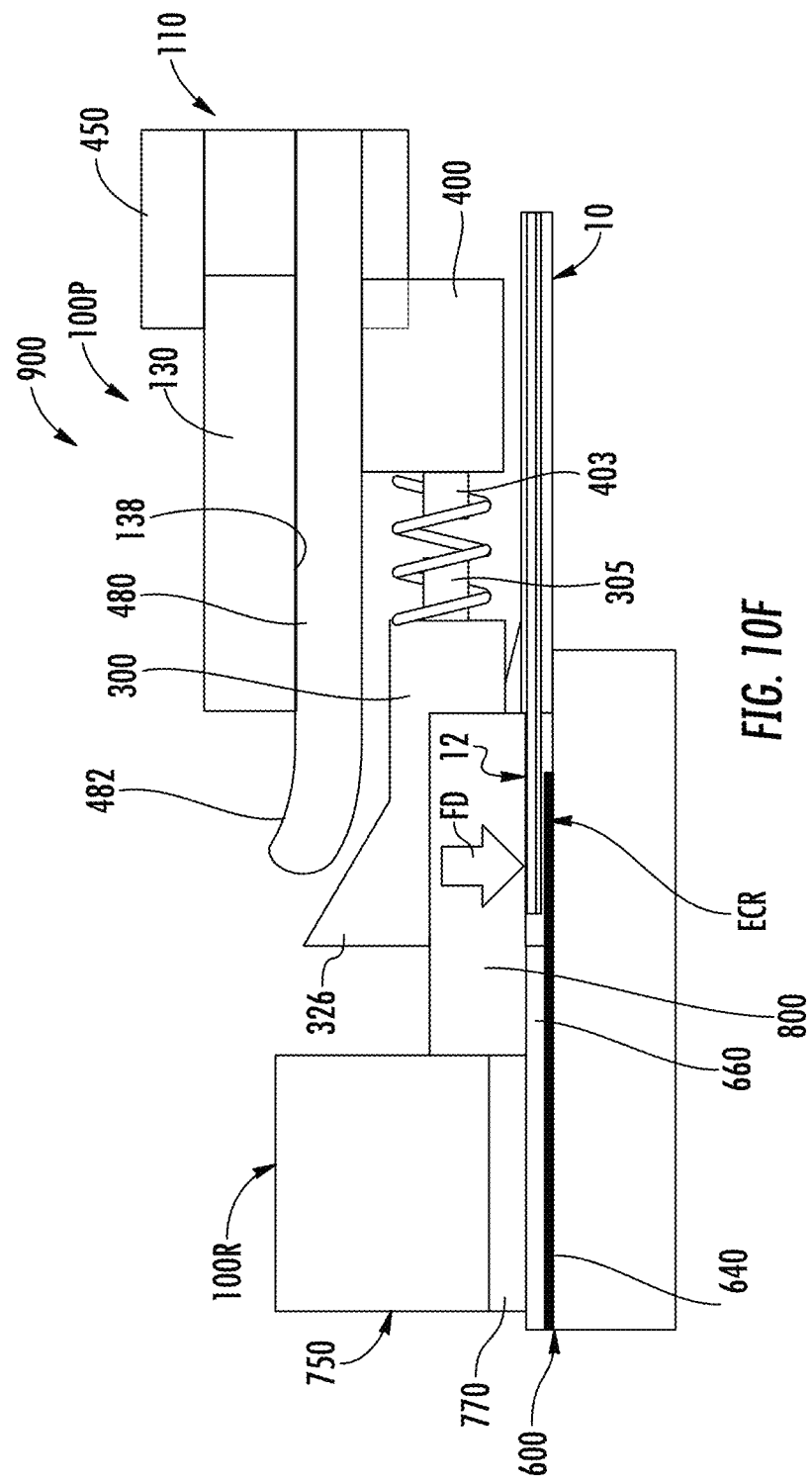
Figure 10G:
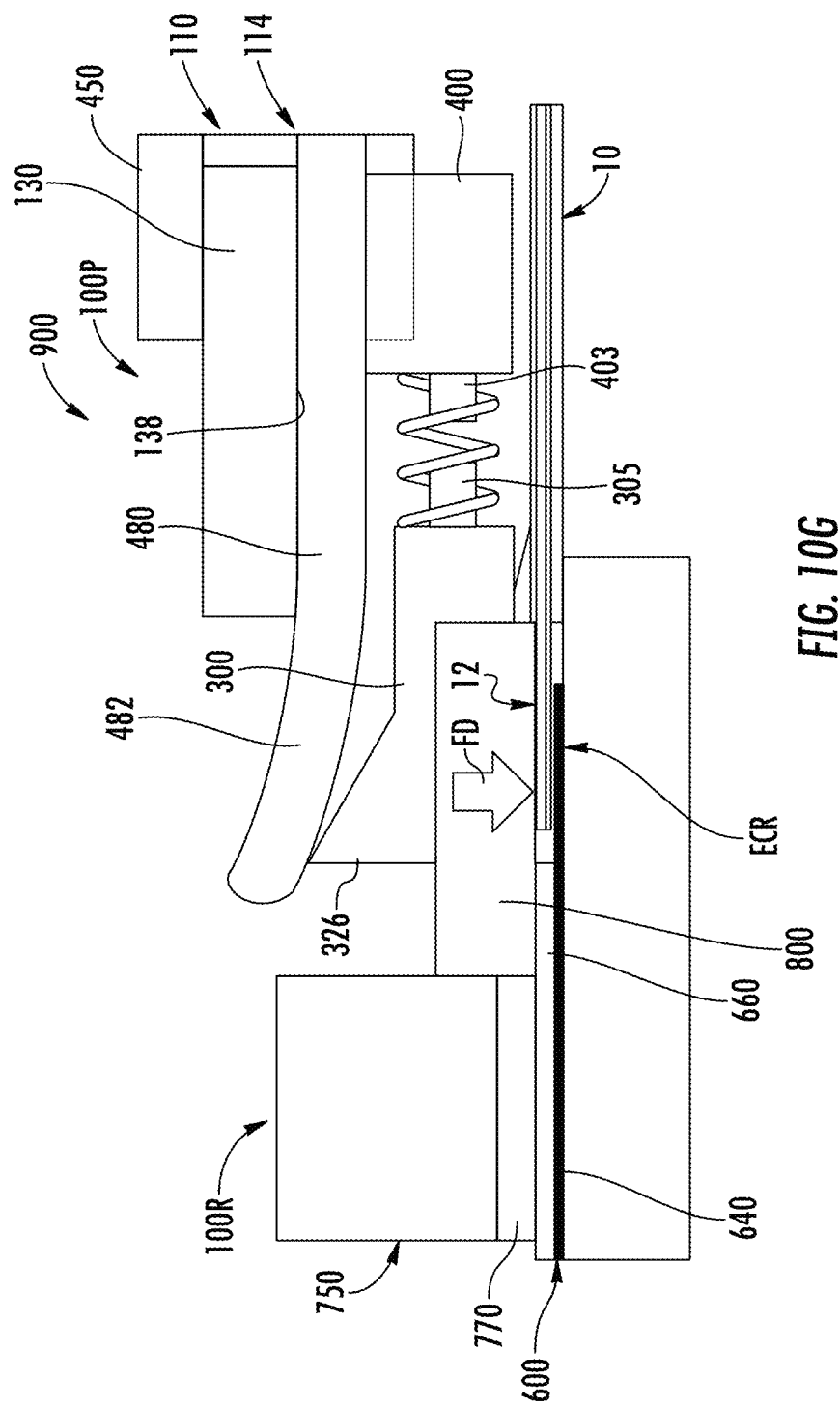

FIGS. 10F and 10G are similar to FIG. 10D and illustrates another alternate embodiment of the evanescent optical coupler 900 wherein the extension 400 is replaced with a cantilevered latch extension 480 that extends from the front end 452 of the latch member 450. The latch extension 480 has a front-end section 482 that is upwardly curved to substantially match the wedge angle of the wedge feature 326 of the carrier member 300. As shown in FIG. 10F, the front-end 482 section of the latch extension 480 is designed to be in close proximity to the wedge feature 326 when the latch member 450 is in its unlocked position.

The latch member 450 can be moved to its locked position by sliding it over the top planer member 130 once the plug connector 100P and receptacle connector 100R are fully engaged, as shown in FIG. 10G. This ensures that both the latching and the generation of the pressing force FD take place after the alignment ferrule assembly 500 is in its target position, i.e., with the optical fibers 10 aligned to PLC waveguides 540 of the PLC 600.

As the latch member 450 is moved forward, the curved front end 482 of the latch extension 480 contacts the wedge feature 326, forcing the alignment ferrule assembly 500 and the optical fibers 10 downward so that they come into contact with the PLC waveguides 540 of the PLC 600. Since the latch member 450 remains in its locked position when the evanescent optical coupler 900 is in used, the curved front end 402 of the latch extension 480 continues to provide the pressing force FD on the alignment ferrule assembly 500. The latch extension 480 can be fabricated from a material that will not lose its spring or creep during long term use. For example, the latch extension 480 can be fabricated from a stiff plastic material or a metal spring material.

During the connector-receptacle connector demating process, the latch member 450 is unlocked by moving it toward backwards, i.e., toward the back end 114 of the connector housing 110. This action removes the curved end 482 of the latch extension 480 from the contact with the wedge feature 326 of the carrier member 330, which in turn relieves the pressing force FD applied to the alignment ferrule assembly. This ensures that during the demating process, there are is no substantial pressing force applied to the PLC substrate 610 that could scratch or damage the PLC waveguides 540 or the optical fibers 10.

Example Alignment Ferrule Assembly and PLC

Figure 11A:
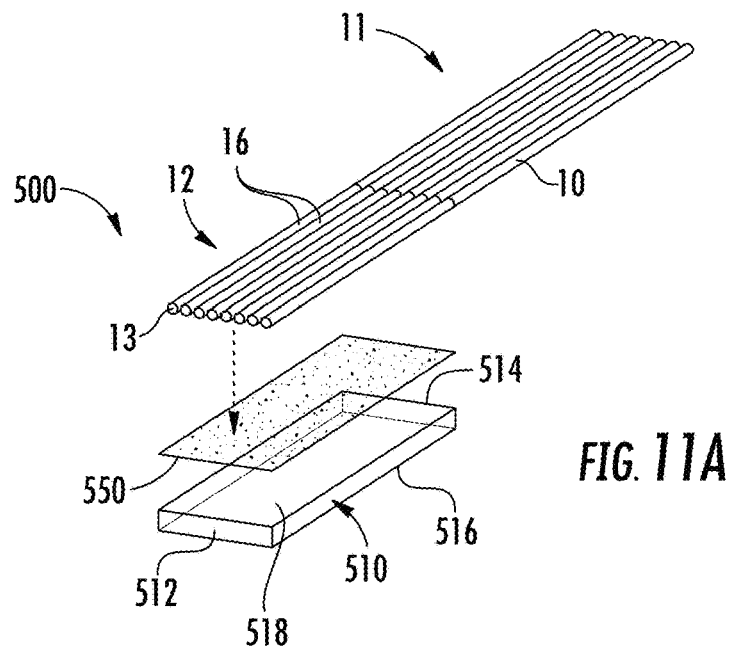
FIG. 11A is a partially exploded bottom view and FIG. 11B is an assembled bottom view of an example alignment ferrule assembly as disclosed herein.

FIG. 11A is a partially exploded bottom view of an example alignment ferrule assembly 500 showing an array of fibers 10 each having an end section 12 where the polymeric outer cladding 58 of the cladding 22 is stripped away to reveal the glass portion 16 (see e.g., FIG. 2A). The alignment substrate 510 is shown disposed below the glass portions 16 of the fibers 10, with its bottom surface 518 facing the fibers. The alignment substrate 510 can be formed from a drawn glass sheet or rod having a desired cross-sectional shape and that is cut from the sheet or rod to have the desired size and shape. The alignment substrate 510 can also be formed using one or more other processes alone or in combination, such as a fusion draw process, a redraw process, a hot-pressing process and a flame working process. Examples of forming the alignment substrate 510 as a precision component that allows for precision alignment are described in greater detail below.

Figure 11B:
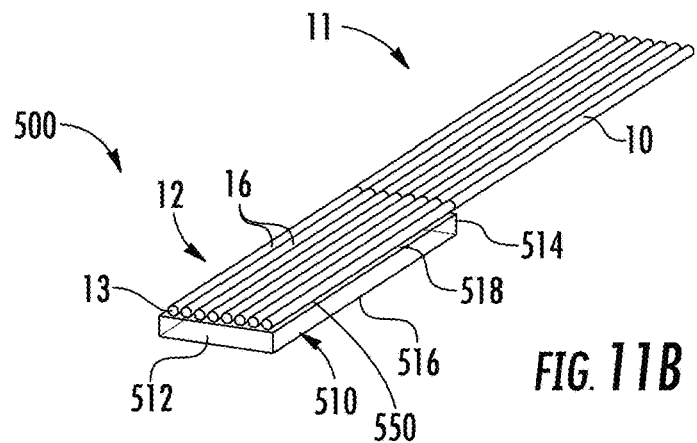
Figure 11C:
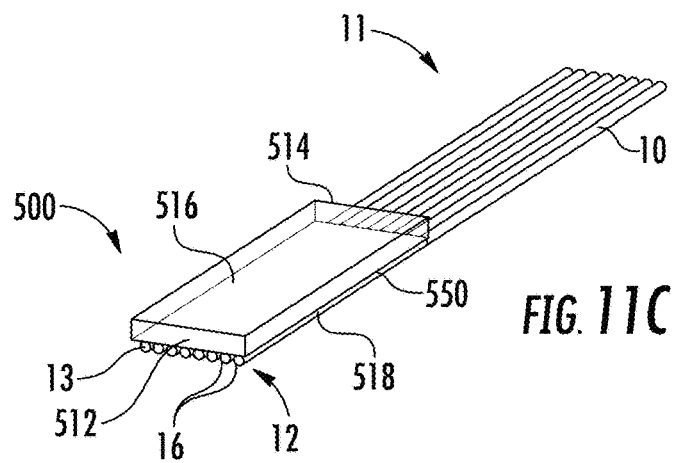
FIG. 11C is a top-elevated view of the assembled alignment ferrule assembly of FIG. 11B.

FIGS. 11B and 11C are bottom and top views of the resulting alignment ferrule assembly 500, with the glass portions 16 bonded to the bottom surface 518 of the alignment substrate using an adhesive material 550. In an example, the adhesive material is curable using ultraviolet (UV) light (i.e., is UV-curable). This is facilitated by the use of a UV-transparent alignment substrate 510.

Figure 11D:
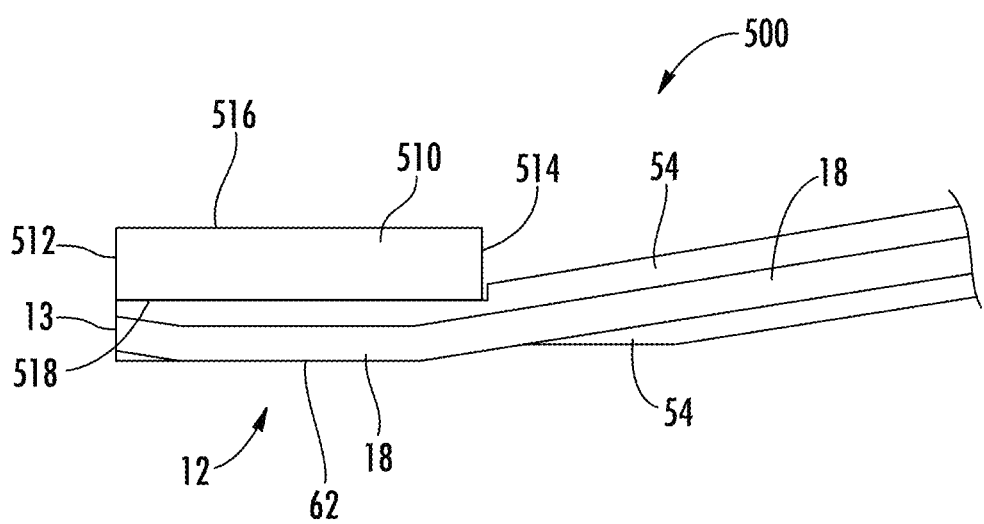
FIG. 11D is a cross-sectional view of an example alignment ferrule assembly wherein the alignment substrate acts as a shaping member that shapes the fibers so that the end sections of the fibers are flat on the bottom side of the alignment substrate extend at an angle from the back of the alignment substrate.

FIG. 11D is a cross-sectional view of an example alignment ferrule assembly 500 wherein the alignment substrate 510 acts as a shaping member that shapes each fiber 10. This shaping is also accomplished by selectively removing portions of the glass inner cladding so that the end section 12 of each fiber 10 is flat against the bottom surface 518 of the alignment substrate 510 while the portion of the fiber that extends out from the back end 514 of the alignment substrate is angled relative the horizontal. In an example, the tip 13 of the end section 12 can be bent upward by leaving a small portion of the polymeric cladding in place at the tip as shown.

Figure 12A:
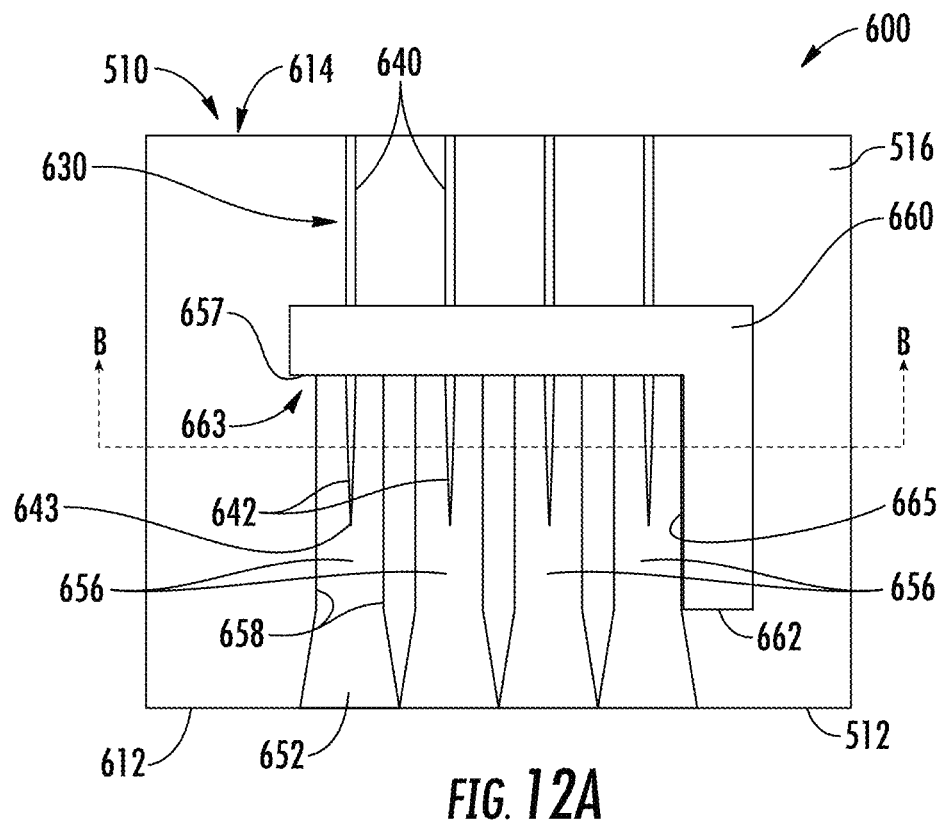
FIG. 12A is a top-down view of an example PLC and FIG. 12B is an x-y cross-sectional view of the example PLC of FIG. 12A as taken at the line B-B in FIG. 12A.
Figure 12B:
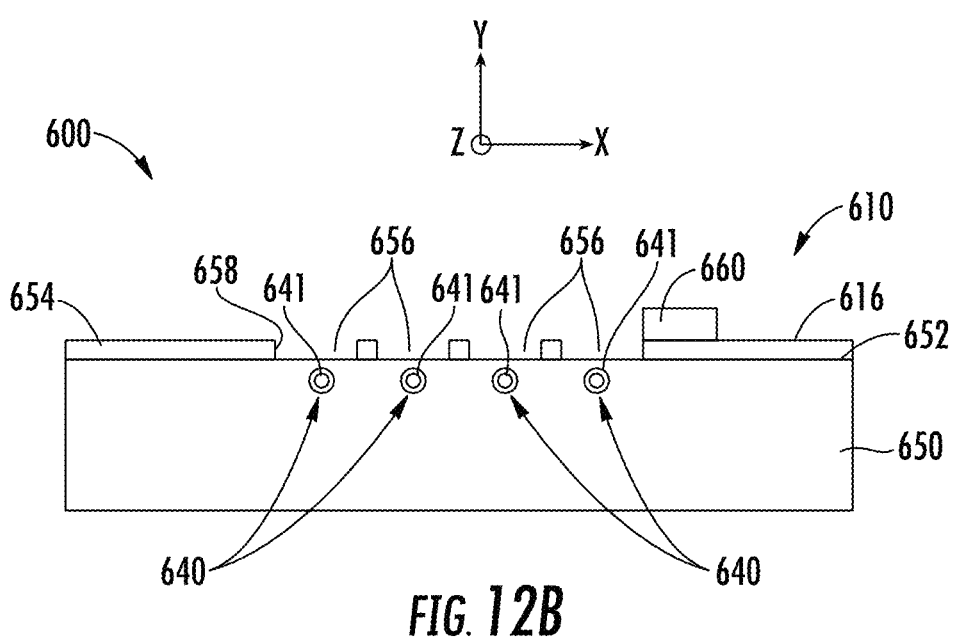

FIG. 12A is a top-down view of an example PLC 600 and FIG. 12B is an x-y cross-sectional view of the example PLC 600 of FIG. 12A as taken at the line B-B in FIG. 12A. The PLC substrate 610 of the PLC 600 includes a glass-based slab 650 with a top surface 652, and an overclad layer 654 on the top surface 652 and that defines the PLC substrate top surface 616. The cores 641 of the PLC waveguides 640 are supported in or on the glass-based slab 650. The overclad layer 654 includes alignment channels 656 that are aligned with the PLC waveguides 640, which in example have tapered end sections 642 having a tip 643 and that reside and terminate within the alignment channels. The alignment channels 656 have ends 657 and opposite side walls 658. A stop fixture 660 is disposed adjacent the channel ends 657. In an example, the stop fixture 660 has an L-shape, with one length of the L oriented in the y-direction and running adjacent and parallel to an outermost alignment channel 656.

Figure 13A:
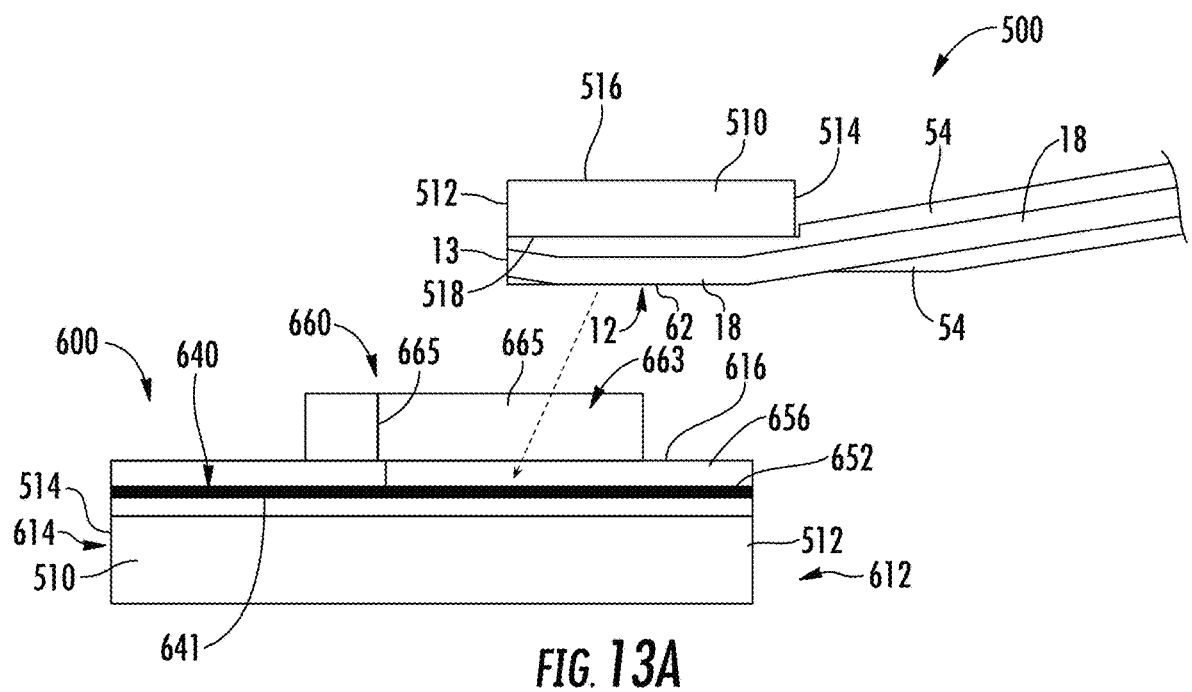
FIG. 13A is a cross-sectional view of the alignment ferrule assembly of FIG. 21C along with the example PLC of FIG. 12B.
Figure 13B:
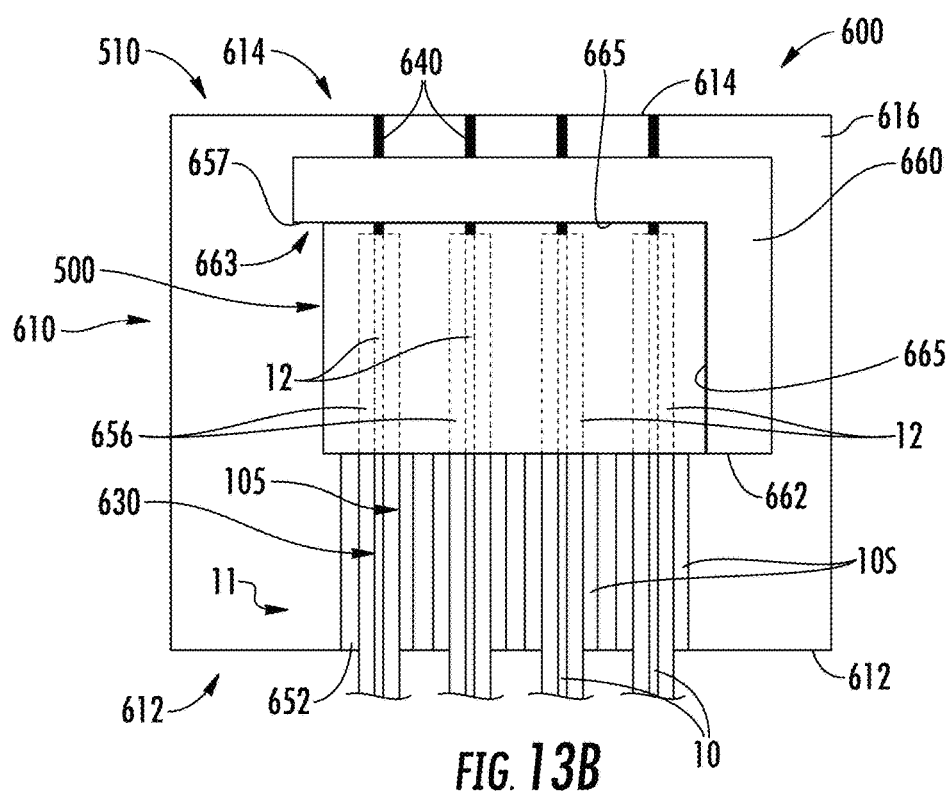
FIG. 13B is a top-down view of the alignment ferrule assembly and PLC of FIG. 13A illustrating how the alignment ferrule assembly is used to align the fibers with the PLC waveguides.
Figure 21A:
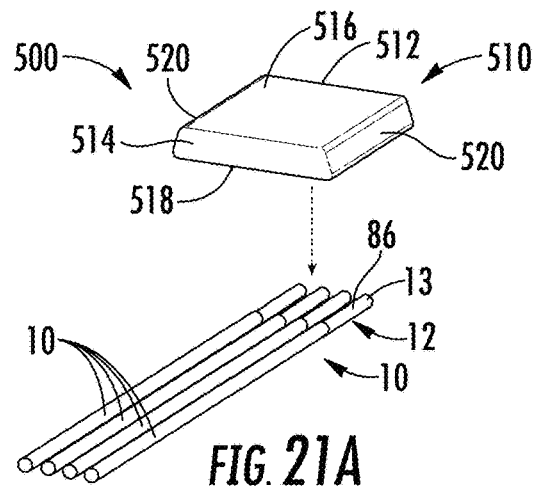
FIG. 21A is a top elevated and partially exploded view of an example alignment ferrule assembly formed using the alignment substrate of FIG. 20.
Figure 21B:
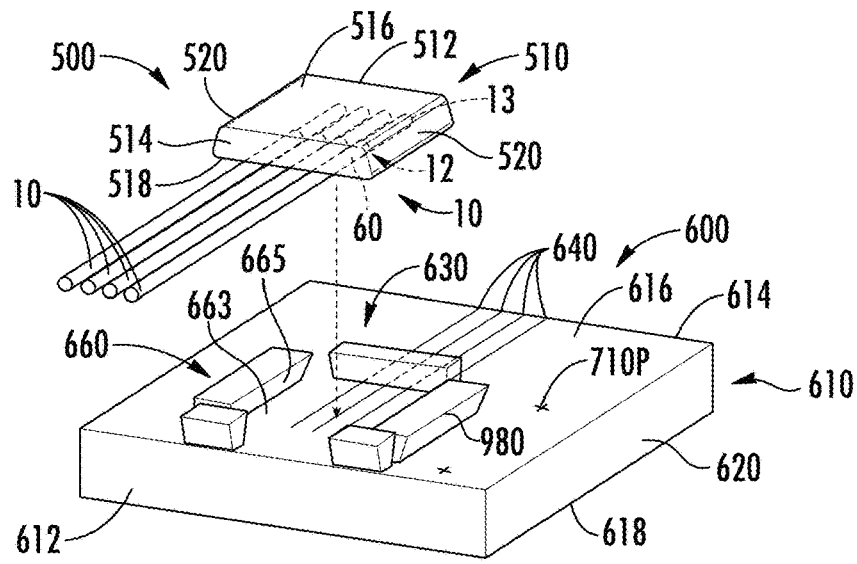
FIG. 21B shows the example alignment ferrule assembly of FIG. 21A operably arranged above an example PLC.
Figure 21C:
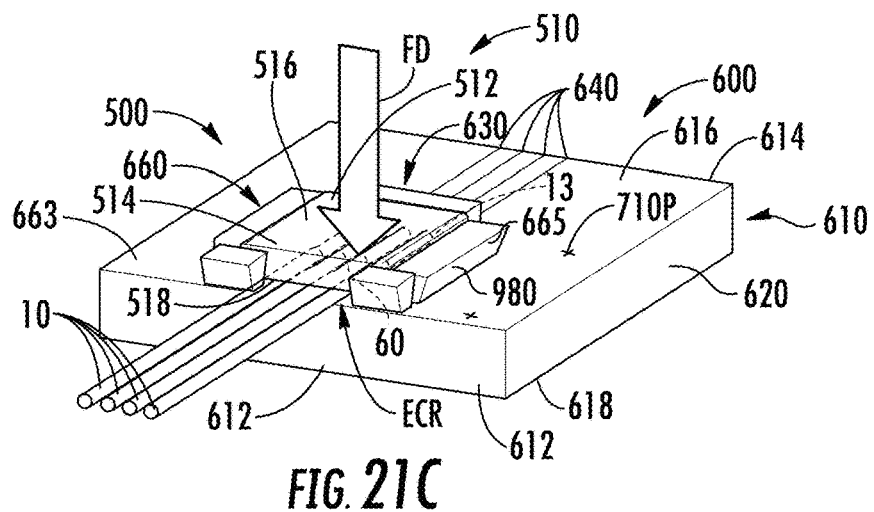
FIG. 21C shows the assembled structure of FIG. 21B.

FIG. 13A is a cross-sectional view of the alignment ferrule assembly 500 of FIG. 21C along with the example PLC 600 of FIG. 12B while FIG. 13B is a top-down view of the alignment ferrule assembly and the PLC 600 of FIG. 13A, illustrating how the alignment ferrule assembly 500 is used to align the fibers with the PLC waveguides 640 of the PLC 600. The end sections 12 of the fibers 10 supported by the alignment substrate 510 are inserted into their respective alignment channels 656 in the overclad layer 654 of the PLC substrate 610. Note that in the example alignment ferrule assembly 500, spacer fibers 10S are used to ensure that the fibers 10 have the same pitch P as the PLC waveguides 640. The end sections 12 of the fibers 10 move toward the back ends 657 of the alignment channels 656 so that the end sections overlap with the tapered ends 642 of the PLC waveguides 640. The front end 512 of the alignment substrate 510 contacts the stop fixture 660 disposed at or adjacent the channel ends 657 when the fiber end sections 12 are aligned with and overlap respective PLC waveguides 640.

Figure 14A:
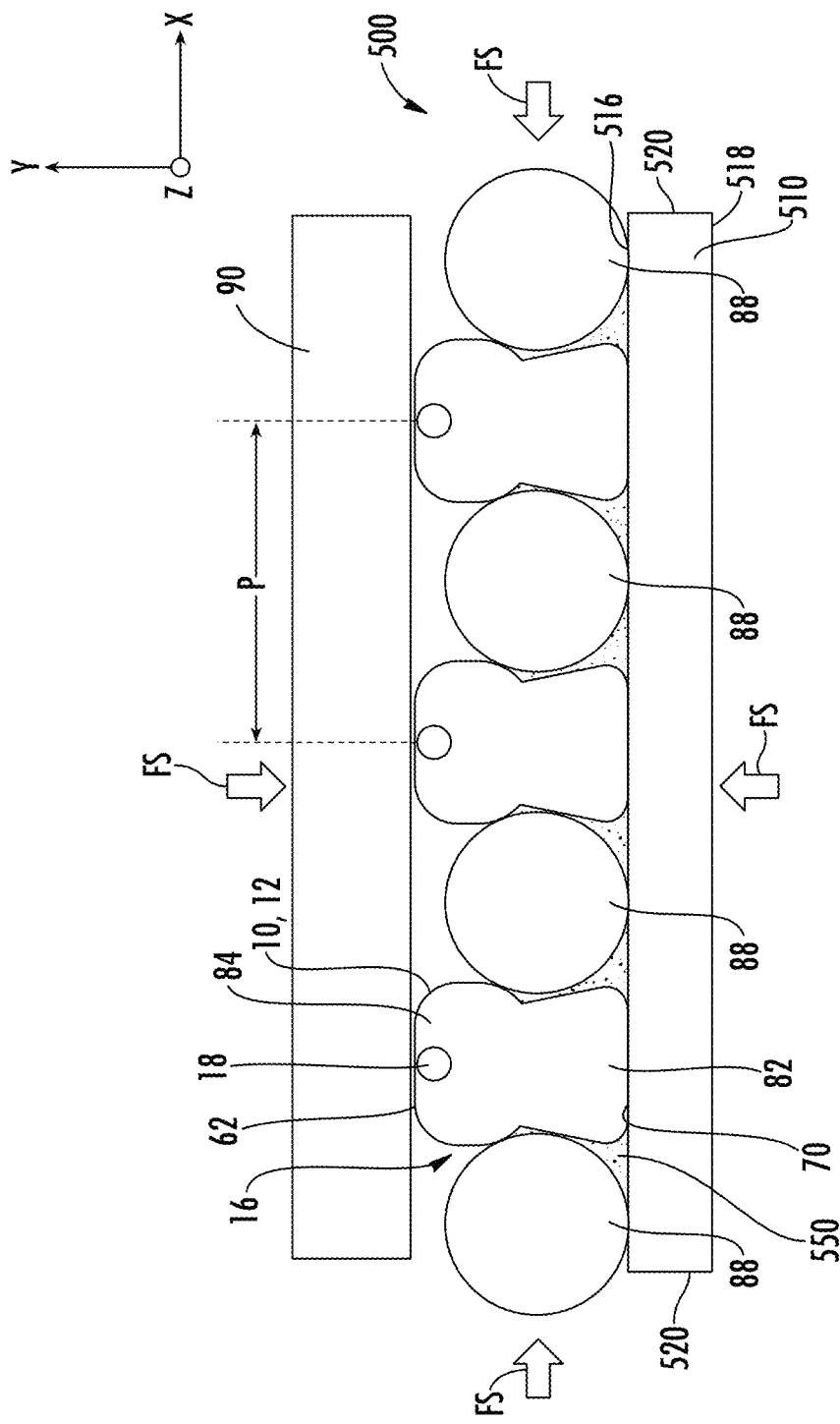

FIGS. 14A and 14B are cross-sectional views of an example ferrule assembly 500 wherein the glass portion 16 of each fiber 10 has a keyhole cross-sectional shape with a dovetail section 82 that includes an alignment surface 70 and a bulbous section 84 that includes the flat glass-portion surface 62. The alignment ferrule assembly 500 includes multiple spaced-apart (e.g., interdigitated or interleaved) spacers 88 supported on the top surface 516 of the alignment substrate 510 and that define the period P of the fibers 10. In an example, the spacers 88 are optical fibers, i.e., spacer fibers 10S. The dovetail sections 82 of the glass portions 16 of the fibers 10 reside between the spacers 88, with the flat alignment surfaces 70 in contact with the top surface 512 of the alignment substrate 510, while the flat glass-portion surfaces 62 of each fiber 10 face upward.

An adhesive material 550 can be used to secure the spacers 88, the alignment substrate 510 and the dovetail sections 82 of the glass portions 16 to one another. Squeezing forces FS can be applied in the horizontal and vertical directions while the adhesive material 550 cures (e.g., via UV radiation). A temporary pressing member 90, such as a glass sheet, can be employed at the flat glass-portion surfaces 62 to facilitate the even application of the vertical squeezing forces FS and to set the dovetail sections 82 within the spacers 88 and the adhesive material 350.

After the adhesive material 550 is cured (e.g., via exposure to UV radiation), the temporary pressing member 90 can be removed, exposing the flat glass-portion surfaces 62 of the keyhole-shaped glass portions 16 of the fibers 10 in the alignment ferrule assembly 500, as shown in FIG. 14B. The alignment ferrule assembly 500 can then be flipped over so that the flat glass-portion surfaces 62 face downward. Since the squeeze assembly approach ensures that the glass portions 16 of the fibers 10 are arranged on the precise period P and the flat glass-portion surfaces 62 can be aligned to the same-period alignment channels 656 of the PLC 600 in the manner discussed above. Likewise, the outside (outermost) spacers 88 provide reference datum surfaces that have a precise offset DS relative to the cores 18 of the fibers 10. In an example, the outside spacers 88 make contact with the stop fixture 660 (e.g., the L-section that runs parallel to the alignment channels 656) to provide precise alignment of the fibers 10 with the PLC waveguides 560 of the PLC 600. Another datum surface can be formed on the alignment substrate 510 when the optical fibers 10 are cleaved and polished.

Laser-Produced Bumps for Alignment Ferrule Assembly

FIG. 15 is a cross-sectional view of an example alignment ferrule assembly 500 shown with one of the end sections 12 of the fibers 10 residing within the alignment channel 656 of the PLC substrate 610, and with a portion of the stop fixture 660 shown residing adjacent the alignment channel. The edge 520 of the alignment substrate 510 resides immediately adjacent the stop fixture 660 and includes an alignment bump 526 sized to provide a select amount of offset h of the alignment substrate relative to the stop fixture 660 so that the fiber cores 18 are aligned with cores 641 of the PLC waveguides 640. This enables low-cost fabrication of the alignment ferrule assembly 500, since its side surfaces can be fabricated with a relatively imprecise process, such as by dicing.

Alignment bumps 526 with precise heights h (e.g., to within ±0.5 µm) can be formed on the surfaces (e.g., edges 520) of glass alignment substrates 510 using laser bump technology as is known in the art. In-situ measurements of bump heights h to ±0.1 µm can be made using, for example a commercially available scanning laser profilometer. By alternating bump formation and bump height measurements, one or more alignment bumps 526 can be formed with high precision and to arbitrary heights h over a height range $0 < h \leq 100$ µm using a small number of process iterations (e.g., 3 to 4). The alignment bump formation process can be carried out rapidly (with a few seconds), while alignment bump height measurements can take between 5 to 10 seconds.

Thus, in an example, at least one alignment bump 526 can be formed on the edge 520 of the alignment substrate 510 to provide a precision offset datum (reference) feature. Alignment bumps 526 are attractive because they enable displacement of debris that may collect between mating datum surfaces away from contact points. The small size of the alignment bump 526 also enables high contact pressures that can compress debris that is not displaced. Using an alignment substrate 510 with V-grooves on the bottom surface 518 has an advantage in that the alignment bump 526 can be formed prior to insertion of the fiber ends 12 into the V-grooves.

Figure 16:
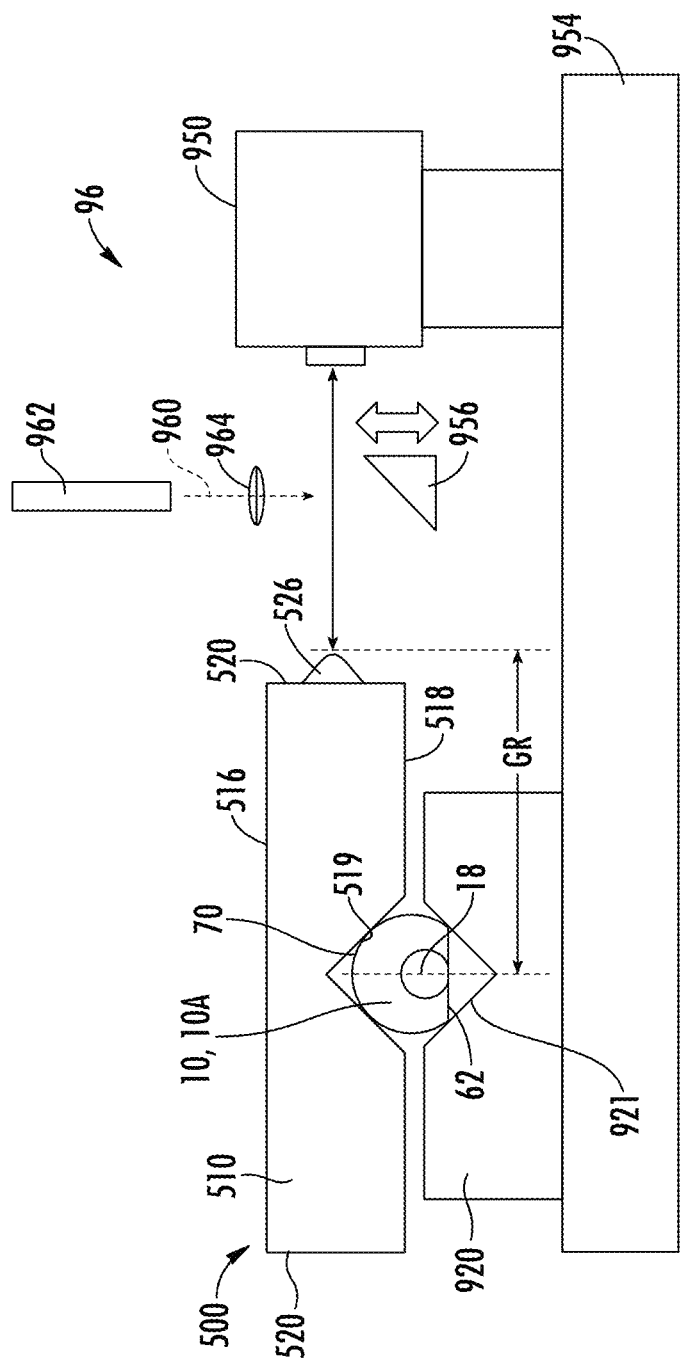
FIG. 16 is a schematic diagram of an example bump-forming apparatus for forming alignment bumps.

FIG. 16 is a schematic diagram illustrating an example apparatus 96 and associated method for forming alignment bumps 526 using laser light. During laser formation of an alignment bump 526, the optional V-groove 519 in the bottom surface 518 of the alignment substrate 510 can be used to precisely align the alignment substrate in a support fixture 920. The support fixture 920 includes a V-groove 921 that supports either the fiber 10 or an alignment fiber 10A. The apparatus 96 includes a laser profilometer 950 is mounted on a rigid base 954 so that it can measure the height of laser-produced alignment bumps 256 formed on the edge 520 of the alignment substrate 510. A movable mirror 956 can be moved upward to reflect laser light 960 from a laser delivery fiber 962 and a lens 964 into a target location at the edge 520 of the alignment substrate 510. After forming the alignment bump 256, the movable mirror 956 can be moved downward to allow the laser profilometer 950 to measure the height of the bump. This process can be repeated until the alignment bump 526 has the desired height corresponding to a desired precision horizontal offset.

An advantage of using one or more precision-formed alignment bumps 526 is that it allows an accurate geometrical relationship to be established between the location of fibers 10 in the V-groove 519 of the alignment substrate 510 and the alignment bump 256 on the side of the alignment substrate. The geometrical relationship (e.g., the distance GR in FIG. 16) can be determined by forming the alignment bump 256 and then measuring light coupled into the glass fiber core 18 of a given fiber 10 via, for example, another optical fiber (not shown) that is precisely scanned over the glass core in a fixture that also provides a precise edge stop datum feature. This process enables the formation of precision edge alignment features to an alignment substrate 510 that might not have been formed using precision-based techniques.

Figure 17:
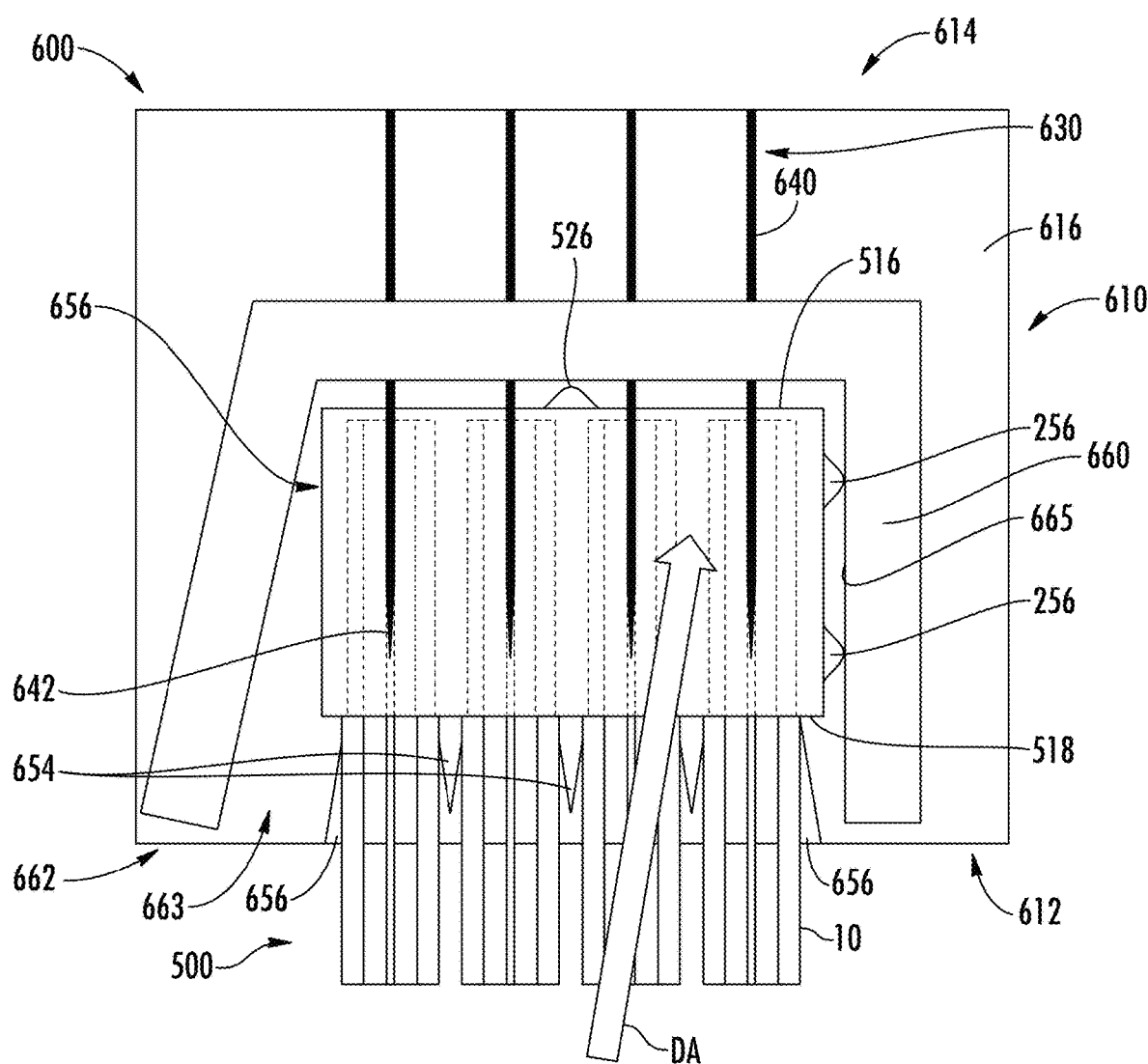
FIG. 17 is similar to FIG. 13B and shows example configuration that employs three alignment bumps on the alignment substrate.

Alignment bumps 526 can also be formed on other locations of the alignment substrate 510 using a similar approach. FIG. 17 is similar to FIG. 13B and shows three alignment bumps 526 on the alignment substrate 510 that align with two different surfaces of a U-shaped stop fixture 660. The example stop fixture 660 has an angled opening at the front end 662 that enables initial coarse alignment of the alignment ferrule assembly 500 to the PLC 600. The three alignment bumps 526 can be distributed as shown, where two alignment bumps are provided on the right edge 520 of the alignment substrate 510 while one bump is provided at the front end 512. Other numbers and locations of alignment bumps 526 can also be effectively employed. An arrow DA shows the insertion direction of the alignment ferrule assembly 500 into the angled opening at the front end 662 of the stop fixture 660 and the fibers 10 into the flared alignment channels 656.

Alignment Substrate Formed by Drawn Glass Process

In an example, the alignment substrates 510 can be fabricated using a glass drawing process, which allows for the resulting alignment substrates to have at least one precision surface that can be used to establish precision alignment of the fibers 10 to the alignment substrate.

Figure 18:
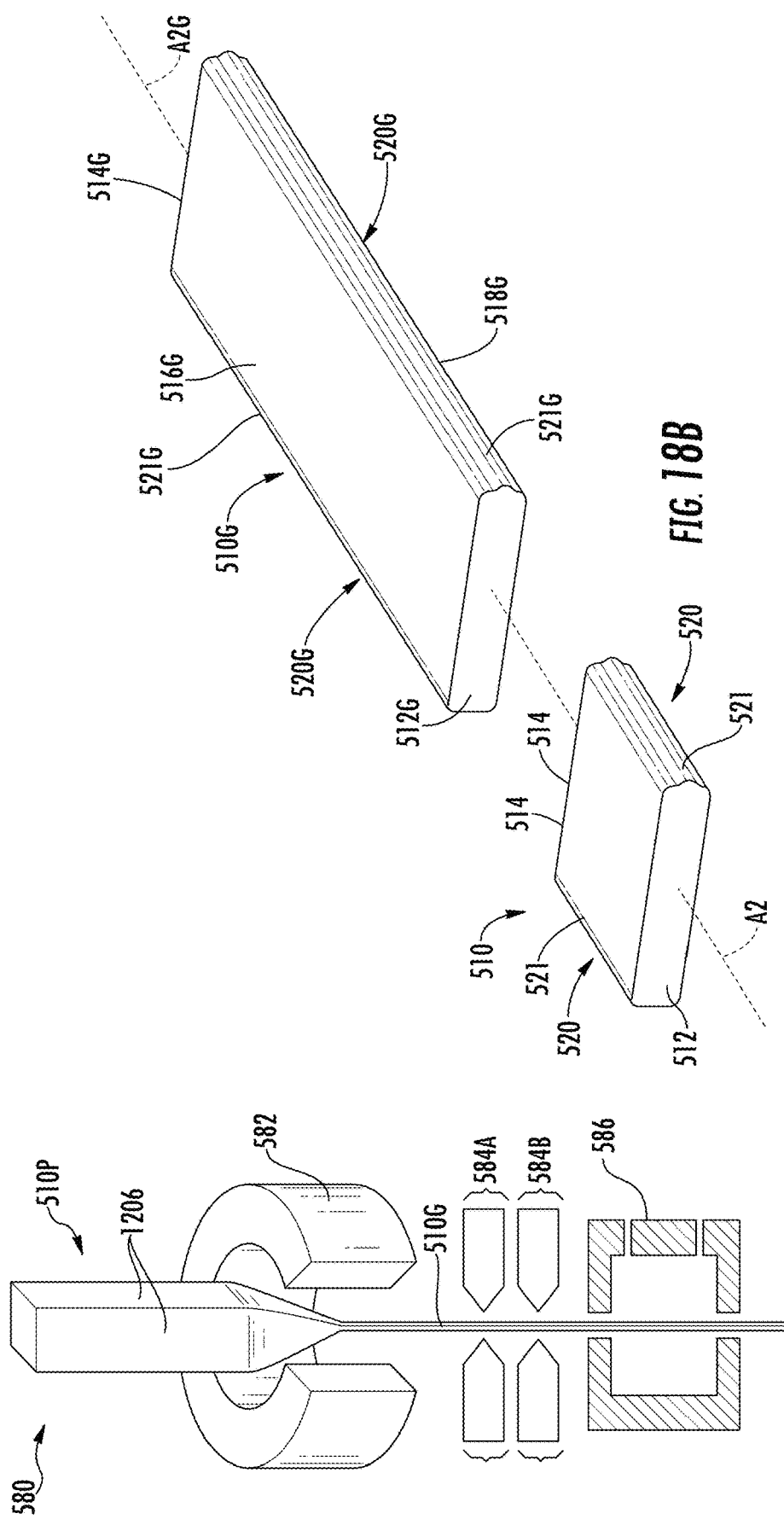
FIG. 18A is a schematic diagram of a drawing system used to form glass sheets or long glass members from a preform.
FIG. 18B is a top elevated view of an example alignment substrate that has been cut from a glass sheet formed using the drawing system of FIG. 18A.

FIG. 18A is a schematic diagram of an example drawing system 580 for producing the alignment substrates 510 as employed herein. The drawing system 580 may comprise a draw furnace 582 for heating a glass preform 510P. The glass preform 510P has generally the same relative shape as the alignment substrate 510 but is much larger, e.g., 25X to 100X larger. Thus, in an example glass preform 510P can have any suitable cross-sectional shape, and the square cross-sectional shape of the glass preform of FIG. 18A is shown by way of example and ease of illustration. The glass preform 510P can be made using a large, uniform piece of glass. An example of such a glass is a borosilicate glass. Another type of glass is fused quartz. Other types of glasses can also be effectively employed.

The large piece of glass can be machined to have the desired shape, e.g., a generally rectangular cross-sectional shape with precision features, as explained below. In an example, at least a portion of the glass preform 510P can be polished, e.g., laser polished. The configuration of the glass preform 510P and the various drawing parameters (draw speed, temperature, tension, cooling rate, etc.) dictate the final form of the alignment substrate 510.

In the fabrication process, the drawn glass preform 510P exits the draw furnace 582 and has the general form of the alignment substrate 510 but is one long continuous long glass member or glass sheet, referred to generally as long glass member 510G. After the long glass member 510G exits the draw furnace 582, its dimensions can be measured using non-contact sensors 584A and 584B. Tension may be applied to the long glass member 510G by any suitable tension-applying mechanism known in the art.

After the dimensions of the long glass member 510G are measured, it may be passed through a cooling mechanism 586 that provides slow cooling of the long glass member. In one embodiment, the cooling mechanism 586 is filled with a gas that facilitates cooling of the long glass member 510G at a rate slower than cooling the long glass member in air at ambient temperatures.

Once the long glass member 510G exits the cooling mechanism 586, it can be cut into select lengths called "canes" that are relatively long (tens of millimeters to 1.5 m) and then cut again into the smaller lengths to define the individual alignment substrate 510.

In an example, the long glass member 510G can be fabricated by performing a first draw process using the glass preform 510P to form an intermediate-sized glass preform, and then re-drawing the intermediate-sized glass preform using a second draw process to form the long glass member 510G. The alignment substrates 510 formed using a glass drawing process have precision surfaces that can be used for establishing alignment between the fibers 10 and the PLC waveguides, as explained in greater detail below.

FIG. 18B is a top elevated view of an example alignment substrate 510 that has been cut from the long glass member 510G (or a cane, which is a portion of the long glass member) formed using the drawing system of FIG. 18A. The long glass member 510G is in the form of a glass sheet and so is referred to hereinafter as the glass sheet 510G. The glass sheet 510G has a front end 512G, a back end 514G, a top surface 516G, a bottom surface 518G, edges 520G and a longitudinal axis A2G. The glass sheet 510G can be drawn with precision features 521G, such as along one or both of its edges 520G. The precision features 521G of the glass sheet 520G become precision features 521 of the alignment substrate 510 formed from the glass sheet and can serve as datum surfaces when mating the alignment ferrule assembly 500 to the PLC 600.

In the example of FIG. 18B, one edge 520G of the glass sheet 510G has a precision feature 521G in the form of a small ridge. The curved shape of the ridge is designed to contact a portion of the stop fixture 660 along a single contact line. Using a small-radius ridge ensures that debris can flow away from the contact line, or that it can be compressed by a mating force concentrated along the contact line. In an alternative edge profile design, the radius of the ridge can be increased so that the precision feature 521G extends across the entire edge 520G of the glass sheet 510G and thus the entire edge 520 of the alignment substrate formed from the glass sheet. The precision feature 521G can also be formed on both edges 520G as noted above so that the alignment substrate has two corresponding precision features 521G.

In an example, the glass sheet 510G can be cut perpendicular to its longitudinal axis A2G to form the alignment substrates 510, as well as other parts. Each alignment substrate 510 has at least one precision flat surface (e.g., top surface 516 or bottom surface 518 and/or one or both of the edges 520) that can be used for mounting the fibers 10 during assembly of the alignment ferrule assembly 500. Alternatively, if the top and bottom surfaces 516G and 518G of the glass sheet 510G are not sufficiently flat, then they can be polished in an additional a polishing step. In an example, this polishing step is performed in a manner that does not alter the precision features 21 of the alignment substrates 510 cut from the given glass sheet 510G.

Other features can be added to the top or bottom of the glass sheets 510G, such as V-grooves 519G fabricated on a precise pitch. These V-grooves 519G can be formed via a precision drawing process (e.g., by adding similar V-grooves to the glass preform), or by diamond sawing the glass alignment substrate after drawing (e.g., before or after perpendicular cutting into individual alignment substrate parts). The V-grooves 519G of the glass sheet 510G become the V-grooves 519 of the alignment substrate 510.

Figure 19:
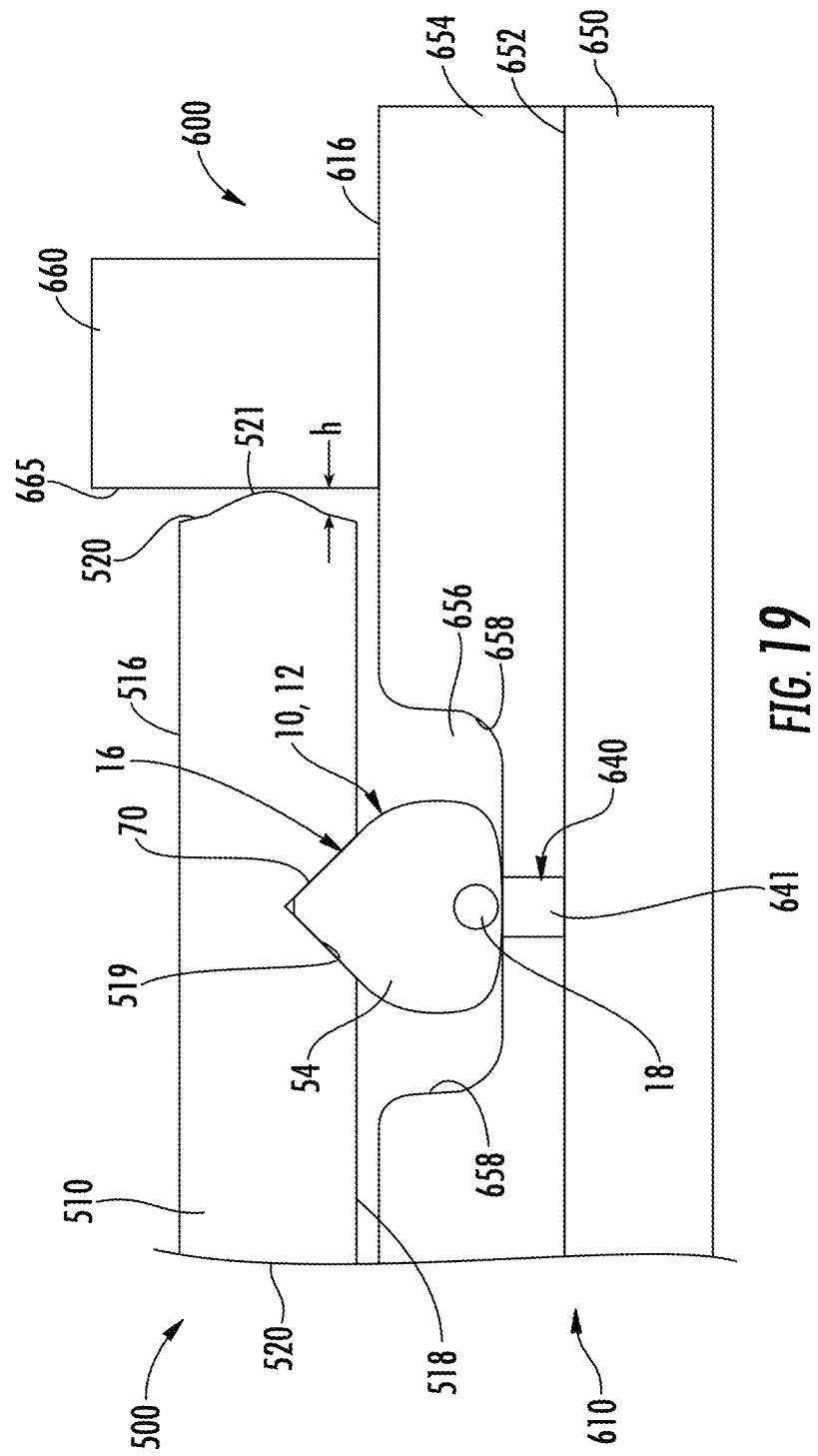
FIG. 19 is similar to FIG. 15 and shows an example alignment ferrule assembly wherein the alignment substrate has been formed from a drawn glass sheet similar to that shown in FIG. 18B, and wherein the alignment substrate includes a V-groove sized to receive a V-shaped alignment surface of the glass portion of the fiber.

FIG. 19 is similar to FIG. 15 and shows an example alignment ferrule assembly 500 wherein the alignment substrate 510 has been formed from a drawn glass sheet 510G similar to that shown in FIG. 18B. The alignment substrate 510 includes on one edge 520 a precision feature 521 in the form of a ridge. The alignment substrate 510 also includes a V-groove 519 formed in the bottom surface 518 and sized to accommodate an angled alignment surface 70 of the glass portion 16 of the end section 12 of the fiber 10. In an example, the alignment ferrule assembly 500 includes multiple fibers 10 each disposed in a V-groove 519, and with each fiber 10 residing in a separate alignment channel 656 of the PLC 600. The example alignment channel 656 of FIGS. 15 and 19 is wider than the end section 12 of the fiber 10 so that there some room for positioning the end section of the fiber when aligning and interfacing the alignment ferrule assembly 500 to the PLC 600.

An advantage of forming a precision feature 521G in the glass sheet 510G is that it gives each alignment substrate 510 can have a primary reference datum surface or feature that is expected to be extremely linear due to the nature of the glass draw process. This primary datum surface or feature can be used in forming additional datum surfaces. For example, the process to cut drawn glass sheets 510G into individual alignment substrate parts can leverage the precision feature 521G as a reference surface or feature so that the cut is exactly perpendicular to the edge 520G.

The process for drawing glass sheets 510G and then cutting them to form the alignment substrates 510 can be used to create other cross-sectional shapes that enable passive alignment of the alignment ferrule assembly 500 to the PLC 600. FIG. 20 is similar to FIG. 18B and shows an example glass sheet 510G having angled or tapered edges 520. The angle creates a glass sheet 510G that is wider at the bottom surface 518G than at the top surface 516G. The angled edges 520G can be used to help retain the fibers 10 in contact with the PLC waveguides 640 of the PLC 600.

FIG. 21A is a top elevated and partially exploded view of an example alignment ferrule assembly 500 formed using the alignment substrate 510 of FIG. 20. FIG. 21B shows the example alignment ferrule assembly 500 of FIG. 21A operably arranged above an example PLC 600. FIG. 21C is the same as FIG. 21B, except it shows the assembled structure. The alignment ferrule assembly 500 is aligned to the PLC waveguides 640 of a PLC substrate 610 of the PLC 600 using one or more resilient gripper elements ("grippers") 980 disposed on the top surface 616 of the PLC substrate 610 and around the ends 642 of the PLC waveguides 640 to define an example stop fixture 660. In an example, the grippers 980 are formed from a low-modulus photoresist material using photolithographic techniques. In an example, the grippers 980 are formed from a polymer. A lithographic shadow mask opaque in the regions where the grippers 980 are to be formed can be aligned to previously formed PLC waveguides 640 of the PLC 600 so that it is centered over the evanescent coupling region ECR.

To precisely align the mask to the PLC waveguides 640, it may be necessary to pre-etch a window in the photoresist material over the PLC alignment marks 710P. The vision system 700 used to observe PLC alignment marks 710P can be mounted on a precision vertical stage with a linear runout<0.5 µm, so that the PLC and mask alignment marks, which will be located in different horizontal planes relative to the PLC plane, can be accurately aligned to each other. Alternatively, the PLC and mask alignment marks may be aligned using a split-field or dual objective optical system that simultaneously views the alignment marks located at different locations offset by a precise lateral offset.

After contact mask alignment, the positive photoresist is exposed to UV radiation by an UV source that is directed onto the PLC substrate 610 from an off-normal axis (e.g., 10-20° off normal). Simultaneously, the PLC substrate 610 is rotated on a stage so that the unexposed region within the photoresist forms a vertical taper structure that is wider at the top (where it contacts the shadow mask) than the bottom (where it contacts the top surface 616 of the PLC substrate 610). Photoresist regions that have been sufficiently exposed to UV will become soluble in developer, allowing the photoresist to only remain in the unexposed taper regions directly beneath the shadow mask.

The grippers 980 define the recess 663, which is sized to receive the alignment substrate 610. In an example, the recess 963 is slightly smaller than the alignment substrate 510, i.e., the grippers 980 provide an interference fit for the alignment substrate. This allows the edges 520 of the alignment substrate 510 to laterally deflect the grippers 980 as it is pushed down into the recess 663. In an example, the grippers 980 that run parallel to the PLC waveguides 640 have angled inside edges 965 that are complementary to the angled edges 520 of the alignment substrate 510 so that the two complementary angled edges engage to provide self-centering of the alignment substrate in the recess 663. This self-centering is designed to cause in the fibers 10 to laterally align with the PLC waveguides 640 of the PLC 600. The remaining grippers 980 cause the fiber 10 to axially align with the PLC waveguides 640 of the PLC 600. The angled inside edges 665 of the grippers 980 also provide a pressing force FD on the alignment substrate 520, which helps keep the fibers 10 in evanescent communication with the PLC waveguides 640.

Alignment Substrates Formed by Drawing a Long Glass Member

Figure 22:
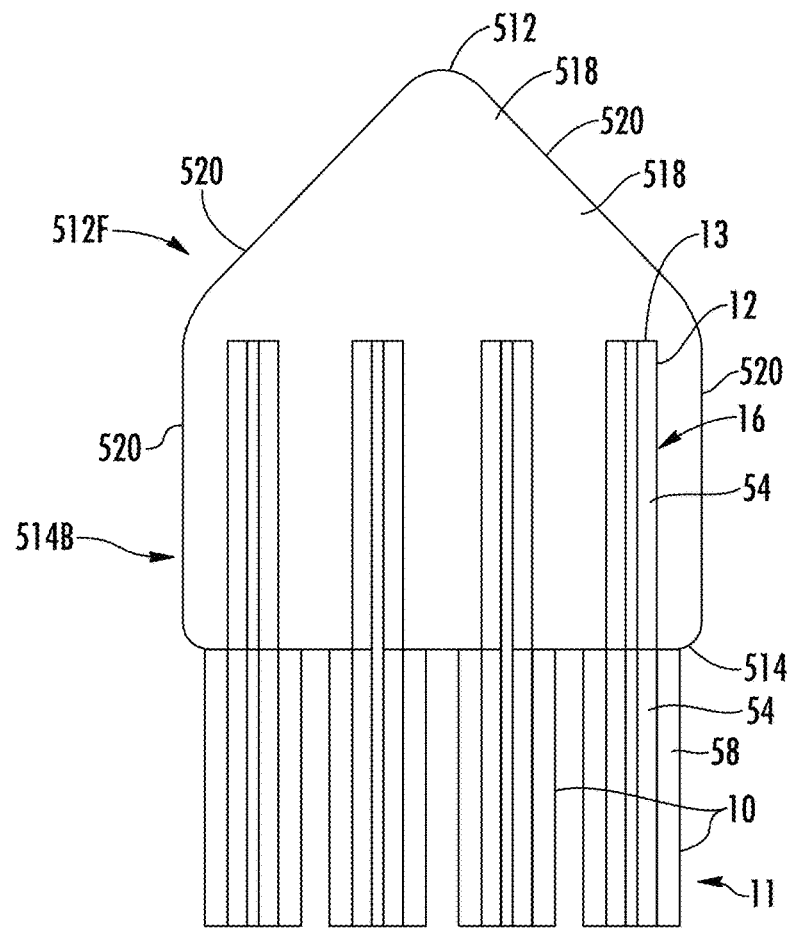
FIG. 22 is a bottom-up view of the example alignment substrate and fibers used to form the example alignment ferrule assembly, with the tips of the fibers residing at the transition between the front-end section and the back-end section.

FIGS. 5A and 5B discussed above show an example alignment substrate 510 having an angled (V-shaped) front-end section 512F. FIG. 22 is a bottom-up view of the example alignment substrate 510 and fibers 10 used to form the example alignment ferrule assembly 500, with the tips 13 of the fibers 10 residing at the transition between the front-end section 512F and the back-end section 514B.

Figure 23:
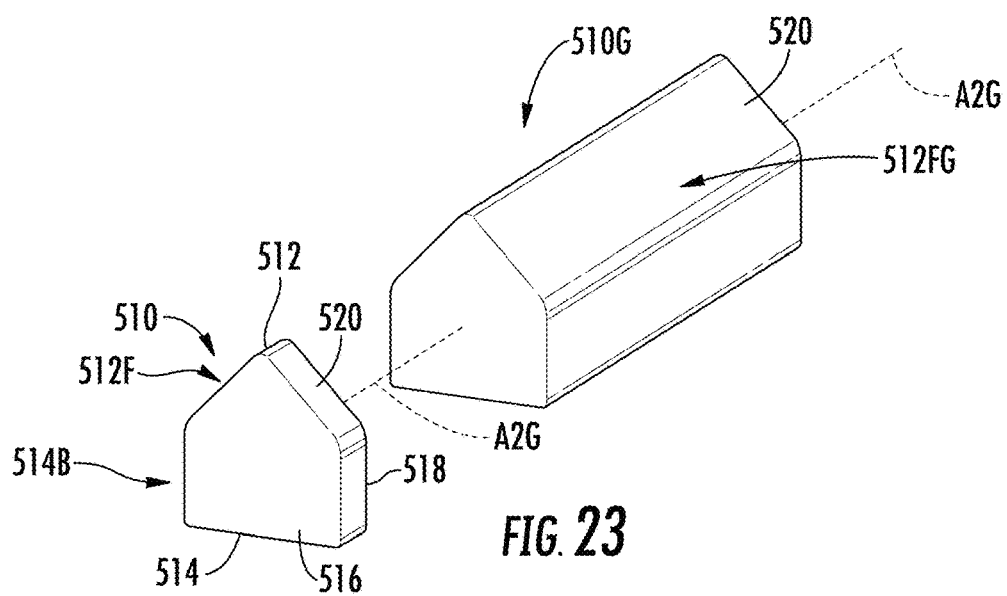
FIG. 23 shows an example drawn long glass member used to form V-shaped alignment substrates such as shown in FIG. 22.

FIG. 23 shows an example long glass member 510G used to form V-shaped alignment substrates 510. The example long glass member 510G has a cross-section with five sides, including two angled edges 510 in a front-end section 512FG that define the V-shaped front-end section 512. The long glass member 510G is formed by drawing a preform 510P having the same cross-sectional shape but having larger overall dimensions, as described above. The alignment substrate 510 is formed by cutting the long glass member 510G perpendicular to its long axis. The two angled edges 520F of the resulting alignment substrate 510 are datum surfaces that can be used to establish alignment of the fibers 10 of the alignment ferrule assembly 500 with the PLC waveguides 640 of the PLC 600.

Figure 24A:
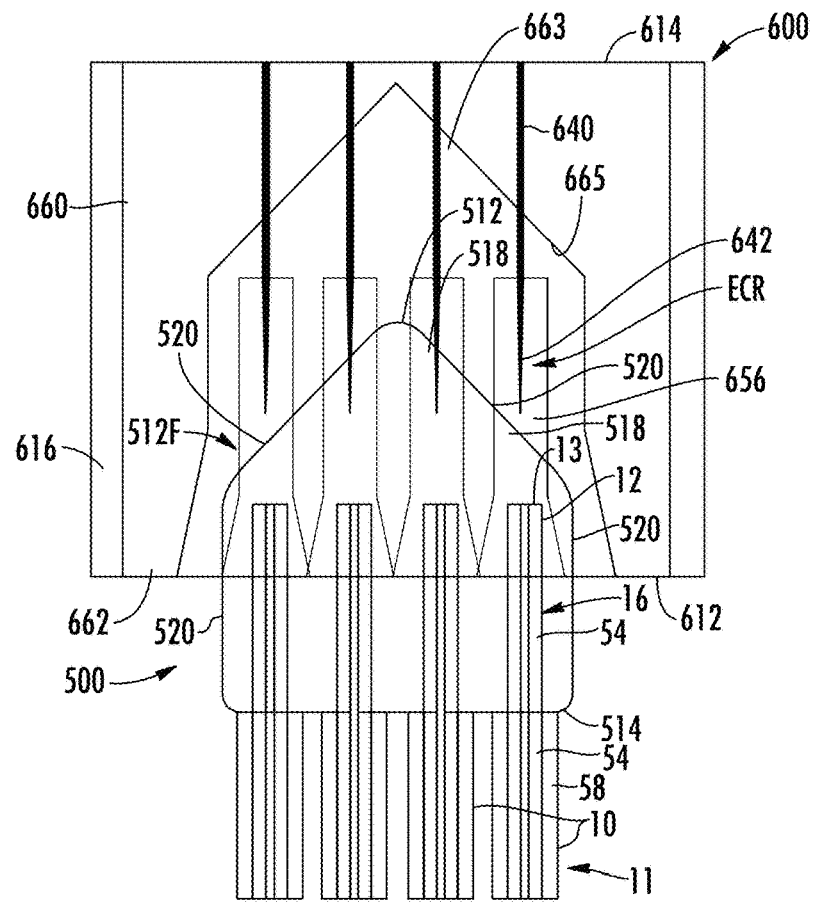
FIGS. 24A and 24B are top-down views of an example PLC similar to that shown in FIG. 12A and that includes an example stop fixture with a V-shaped recess sized to closely accommodate the V-shaped front-end section of the alignment substrate of the alignment ferrule assembly of FIG. 22.

FIG. 24A is a top-down view of an example PLC 600 similar to that shown in FIG. 12A and that includes an example stop fixture 660 with a V-shaped recess 663 sized to closely accommodate (receive) the V-shaped front-end section 512 of the alignment substrate 510 of the alignment ferrule assembly 500 of FIG. 22. The stop fixture 660 may be fabricated on the top surface 616 of the PLC substrate 610 and aligned to the evanescent coupling region ECR. The stop fixture 660 can be a raised mesa region formed by selective etching of a deposited layer material, such as a photoresist layer, an oxide layer, or an epitaxially deposited layer. The stop fixture 660 may extend 5 µm to 20 µm above the top surface 516 of the PLC substrate 510. In an alternative configuration, the stop fixture 660 is a thicker raised mesa (e.g., 50 µm to 150 µm thick) formed via photolithographic exposure and etching/development processes, including the previously mentioned polymer gripper fabrication process. In an example, the recess 663 of the stop fixture 660 can have a flared open end at the front end 612 of the PLC substrate 610 to facilitate the insertion of the alignment ferrule assembly 500 into the recess for coarse alignment of the fibers 10 to the PLC waveguides 640.

Figure 24B:
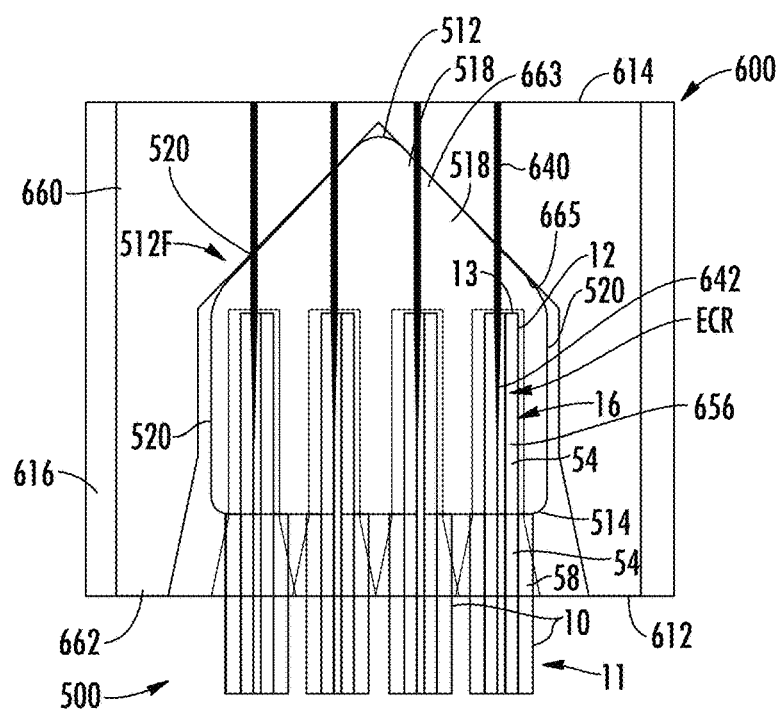

When the angled front-end section 512F of the alignment substrate 510 resides tightly within the V-shaped recess 663 as shown in FIG. 24B, the fibers 10 are in lateral and axial alignment with the PLC waveguides 640 of the PLC 600.

Figure 24C:
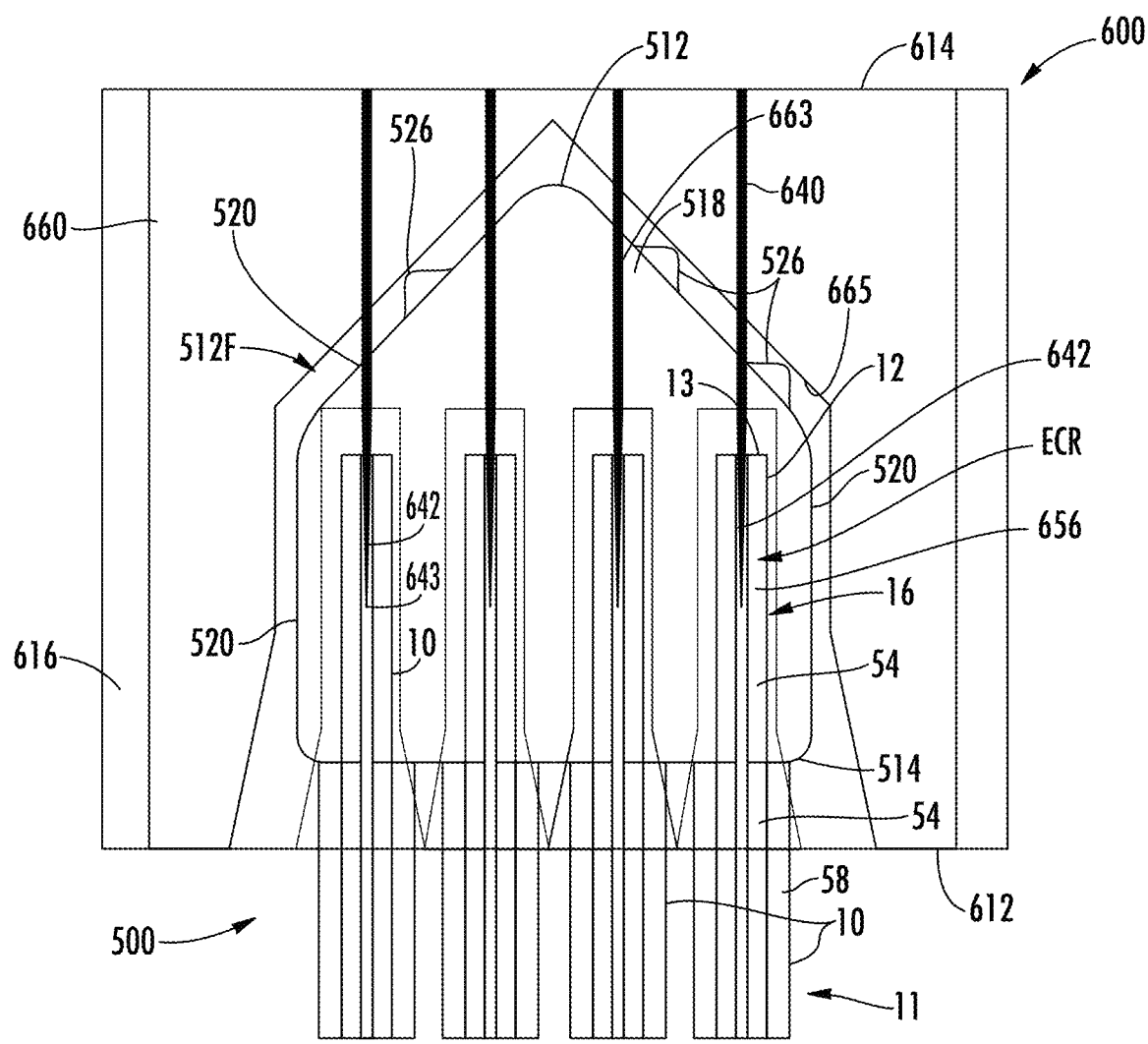
FIG. 24C is similar to FIG. 24B and shows the alignment substrate having three alignment bumps formed at different positions along the edge of the alignment substrate.

FIG. 24C is similar to FIG. 23A and shows the addition of alignment bumps 526 at different positions on the edge 520 of the V-shaped front-end section 512F of the alignment substrate 520. Three such alignment bumps 526 are shown that provide three precision contact points with the stop fixture 660. As described above, the alignment bumps 526 can facilitate the precise alignment of the V-shaped alignment ferrule assembly 500 to the stop fixture 660 and make the alignment less sensitive to debris that might become trapped between alignment surfaces.

Figure 25A:
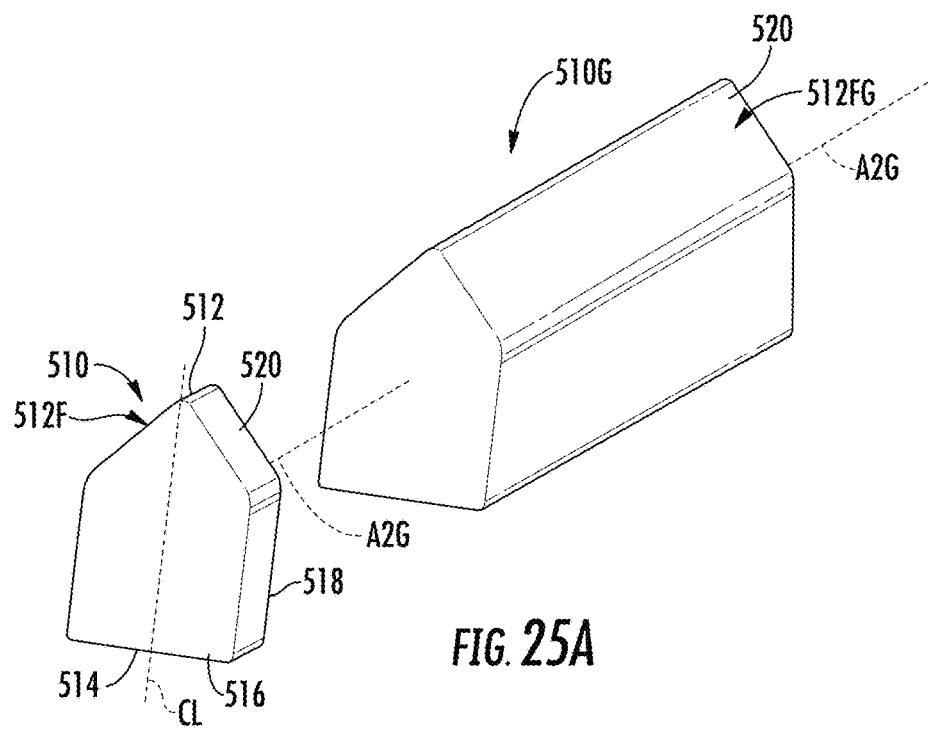
FIG. 25A is similar to FIG. 23 and illustrates an example of how the long glass member can be cut so that the alignment substrate has angled edges.

As discussed above, in one example the V-shaped alignment substrate 510 can be formed by cutting the V-shaped long glass member 510G perpendicular to its long axis. In another example illustrated in FIG. 25A and FIG. 25B, the V-shaped long glass member 510G can be cut in a direction that is not perpendicular to its long axis A2G. The resulting alignment substrates 510 can have its front end 512 as well as its edges 520 angled in a manner such that top surface 516 of the alignment substrate is smaller than the bottom surface 518, as can be seen in the cross-sectional view of FIG. 25C, which is taken along the center line CL. This not only gives the front-end section 512F of the alignment substrate a V-shape, but also adds a wedge shape in the y-z plane that can be exploited in the manner discussed below.

Figure 25B:
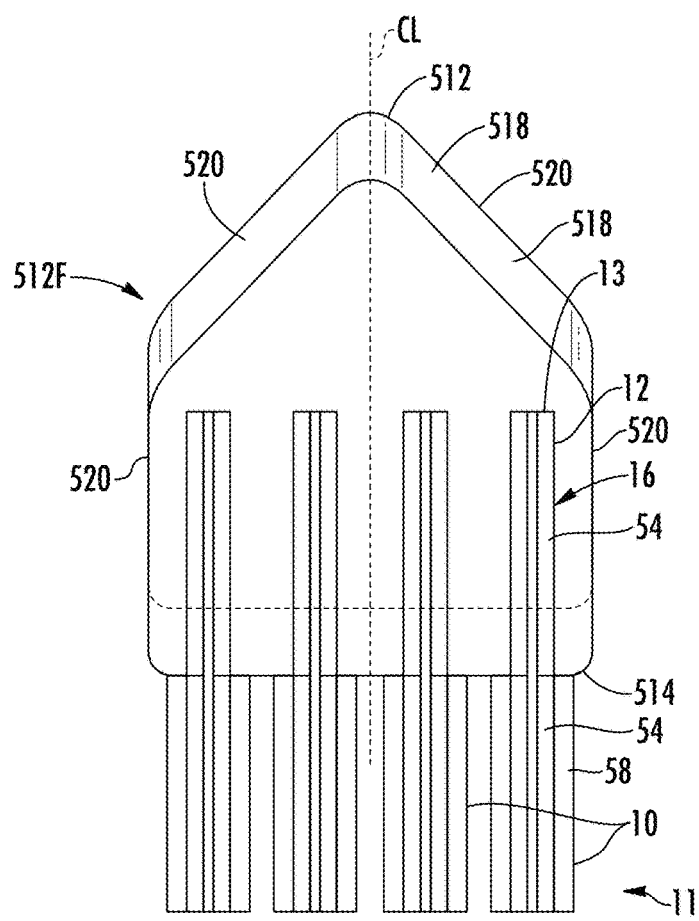
FIG. 25B is similar to FIG. 22 and shows an example alignment ferrule assembly that employs the alignment substrate of FIG. 25A.
Figure 26A:
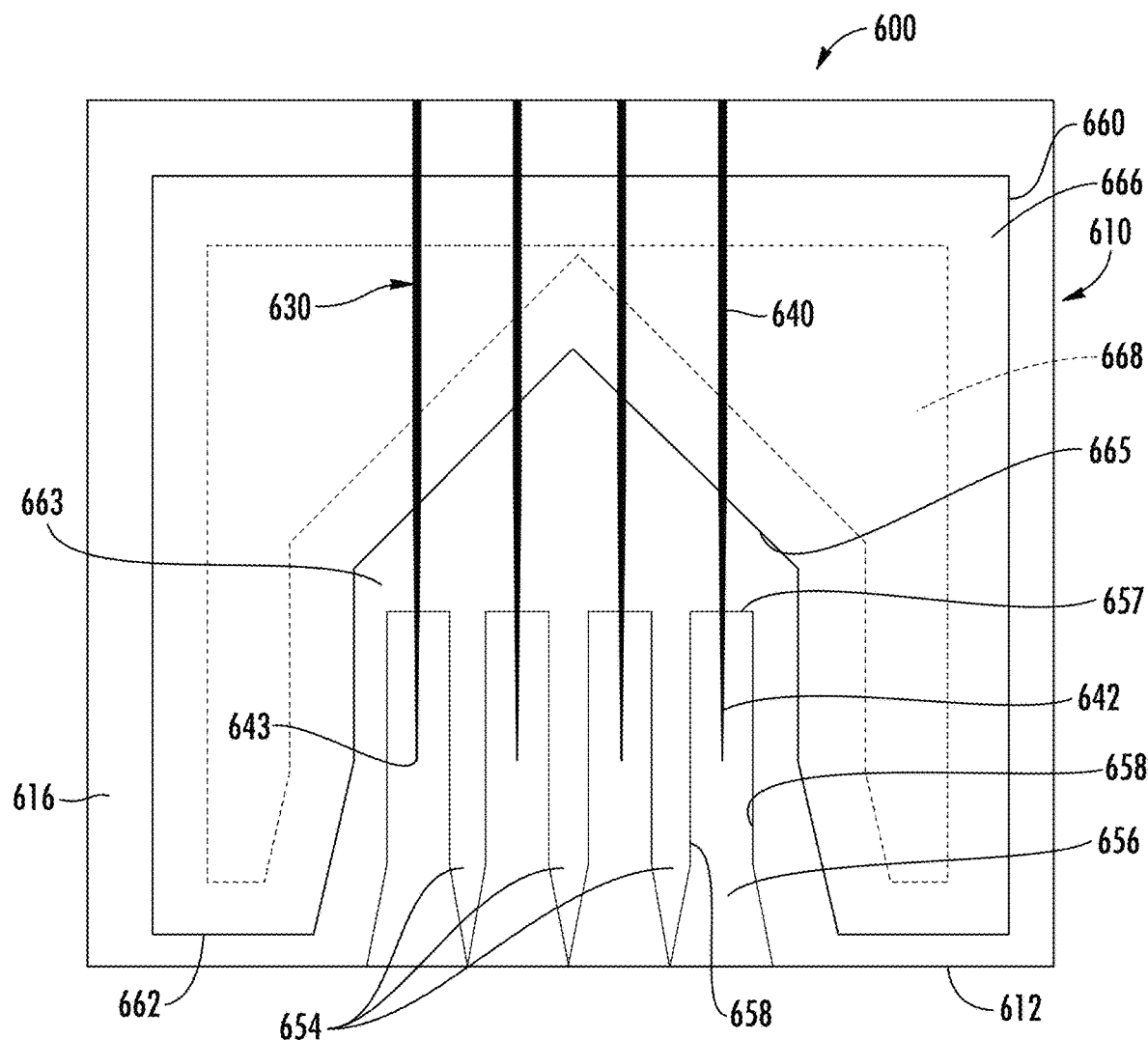
FIG. 26A is top-down view of an example PLC wherein the stop fixture has an angle edge configured to accommodate the angled edge of the alignment substrate of the alignment ferrule assembly of FIG. 25B.

FIG. 26A is a top-down view of an example PLC 600 that includes an example stop fixture 660 with a V-shaped recess 663 but where a top surface 666 of the stop fixture is larger than a bottom surface 668 of the stop fixture so that there is an overhang at the inside edge 665 of the recess. In an example, the stop fixture 660 can be formed using polymer material and further in an example can be formed as an assembly of the aforementioned grippers 980 such as shown in FIGS. 21B and 21C. The result is that the inside edge 665 of the recess 663 of stop fixture 660 has a wedge shape that complements (accommodates) the wedge shaped front end 512 of the alignment substrate 510 so that the respective edges of the alignment substrate and the stop fixture either make face-to-face contact or line contact. This is also shown in the top-down view of FIG. 26B, which includes the alignment ferrule assembly 500 of FIG. 25B, and in the y-z cross-sectional view of FIG. 26C, which is taken along the centerline CL. Note that the inside edge 665 has an angle relative to the planar top side 666 of the stop fixture 660 that is other than 90° and in the example of FIG. 26C makes an obtuse angle with the planar top side.

An advantage of using polymer grippers 980 to form the stop fixture 660 is that the grippers can be precisely aligned to previously fabricated PLC layers using alignment marks or fiducials. Typical mask alignment equipment can achieve layer misalignments of <0.5 µm. Polymer grippers are fabricated from photosensitive material so that, using correct exposure and development conditions, an overhang region can be created using an undercut etch process.

Since the stop fixture 660 can be fabricated from an elastic material such as a polymer, the inside edge 665 of the recess 663 can deflect laterally as the alignment substrate 510 is inserted into the recess. The deflection causes the stop fixture 660 to create a lateral restoring force that tends to self-center the inserted alignment substrate 510 along the centerline CL. This self-centering process occurs even if the stop fixture 660 has been slightly underetched or overetched, since the underetch or overetch is nominally identical for both opposite sides of the inside edge 665 of the recess 663.

Figure 26B:
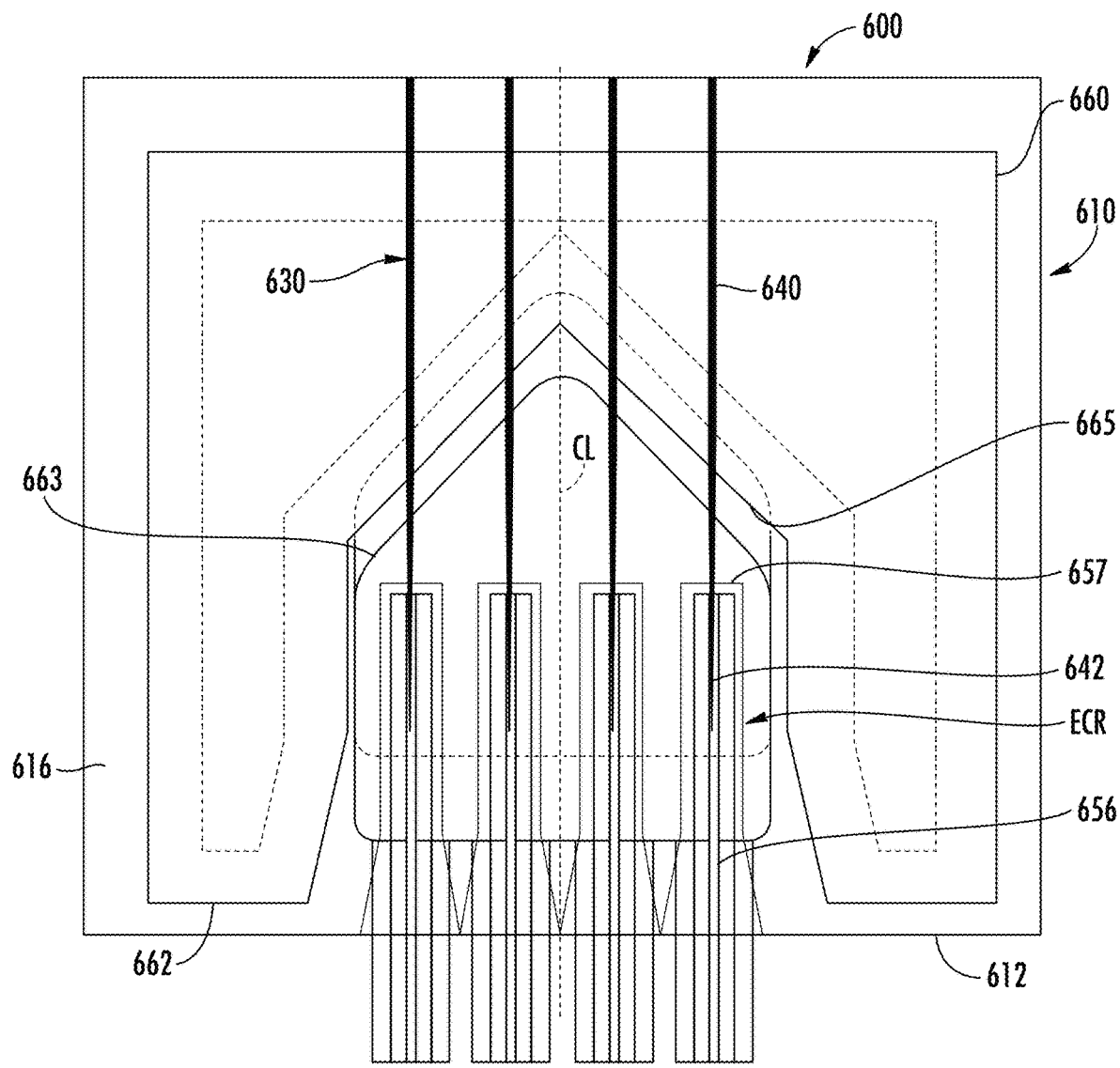
FIG. 26B is similar to FIG. 26A and also shows the alignment ferrule assembly of FIG. 25B.
Figure 26C:
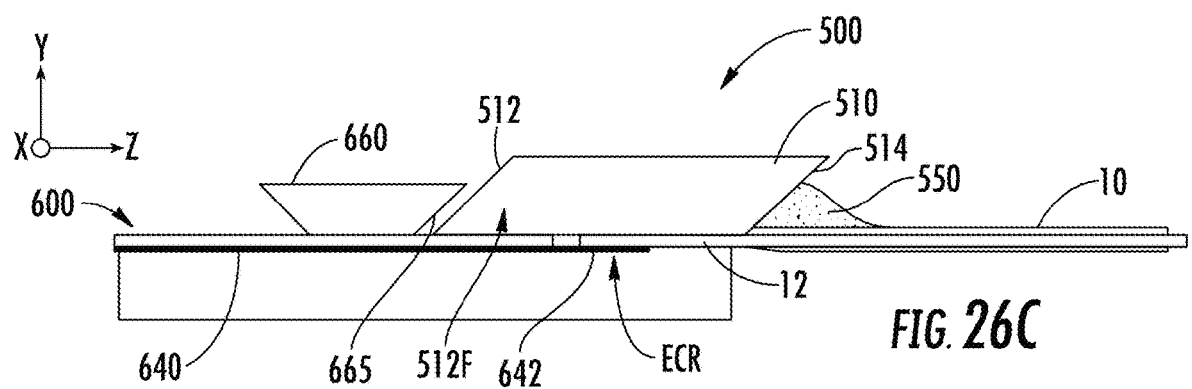
FIG. 26C is a close-up y-z cross-sectional view that shows the complementary wedge angles of the stop fixture and the alignment substrate.
Figure 26D:
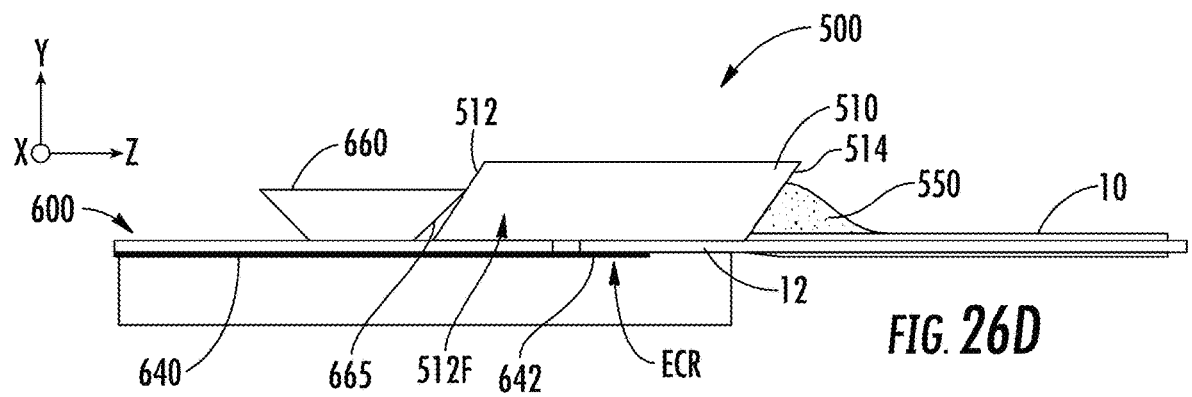
FIG. 26D is similar to FIG. 26C and illustrates an example where the wedge angles are not the same so that there is a line of contact between the stop fixture of the PLC and the alignment substrate of the alignment ferrule assembly.

FIG. 26D is a cross-sectional view similar to FIG. 26C and shows an example where the wedge angle associated with the overhang of the inside edge 665 of the recess 663 of the stop fixture 660 is greater than the wedge angle of the edges 520 at the front-end end section 512F of the alignment substrate 510. This creates a line of contact between the stop fixture 660 and the alignment substrate 510 within the V-shaped recess 663 of the stop fixture. Elastic deflection of the stop fixture 660 during mating helps ensure that the alignment ferrule assembly 500 and the fibers 10 supported thereby are rotationally as well as laterally aligned to the PLC waveguides 640 of the PLC 600 in the evanescent coupling region ECR.

When the evanescent coupling region ECR is located away from the V-shaped front-end section 512F of the alignment substrate 510, then an additional pressing force FD can be applied to the alignment ferrule assembly 500, either directly over the evanescent coupling region or more toward the back end 514 of the alignment substrate 510. On the other hand, the alignment substrate 510 can be sized such that the evanescent coupling region ECR resides completely within the V-shaped front-end section 512F (i.e., the triangular region created by the V-shaped tip) of the alignment substrate 510. In this case, the interaction of the V-shaped front end 512 with the flexible stop fixture 660 can apply sufficient pressing force FD at the evanescent coupling region ECR to close any gaps that might otherwise exist.

Figure 27A:
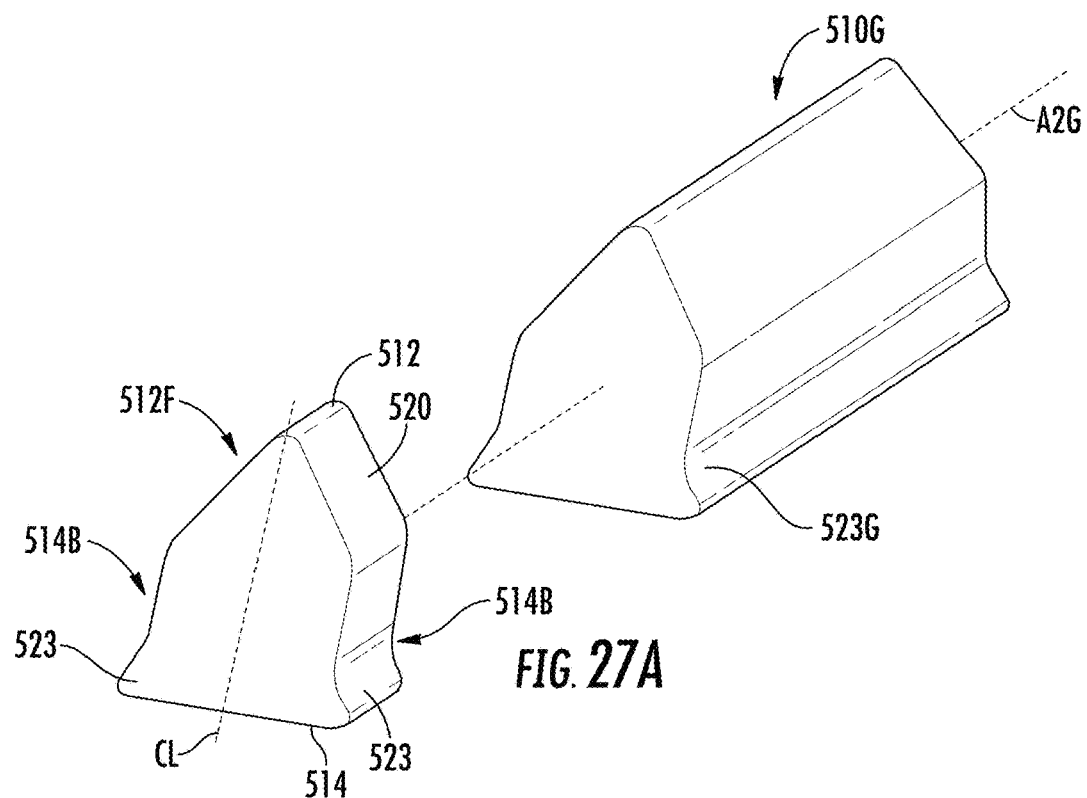
FIG. 27A is similar to FIG. 25A and shows an example cross-sectional shape having triangular protrusions at the back end that assist in providing a pressing force at the evanescent coupling region.
Figure 27B:
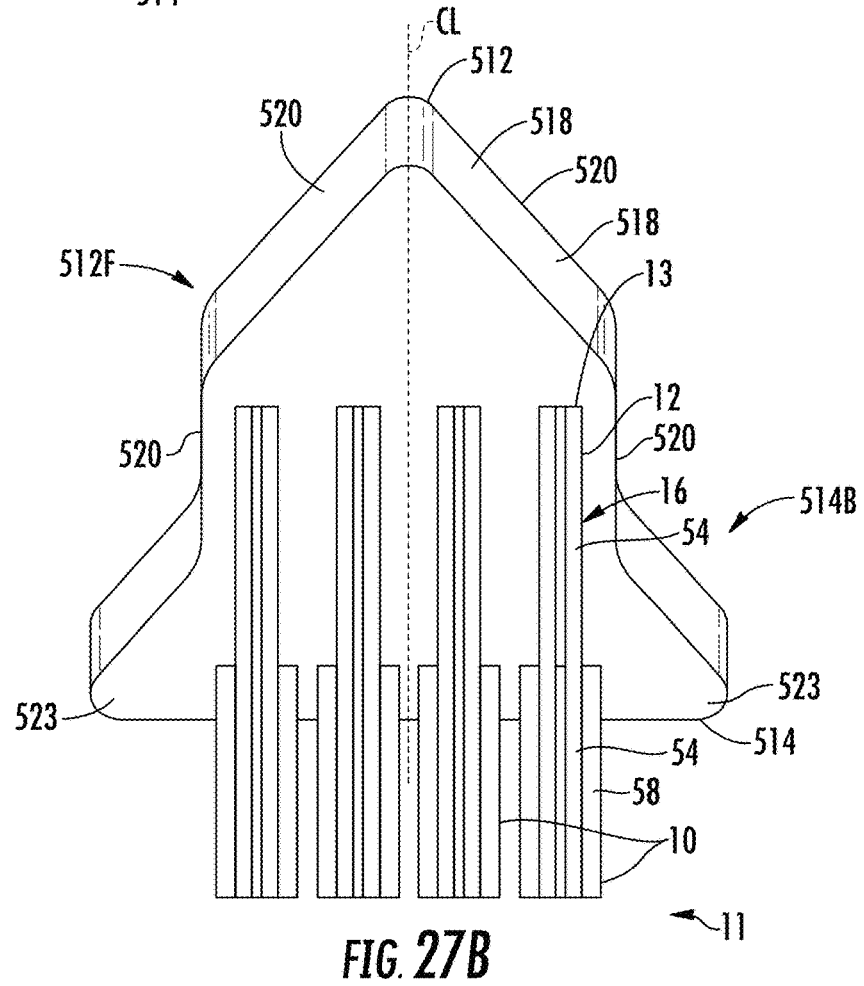
FIG. 27B is a top-down view of an example alignment ferrule assembly that utilizes the alignment substrate formed from the long glass member of FIG. 27A.

If the evanescent coupling region ECR resides outside the V-shaped front-end section 512F of the alignment substrate 510, then another approach for applying the pressing force FD is to add two additional angled faces at or toward the back end 514 of the alignment substrate, i.e., away from the V-shaped front-end section, as illustrated in FIGS. 27A and 27B. FIG. 27A is a front elevated view of an example long glass member 510G having the necessary cross-sectional shape for forming the desired alignment substrate 510 and includes two triangular protrusions 523G. The example alignment substrate 510 of FIG. 27B includes two triangular protrusions 523 at the back-end section 514B, which gives the alignment substrate four angled edges 520, with two at the front-end section 512F and two at the back-end section 514B.

Figure 25C:
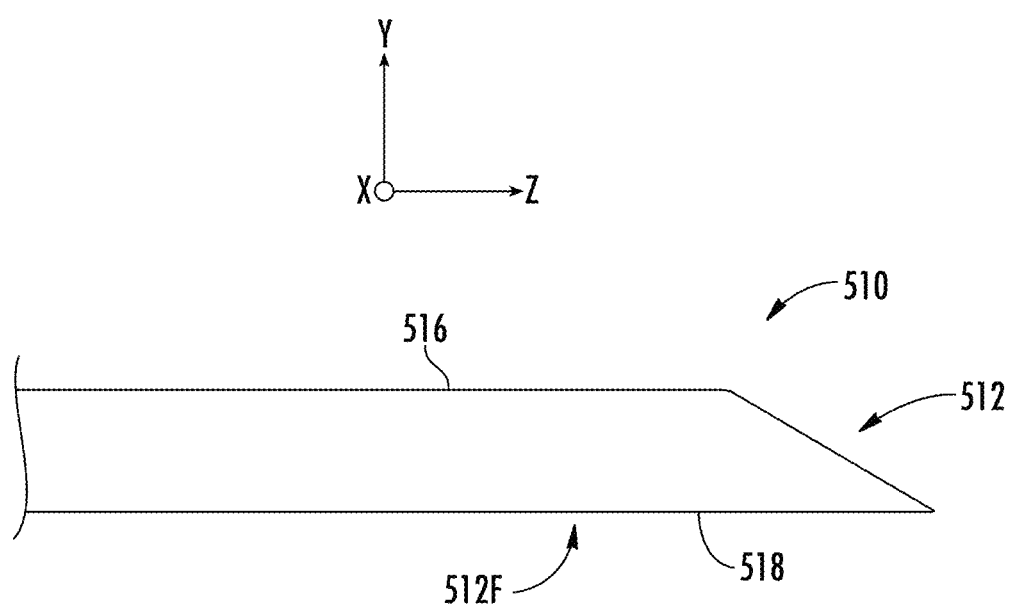
FIG. 25C is a close-up y-z cross-sectional view of the alignment substrate of FIG. 25A showing an angled edge that makes the top surface of the alignment substrate have a smaller area than the bottom surface of the alignment substrate.
Figure 28:
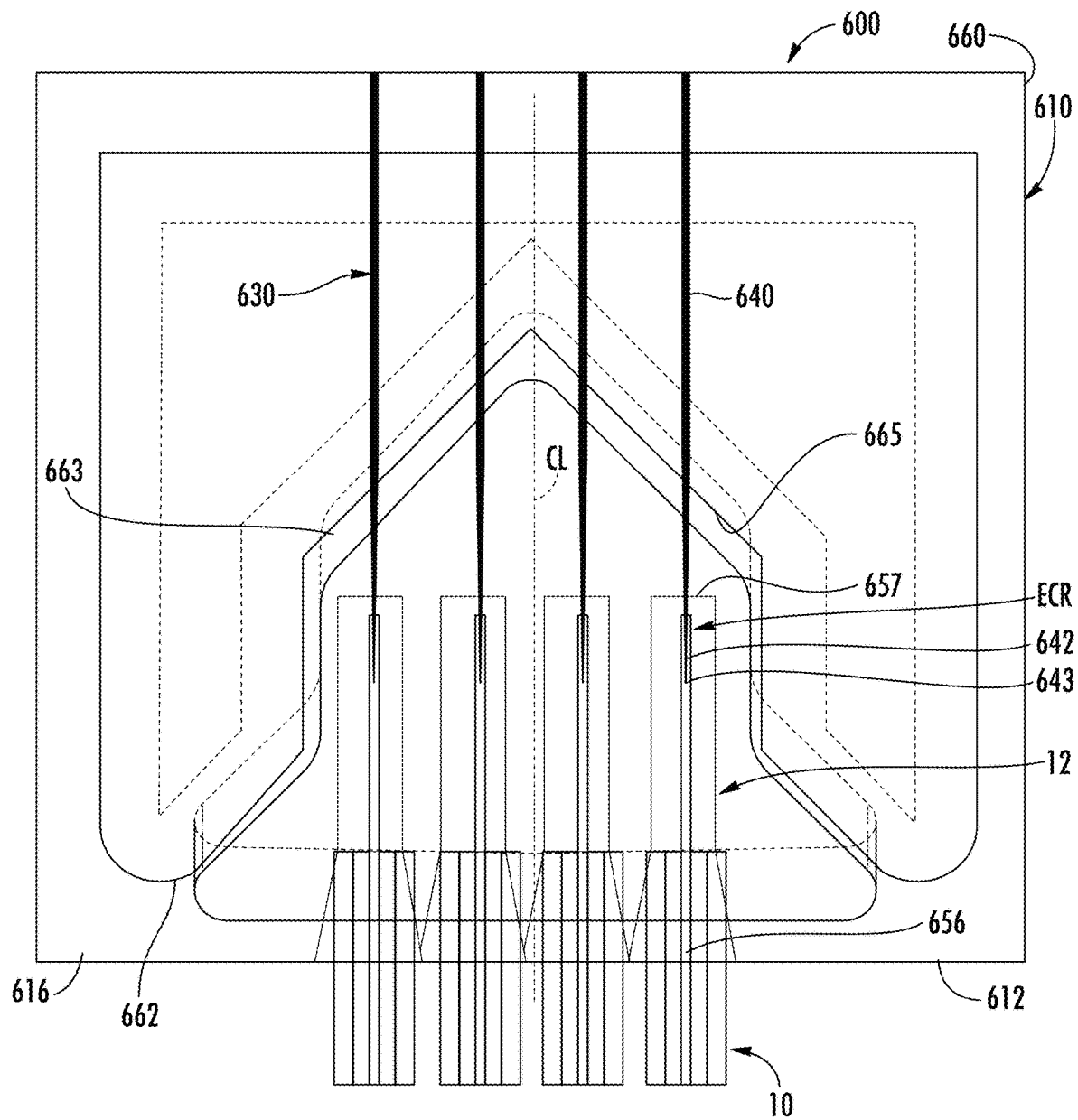
FIG. 28 is similar to FIG. 26B but with the alignment ferrule assembly of FIG. 27B.

FIG. 28 is similar to FIG. 26B and shows an example alignment ferrule assembly 500 that employs the alignment substrate 510 of FIG. 25B and also shows an example PLC 600 that includes a stop fixture 600 wherein the recess 663 has a complementary shape to the alignment substrate. When the four angled edges 520 of the alignment fixture 510 engage the four corresponding portions of the inside edge 665 of the recess 663 of the stop fixture 660, the entire alignment substrate is forced downward, regardless of where the evanescent coupling region ECR falls relative to the alignment substrate. This design for the alignment substrate 510 simplifies the design of the connector housing 110, since during mating of the alignment ferrule assembly 500 to the PLC 600 the connector housing only has to provide a low-angle force that is roughly parallel to the top surface 516 of the PLC substrate 510.

Figure 29A:
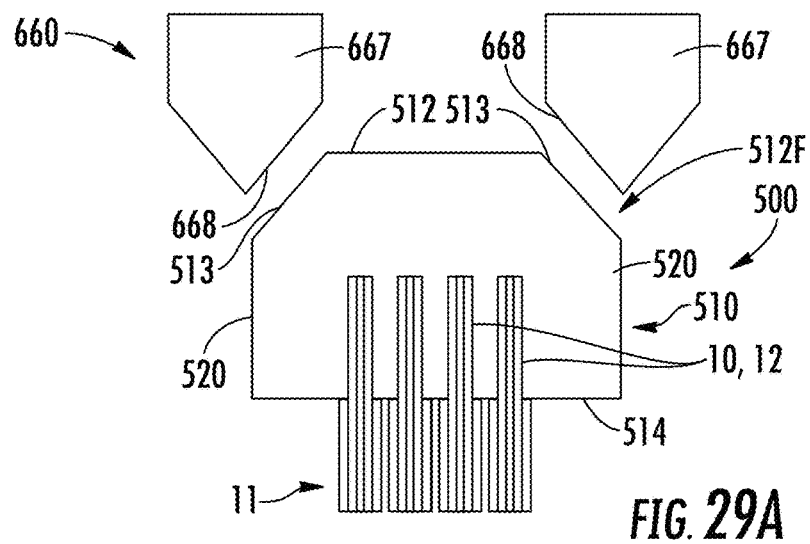
FIGS. 29A through 29E are top-down views that illustrate alternate embodiments (configurations) for the alignment substrate of the alignment ferrule assembly and the stop fixture of the PLC.

FIGS. 29A through 29E show alternate embodiments (configurations) for the alignment substrate 510 of the alignment ferrule assembly 500 and for the stop fixture 660 of the PLC 600. FIG. 29A is a top-down view that shows an example alignment substrate 510 wherein the front end 512 includes beveled corners 513 and wherein the stop fixture 660 is formed by two posts 667 each having an angled facet 668 configured to make face-to-face contact with beveled corners 513.

Figure 29B:
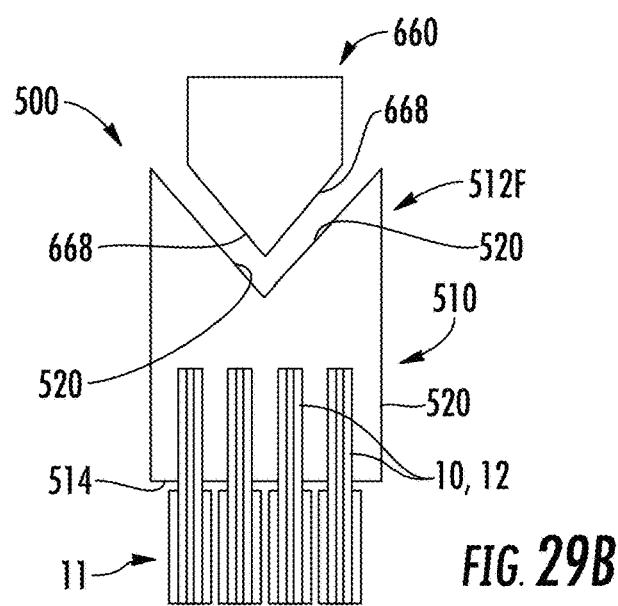

FIG. 29B is a top-down view that shows an example alignment substrate 510 wherein the front end 512 has a V-groove 527, and wherein the stop fixture 660 is defined by a single element having angled facets 668 that form a V-shape recess 663 that is complementary the V-groove front-end section 512F of the alignment substrate 510.

Figure 29C:
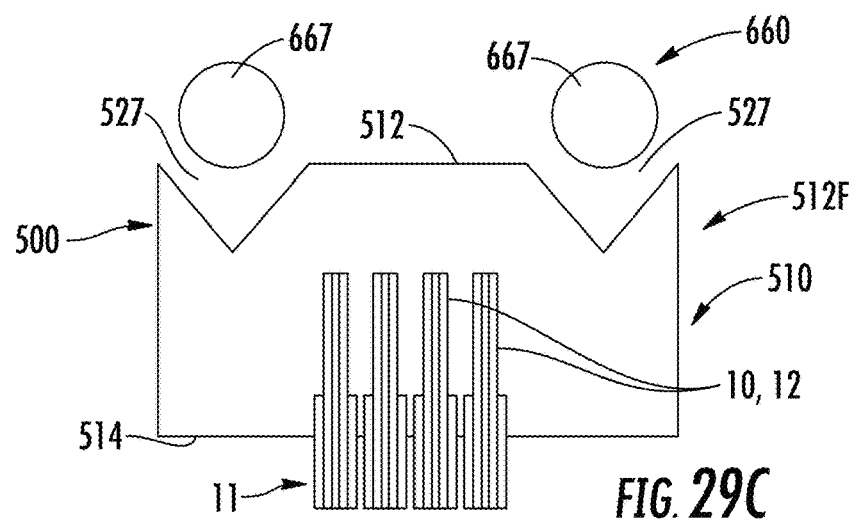

FIG. 29C is a top-down view that shows an example alignment substrate 510 wherein the front end 512 has two spaced apart recesses in the form of V-grooves 527 while the stop fixture 660 is defined by spaced apart posts 667 sized to be closely received by the V-grooves 527 of the alignment substrate 510.

Figure 29D:
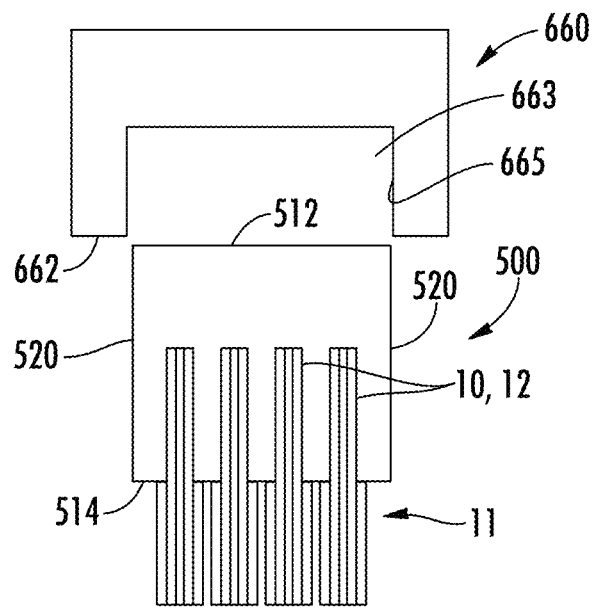

FIG. 29D is a top-down view that shows an example alignment substrate 510 wherein the front end 512 is squared off and wherein the stop fixture 660 has a U-shaped recess 663 sized to receive the squared off front end of the alignment substrate.

Figure 29E:
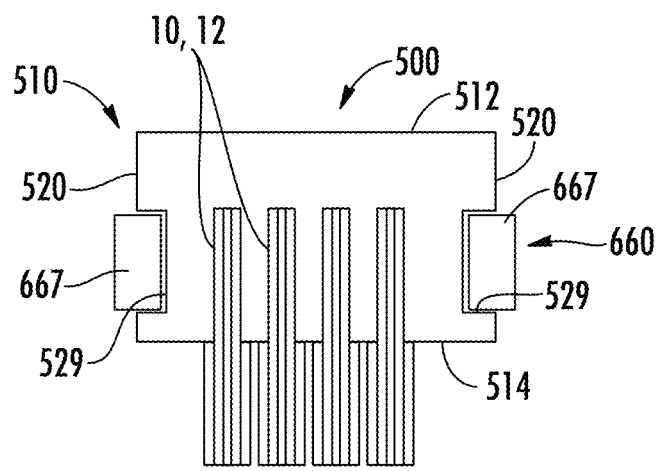

FIG. 29E is a top-down view that shows an example alignment substrate 510 wherein the front end 512 is squared off, wherein the opposite edges 520 each includes a notch 529, and wherein the stop fixture 660 is defined by spaced apart posts 667 configured to engage the notches when the alignment substrate is pushed through the space between the alignment posts. In an example, the posts 667 are flexible so that they deflect when the alignment substrate passes between the posts, with the posts deflecting back into the notches 529 when the notches align with the posts.

Other embodiments for the alignment substrate 510 can include combinations of V-shaped front ends 512 and notches 529. For example, a rectangular side notch 529 similar to the one shown in FIG. 29D can be added to a V-shaped alignment substrate so that, once the alignment substrate is pushed a sufficient distance into the V-shaped section 663V of the recess 663 of the stop fixture 660, an additional polymer gripper can snap into the side rectangular notch to temporarily or permanently lock the alignment ferrule assembly in position on the PLC 600.

Figure 30A:
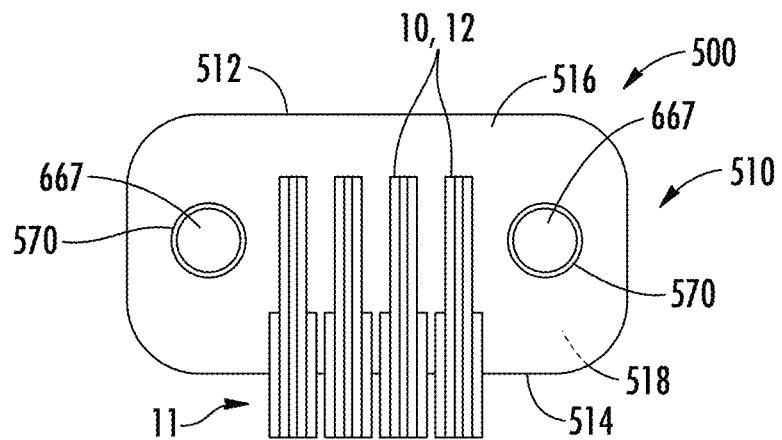
FIGS. 30A through 30D are top-down views of alignment ferrule assemblies wherein the alignment substrate includes spaced-apart holes sized to engage corresponding posts of the stop fixture.
Figure 30B:
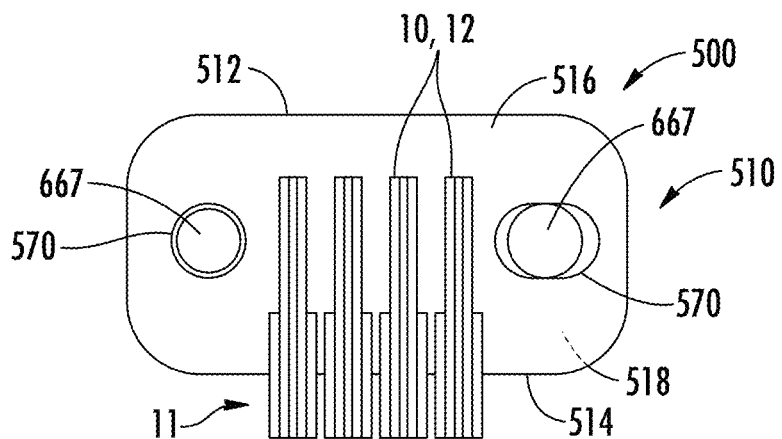

A glass drawing process such as described above can also be used to form holes in drawn long glass members 510G, where the long glass members are used to form alignment substrates 510 that have holes with precise diameters and positions relative to other features. FIGS. 30A and 30B are top-downs view of two example alignment ferrule assemblies 500 that each includes two spaced apart holes 570 that run through from the top surface 516 to the bottom surface 518 of the alignment substrate 510 (i.e., the holes 570 are through holes). In another fabrication process based on patterning/etching of glass sheets, the holes 570 may be blind holes that extend from one surface to a location within the stop fixture. The stop fixture 660 of the PLC 600 can be defined by two spaced-apart posts 667 that have the same spacing and substantially the same diameter as the holes 570 in the alignment substrate 510 so that the posts can fit at least partially through the holes.

If the posts 667 are relatively rigid, they can be fabricated with a diameter that is slightly less than the diameter of the holes 570, as shown in FIG. 30A. Alternatively if the posts are fabricated from a deformable material, they can be sized to have a top surface diameter that is slightly larger than the diameter of the holes 570 and a bottom diameter (where they contact the PLC substrate top surface 516) that is smaller than the holes. During attachment of the alignment ferrule assembly 500 to the PLC 600, the deformable posts 667 deform slightly as they are pushed through their respective holes 570. Since the deformable posts 667 have a relatively low elastic modulus, they can tolerate some lateral displacement when mating the alignment ferrule assembly 500 to the PLC 600. One mated, the posts 667 within the holes 570 will work to precisely align the fibers 10 to the PLC waveguides 640 of the PLC 600 in the evanescent coupling region ECR as their deformation stresses relax.

FIG. 30B shows an example configuration where one hole 570 is circular and the other hole is oblong. The oblong hole 570 provides room for movement of the post within the hole so that the fibers 10 can be aligned with the PLC waveguides 640 by adjusting the position of the alignment ferrule assembly 500. Using an oblong hole 570 also prevents any over-constraint of the posts 667 relative to the holes 570 that might otherwise occur if the post pitch is slightly different than that of the hole pitch due to fabrication variations.

Figure 30C:
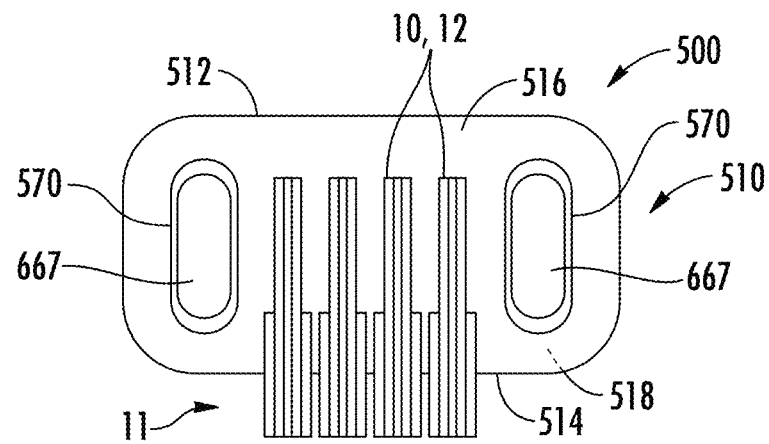
Figure 30D:
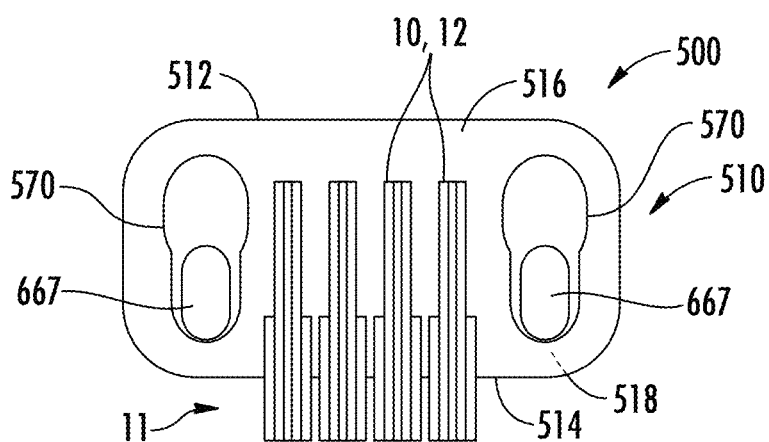

Both holes 570 can be made oblong, as shown in FIG. 30C. The oblong holes 570 can be sized to match the dimensions of oblong posts 667. If the width of the oblong holes 557 is varied along their lengths, then a tapered or keyhole-shaped hole can be created as shown in FIG. 30D. In this case, the polymer gripper post can be sized to fit through the wider portion of the oblong hole 570 but be trapped in the narrow part of the oblong hole when the alignment substrate is moved accordingly. This movement simultaneously aligns the fibers 10 to the PLC waveguides 640 and also generates a pressing force FD on the alignment substrate.

A variant of the alignment substrate 510 of FIG. 30C shown in FIG. 30D has oblong holes that have different sized regions, with the larger region allowing for coarse alignment with the posts 667 and the smaller region allowing for finer alignment.

Stop Fixture Fabrication Using a Glass Drawing Process

Figure 31A:
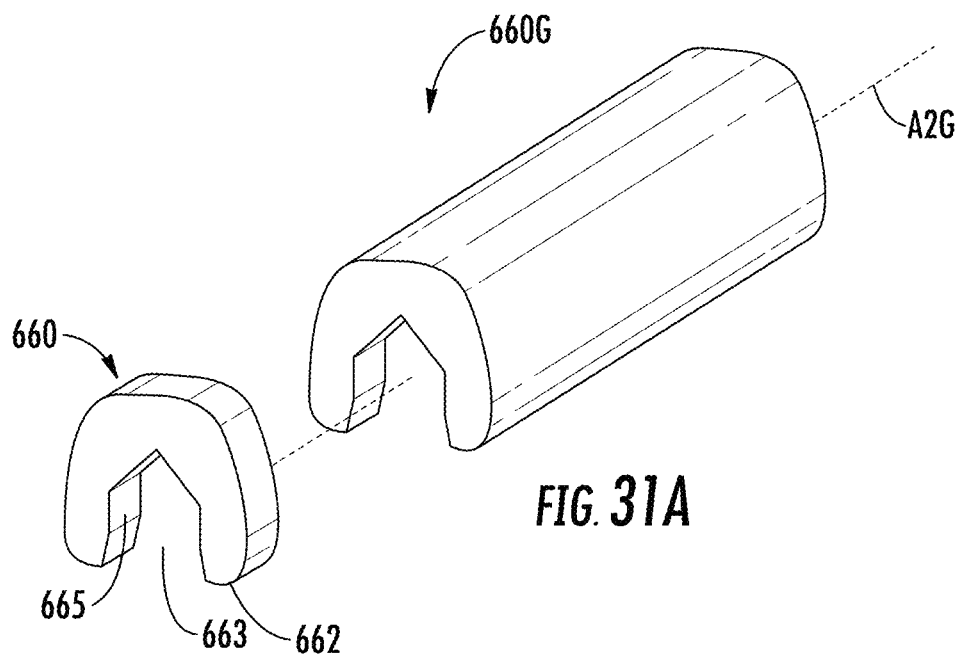
FIGS. 31A and 31B are a top elevated views of an example long glass member used to form stop fixtures having a V-groove recess.

In an example, a glass drawing process can be used to create precision shapes can be used to form the stop fixture 660 discussed above. FIG. 31A is a top elevated view of an example rod-like long glass member 660G formed using a glass drawing process from a similarly shaped but larger sized glass preform as discussed above in connection with FIG. 18A. An example unitary (i.e., single piece) stop fixture 660 is also shown and is formed by cutting the long glass member 660G. The example stop fixture 660 includes a V-shaped recess 663 such as discussed above (see, e.g., FIGS. 6A, 6B).

Figure 31B:
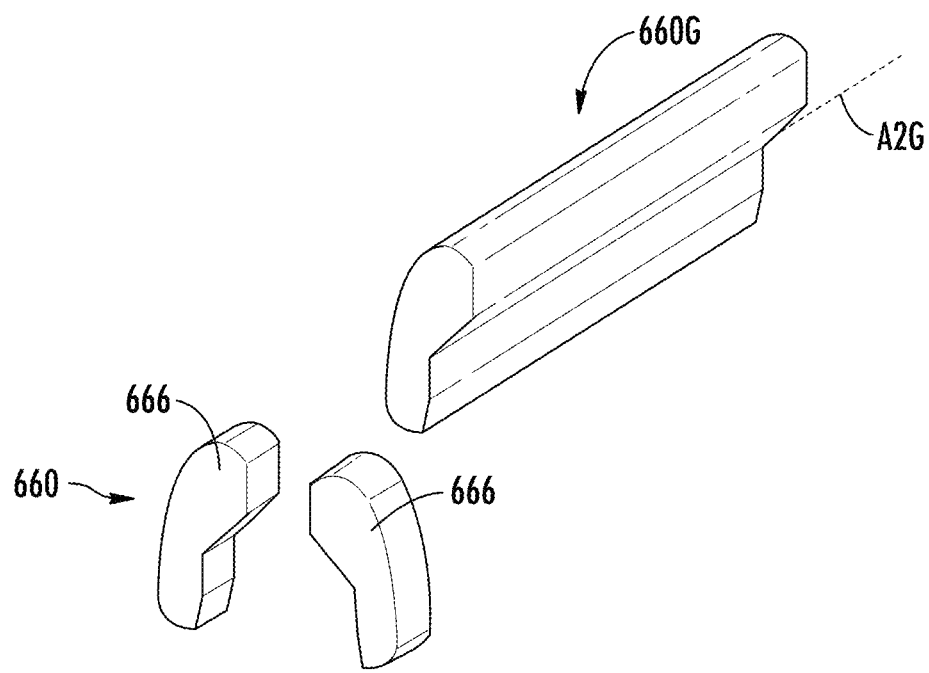

FIG. 31B is similar to FIG. 31A and shows how a multi-piece stop fixture 660 can be formed from a long glass member 660G, wherein the long glass member is cut into individual parts that can then be combined to form the stop fixture. In the present example, the long glass member 660G supplies two parts 666 that are combined to form a two-part stop fixture 660 having the V-shaped recess 663.

Figure 32:
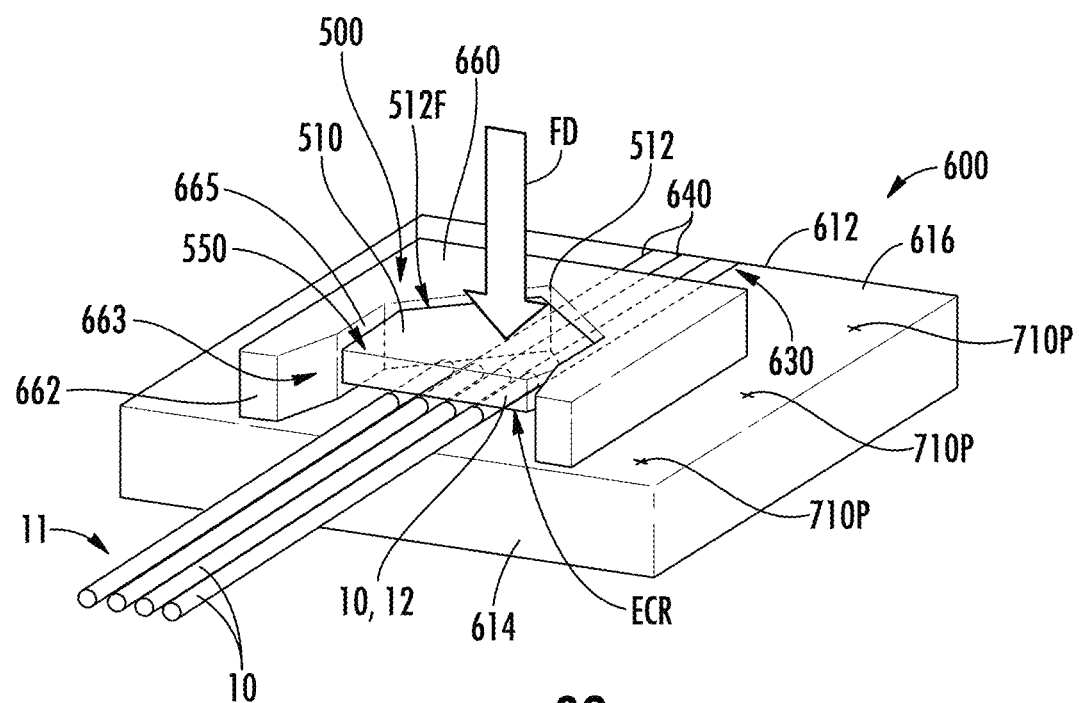
FIG. 32 is a top-elevated view that shows how the stop fixture with the V-shaped recess aligns the alignment ferrule assembly to PLC waveguides by closely receiving the V-shaped front end of the alignment substrate.

FIG. 32 is a top-elevated view that shows how the stop fixture 660 aligns the alignment ferrule assembly 500 to PLC waveguides 640 of the PLC 600 by closely receiving the V-shaped front end 512 of the alignment substrate 510 in the V-shaped recess 663 of the alignment fixture 660. As noted above, the alignment substrate 510 and the stop fixture 660 can have one or more complementary sloped or tapered sides that closely engage when the alignment substrate 510 is operably situated within the recess 663 of the stop fixture 660, which can provide a pressing force FD that presses the fibers 10 onto the PLC waveguides 640 of the PLC 600.

Alignment Ferrule Assembly with Alignment Assembly

Figure 33A:
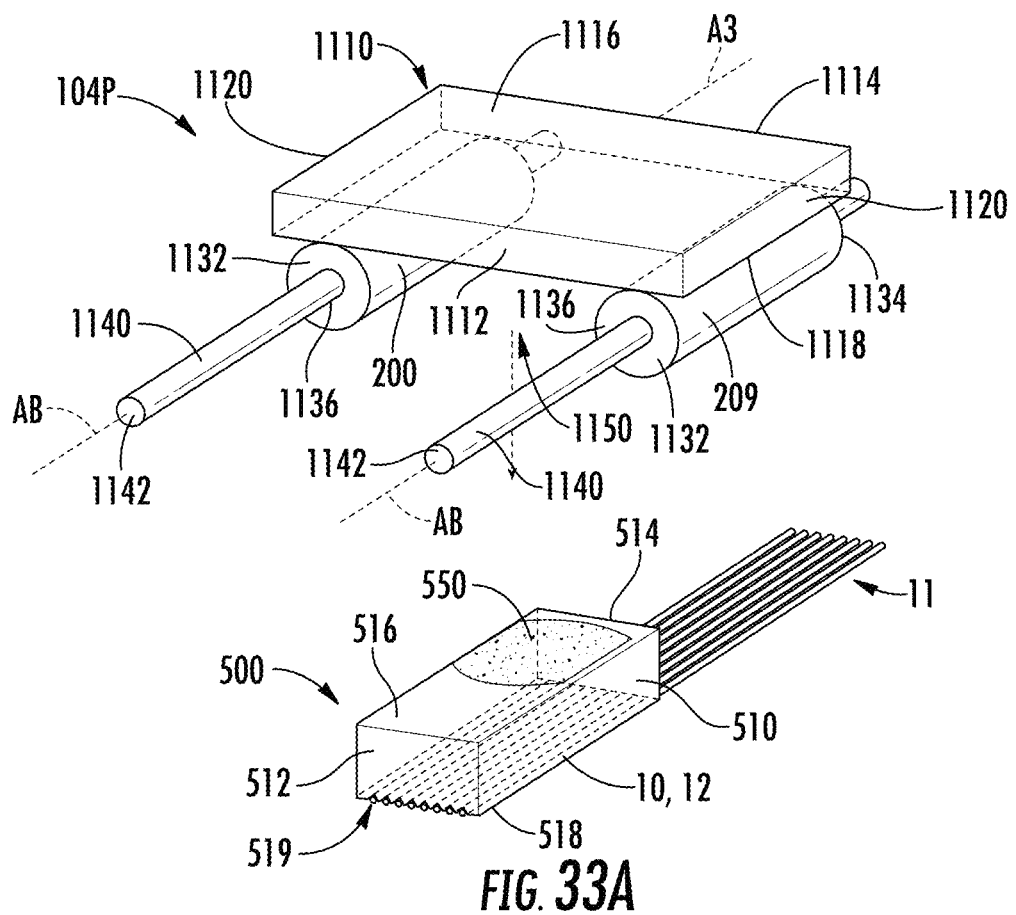
FIG. 33A is a top elevated view of an example alignment ferrule assembly shown disposed beneath an example alignment assembly that utilizes alignment tubes.

FIG. 33A is a top elevated view of an example alignment ferrule assembly 500 shown disposed beneath an alignment assembly 104. The alignment substrate 510 of the alignment ferrule assembly 500 includes longitudinal V-grooves 519 on the bottom surface 518 to provide longitudinal alignment and a select spacing (pitch) of the fibers 10.

The alignment assembly 104P includes a planar top member 1110 having a central axis A3, a front end 1112, a back end 1114, a top surface 1116, a bottom surface 1118 and opposite edges 1120. The alignment assembly 104P also includes spaced apart guide-feature support members 200 in the form of guide tubes attached to the bottom surface 1118 adjacent the respective sides 1120. Each guide tube 200 has a front end 1132, a back end 1134 and a longitudinal bore 1136 having a bore axis AB that runs substantially parallel to the central axis A3. In an example, the front and back ends 1132 and 1134 of the guide tubes 200 substantially coincide with the front and back ends 1112 and 1114 of the planar top member 1110. In an example, each bore 1136 supports a guide pin 1140 having a front-end section 1142 that extends beyond the front end 1112 of the planar top member 1110. In an example, one or more of the planar top member 1110, the guide tubes 200 and the guide pins 1140 are made of glass. In one example, the planar top member 1110 and the guide tubes 200 are made of glass while the guide pins 1140 are made of material other than glass, such as a rigid polymer or metal. The spaced-apart guide tubes 200 and the bottom surface 1118 of the planar top member 1110 define a receiving region 1150 sized to accommodate the alignment substrate 510 of the ferrule assembly 500. FIG. 33A shows adhesive material 550 applied to a portion of the top surface 516 of the alignment substrate 510 of the alignment ferrule assembly 500. Note that the planar top member 1110 of the alignment assembly 104P of FIG. 33A is the counterpart to the planar top member 130 of the alignment assembly 104P of FIG. 4B.

Figure 33B:
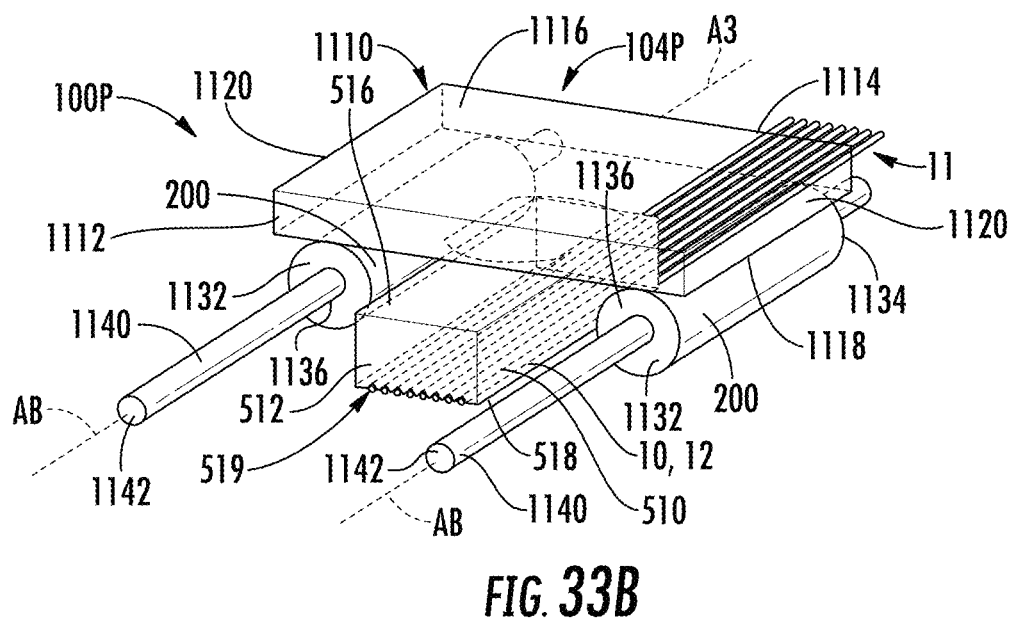
FIG. 33B shows the assembled plug connector of FIG. 33A.

The alignment assembly 104P is combined with the alignment ferrule assembly 500 to form a plug connector 100P by inserting the alignment substrate 510 into the receiving region 1150 so that the adhesive material 550 contacts the bottom surface 1118 of the planar top member 1110. The alignment ferrule assembly 500 is then aligned relative to the alignment assembly 1110. In an example, this alignment is a six-axis alignment. Once alignment is established, the adhesive material 550 is cured, e.g., by exposure to UV light through the planar top member 1110. In an example, the adhesive material 550 has a thickness in the range between 1 μm and 40 μm after alignment and curing. FIG. 33B shows the resulting plug connector 100P.

Figure 34A:
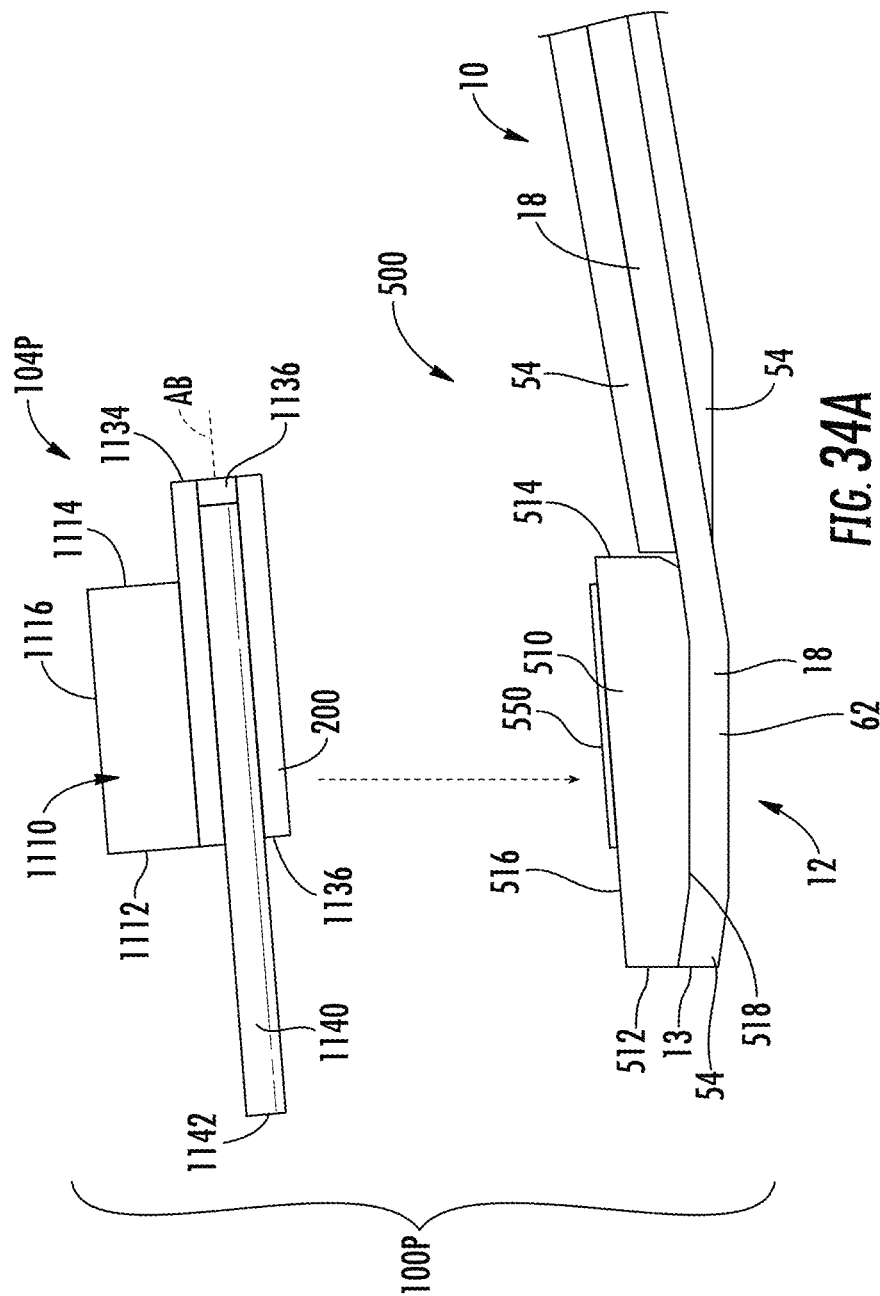
FIG. 34A is a side view of the example alignment ferrule assembly similar to that of FIG. 11D along with the example plug connector of FIG. 33B in the process of forming a plug connector.

FIG. 34A is a side view of the example alignment ferrule assembly 500 similar to that of FIG. 11D but having an alignment substrate 510 wherein the top surface 516 is angled relative to the bottom surface 518. FIG. 34A also shows the alignment assembly 104P residing above the alignment ferrule assembly 500 while FIG. 34B shows the resulting plug connector 100P in which the guide pins 1140 define the connection angle φ relative to bottom surface 518 of the alignment substrate 510. Note that the connection angle φ=0 corresponds to the horizontal.

PLC with Receptacle Assembly

FIG. 35A is a side view of the plug connector 100P in position relative to the PLC 600, i.e., adjacent the front end 612 of the PLC substrate 610. The PLC 600 includes a receptacle assembly 104R that in an example has the same construction as the alignment assembly 1200P but without the guide pins 1400. The receptacle assembly 104R is disposed on the top surface 616 of the PLC substrate 610 and oriented at the connecting angle φ so that the bore axes AB align with the guide pins 1140. This can be accomplished by forming a flat section 1138 on each of the guide tubes 200 of the receptacle assembly 104R. In an example, the receptacle assembly 104R is secured to the top surface 616 of the PLC substrate 610 using the adhesive material 550.

The alignment assembly 1200P is mating engaged with the receptacle assembly 104R to form the evanescent optical coupler 900, as shown in FIG. 35B. The evanescent optical coupler 900 is formed by bringing the alignment assembly 1200P and receptacle assembly 104R together along the connecting angle φ so that the guide pins 1140 of the alignment assembly 1200P slide into the bores 1136 of the receptacle assembly 104R. When the guide pins 1140 of the alignment assembly 1200P are fully inserted into the bores 1136 of the receptacle assembly 104R, the fibers 10 of the alignment ferrule assembly 500 of the alignment assembly are aligned with and are in close contact with the PLC waveguides 640 of the PLC 600 in the evanescent coupling region ECR.

Figure 36A:
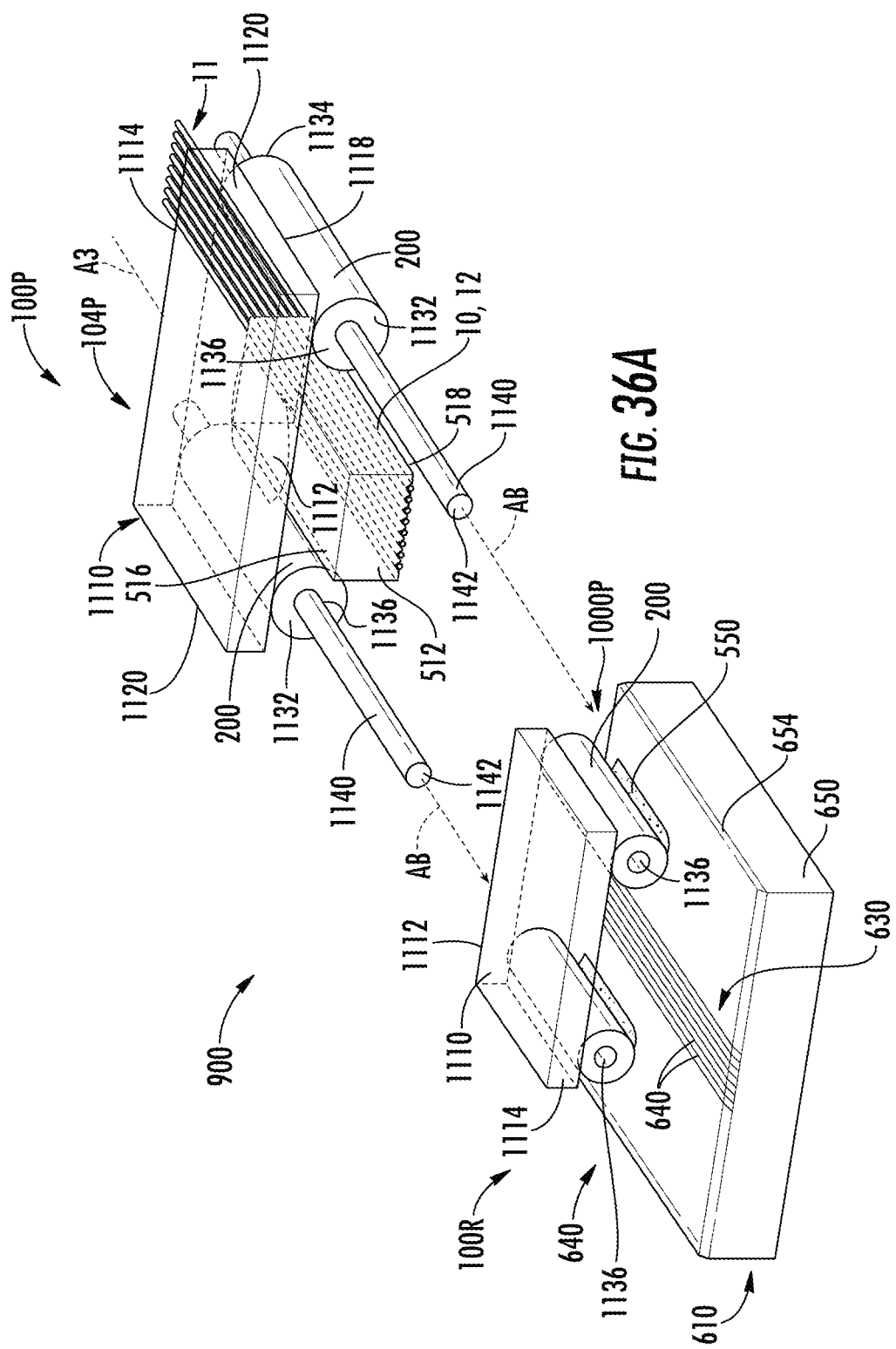
FIGS. 36A and 36B are top elevated views of an example plug connector and receptacle connector respectively having a tube-based alignment assembly and a tube-based receptacle assembly, illustrating the formation of an example evanescent optical coupler by matingly engaging the plug and receptacle connectors.
Figure 36B:
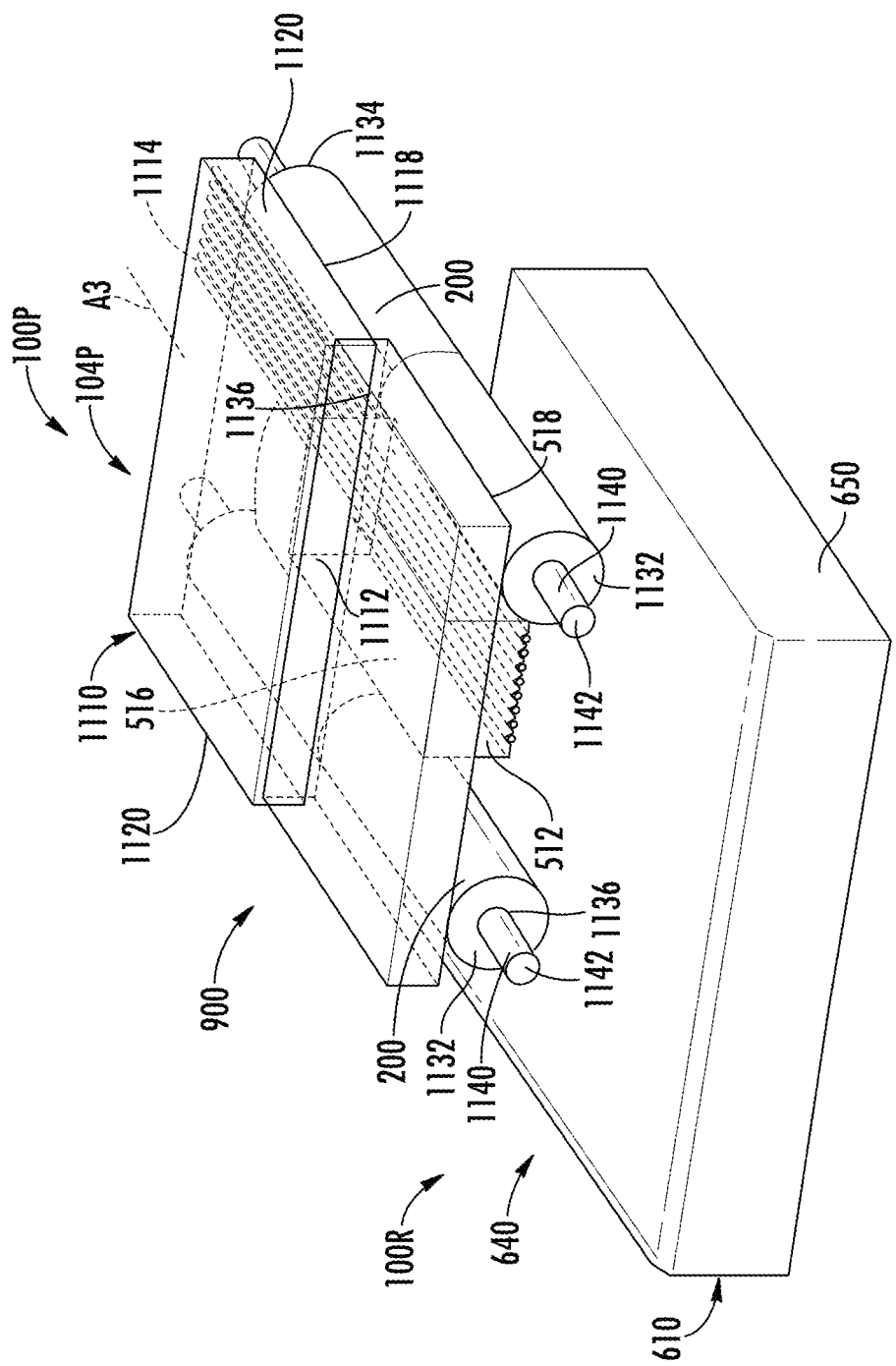

FIGS. 36A and 36B are top elevated views of the plug connector 100P and the receptacle connector 100R, illustrating the formation of the example evanescent optical coupler 900 by matingly engaging the plug and receptacle connectors.

While the embodiments disclosed herein have been set forth for the purpose of illustration, the foregoing description should not be deemed to be a limitation on the scope of the disclosure or the appended claims. It will be apparent to those skilled in the art that various modifications and variations can be made without departing from the spirit or scope of the claims.

It will be understood by one having ordinary skill in the art that construction of the described disclosure and other components is not limited to any specific material. Other exemplary embodiments of the disclosure disclosed herein may be formed from a wide variety of materials, unless described otherwise herein.

Where a range of values is provided, it is understood that each intervening value, to the tenth of the unit of the lower limit, unless the context clearly dictates otherwise between the upper and lower limit of that range, and any other stated or intervening value in that stated range, is encompassed within the disclosure. The upper and lower limits of these smaller ranges may independently be included in the smaller ranges, and are also encompassed within the disclosure, subject to any specifically excluded limit in the stated range. Where the stated range includes one or both of the limits, ranges excluding either or both of those included limits are also included in the disclosure.

For purposes of this disclosure, the term "coupled" (in all of its forms: couple, coupling, coupled, etc.) generally means the joining of two components (optical, electrical or mechanical) directly or indirectly to one another. Such joining may be stationary in nature or movable in nature. Such joining may be achieved with the two components (optical, electrical or mechanical) and any additional intermediate members being integrally formed as a single unitary body with one another or with the two components. Such joining may be permanent in nature, or may be removable or releasable in nature, unless otherwise stated. It will be apparent to those skilled in the art that various modifications and variations can be made without departing from the spirit or scope of the claims.

For the purposes of describing and defining the present teachings, it is noted that the terms "substantially" and "approximately" and "about" are utilized herein to represent the inherent degree of uncertainty that may be attributed to any quantitative comparison, value, measurement, or other representation. The terms "substantially" and "approximately" and "about" are also utilized herein to represent the degree by which a quantitative representation may vary from a stated reference without resulting in a change in the basic function of the subject matter at issue.

It is to be understood that variations and modifications can be made on the aforementioned embodiments without departing from the concepts of the present disclosure, and further it is to be understood that such concepts are intended to be covered by the following claims unless these claims by their language expressly state otherwise.

What is claimed is:

1. An optical interconnection device for establishing evanescent optical coupling between an array of optical waveguides and an array of optical fibers, comprising:
   a planar lightwave circuit (PLC) having a surface and that supports the array of optical waveguides, wherein the array has first and second sides;
   an adapter having an interior, spaced apart first and second tabs and spaced apart first and second arms each having a first guide feature, wherein the first and second tabs of the adapter are attached to the surface of the PLC adjacent and outboard of the first and second sides of the array of waveguides;
   a stop fixture comprising a recess with an inside edge, the stop fixture attached to the surface of the PLC and within the interior of the adapter and relative to the optical waveguide array, with the recess defining an alignment surface.

2. The optical interconnection device according to claim 1, wherein the recess comprises a front-end section having a V-shape.

3. The optical interconnection device according to claim 1, wherein stop fixture has a planar top side and the inside edge makes an obtuse angle relative to the planar top side.

4. The optical interconnection device according to claim 1, wherein each first guide feature comprises a slot defined by upper and lower tines of each of the first and second arms.

5. The optical interconnection device according to claim 1, wherein the stop fixture comprises one or more resilient gripper elements.

6. An evanescent optical coupler, comprising:
   the optical interconnection device according to claim 1 as a first optical interconnection device;
   a second optical interconnection device comprising: an alignment ferrule assembly comprising an alignment substrate having a substrate central axis and that supports an array of optical fibers; an alignment assembly that operably supports the alignment ferrule assembly; and
   wherein the adapter is configured to matingly engage with the alignment assembly of the second optical interconnection device to place the optical fibers and the optical waveguides in evanescent optical communication.

7. The evanescent optical coupler according to claim 6, wherein the alignment assembly comprises second guide features configured to operably engage with the first guide features of the alignment assembly.

8. The evanescent optical coupler according to claim 6, wherein the first and second guide features define a connection angle $\phi>0$ relative to the substrate central axis of the alignment substrate.

9. The evanescent optical coupler according to claim 6, wherein the alignment substrate has a front-end section that is received within the recess of the stop fixture when the first and second optical interconnection devices are matingly engaged.

10. The evanescent optical coupler according to claim 9, wherein the alignment ferrule assembly is attached to a spring-loaded carrier member, and wherein the adapter comprises a tongue that mechanically engages the carrier member and applies a pressing force that presses the alignment ferrule assembly against the PLC so that the optical fibers press against the optical waveguides when the first and second optical interconnection devices are matingly engaged.

11. The evanescent optical coupler according to claim 10, wherein the stop fixture has a planar top side, and wherein the inside edge is angled other than perpendicular to the planar top side, and wherein the alignment substrate has an angled outside edge that allows either face-to-face contact or line contact between the outside edge of alignment substrate and the inside edge of the recess of the stop fixture.

12. The evanescent optical coupler according to claim 11, wherein the stop fixture comprises one or more resilient gripper elements configured to define an interference fit between the front-end section of the alignment substrate and the recess of the stop fixture.

13. The evanescent optical coupler according to claim 12, wherein the alignment ferrule assembly comprises a latch that is movable over first and second arms of the adapter to secure the alignment assembly to the adapter.

14. The evanescent optical coupler according to claim 9, wherein the alignment substrate has an outer edge that comprises one or more alignment bumps configured to align the optical fibers with the PLC waveguides for evanescent coupling when the one or more alignment bumps are in contact with the stop fixture.

\* \* \* \* \*